United States Patent
Nishi et al.

(10) Patent No.: US 9,766,488 B2
(45) Date of Patent: Sep. 19, 2017

(54) LIQUID CRYSTAL DISPLAY APPARATUS AND DISPLAY APPARATUS

(71) Applicant: SHARP KABUSHIKI KAISHA, Osaka-shi, Osaka (JP)

(72) Inventors: Naoto Nishi, Osaka (JP); Shinichi Nakamura, Osaka (JP); Yoshihisa Noguchi, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 175 days.

(21) Appl. No.: 14/432,122

(22) PCT Filed: Sep. 27, 2013

(86) PCT No.: PCT/JP2013/076283
§ 371 (c)(1),
(2) Date: Mar. 27, 2015

(87) PCT Pub. No.: WO2014/051060
PCT Pub. Date: Apr. 3, 2014

(65) Prior Publication Data
US 2015/0277179 A1    Oct. 1, 2015

(30) Foreign Application Priority Data

Sep. 28, 2012   (JP) ................ 2012-218140
Sep. 28, 2012   (JP) ................ 2012-218141
(Continued)

(51) Int. Cl.
*G02F 1/1333*   (2006.01)
*F21V 8/00*   (2006.01)
*G02F 1/1335*   (2006.01)

(52) U.S. Cl.
CPC ..... *G02F 1/133308* (2013.01); *G02B 6/0088* (2013.01); *G02F 1/1335* (2013.01);
(Continued)

(58) Field of Classification Search
None
See application file for complete search history.

(56) References Cited

U.S. PATENT DOCUMENTS

2006/0018106 A1    1/2006   Shoji et al.
2008/0192168 A1    8/2008   Sudo
(Continued)

FOREIGN PATENT DOCUMENTS

JP    7-16138 A    1/1995
JP    11-133418 A    5/1999
(Continued)

*Primary Examiner* — Richard Kim
(74) *Attorney, Agent, or Firm* — Birch, Stewart, Kolasch & Birch, LLP

(57) ABSTRACT

A liquid crystal display apparatus capable of achieving the weight lightening, thinning and narrowing of the frame is provided. The liquid crystal display apparatus includes a liquid crystal panel, an optical sheet, a backlight and a backlight housing body, which are sequentially laminated from a front side to a rear side. The liquid crystal display apparatus includes a frame body which sandwiches the liquid crystal panel, the optical sheet, the backlight and the backlight housing body, and the frame body has a U-shaped cross section opened inward.

15 Claims, 57 Drawing Sheets

(30) Foreign Application Priority Data

| Sep. 28, 2012 | (JP) | 2012-218142 |
| Sep. 28, 2012 | (JP) | 2012-218184 |
| Sep. 28, 2012 | (JP) | 2012-218185 |
| Sep. 28, 2012 | (JP) | 2012-218187 |
| Jun. 18, 2013 | (JP) | 2013-127831 |
| Sep. 26, 2013 | (JP) | 2013-200463 |

(52) U.S. Cl.
CPC ...... *G02F 1/133602* (2013.01); *G02B 6/0085* (2013.01); *G02F 1/133615* (2013.01); *G02F 2001/133317* (2013.01); *G02F 2001/133325* (2013.01); *G02F 2001/133328* (2013.01); *G02F 2201/46* (2013.01); *G02F 2201/465* (2013.01)

(56) References Cited

U.S. PATENT DOCUMENTS

2008/0198289 A1* 8/2008 Oohira ............ G02F 1/133308 349/46
2008/0297681 A1* 12/2008 Yang ................ G02F 1/133308 349/58
2010/0188607 A1* 7/2010 Park .................... G02B 6/0073 349/62
2012/0162875 A1 6/2012 Shimomichi
2013/0135804 A1 5/2013 Takechi et al.

FOREIGN PATENT DOCUMENTS

| JP | 2000-242189 A | 9/2000 |
| JP | 2003-61800 A | 3/2003 |
| JP | 2006-53528 A | 2/2006 |
| JP | 2006-201318 A | 8/2006 |
| JP | 2006-216244 A | 8/2006 |
| JP | 2007-41328 A | 2/2007 |
| JP | 2008-80044 A | 4/2008 |
| JP | 2008-197166 A | 8/2008 |
| JP | 2008-304913 A | 12/2008 |
| JP | 2009-14900 A | 1/2009 |
| JP | 2009-109733 A | 5/2009 |
| JP | 2010-72207 A | 4/2010 |
| JP | 2012-138842 A | 7/2012 |
| WO | WO 2012/008033 A1 | 1/2012 |

* cited by examiner

1

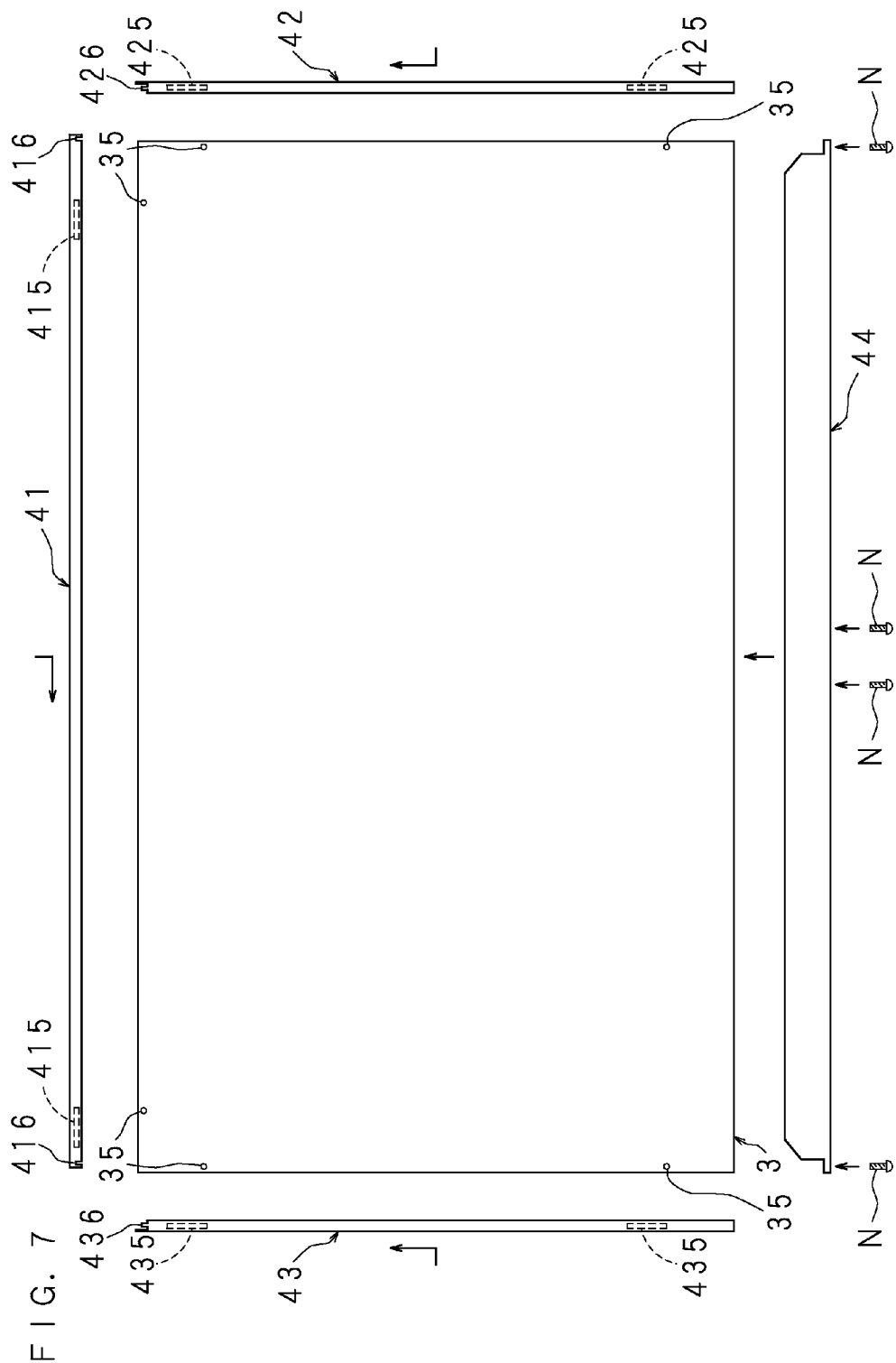

1

F I G. 9
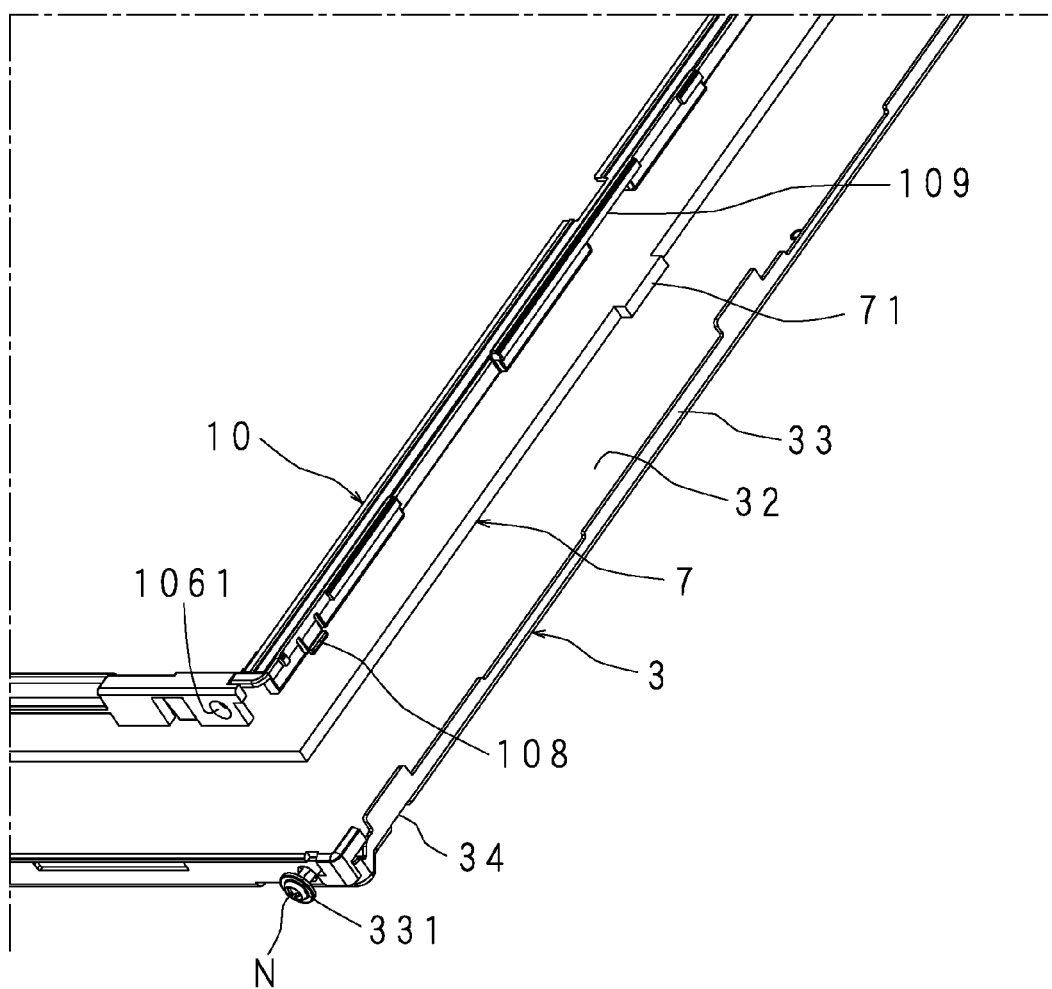

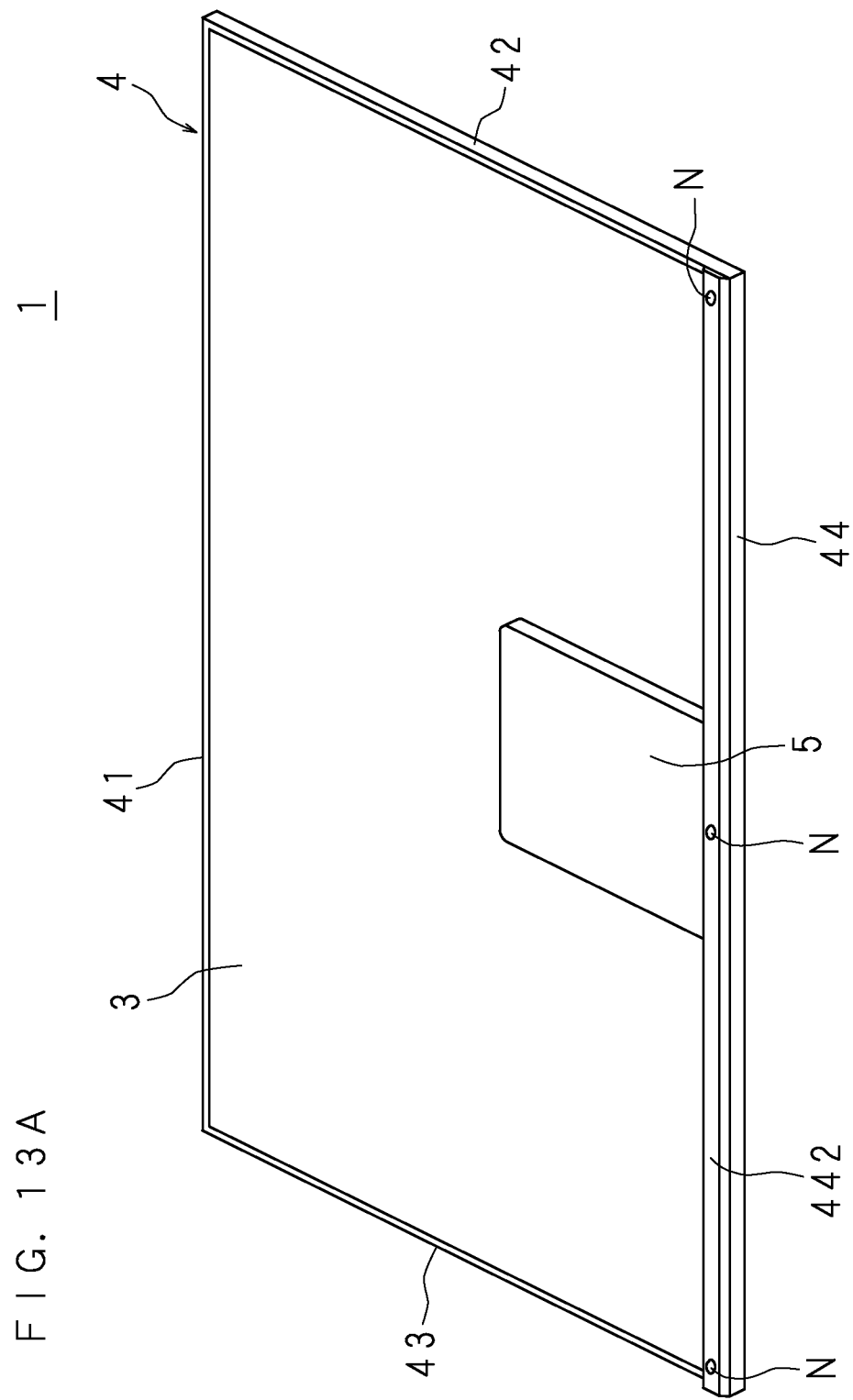

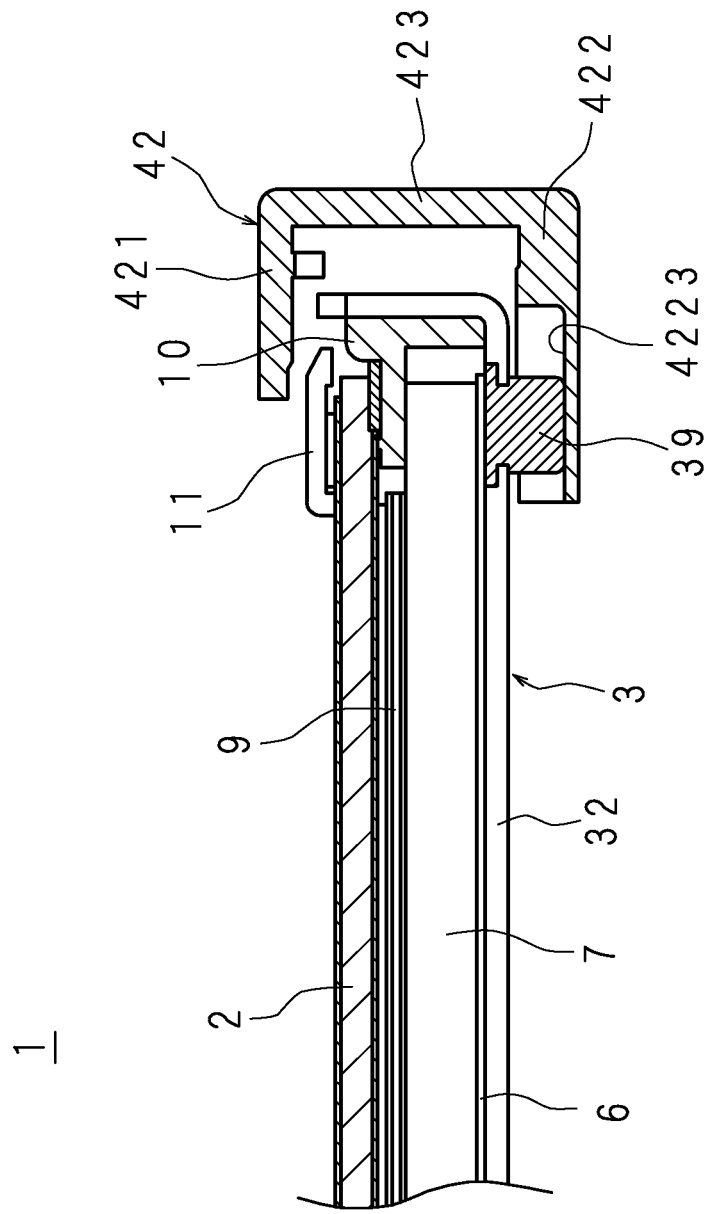

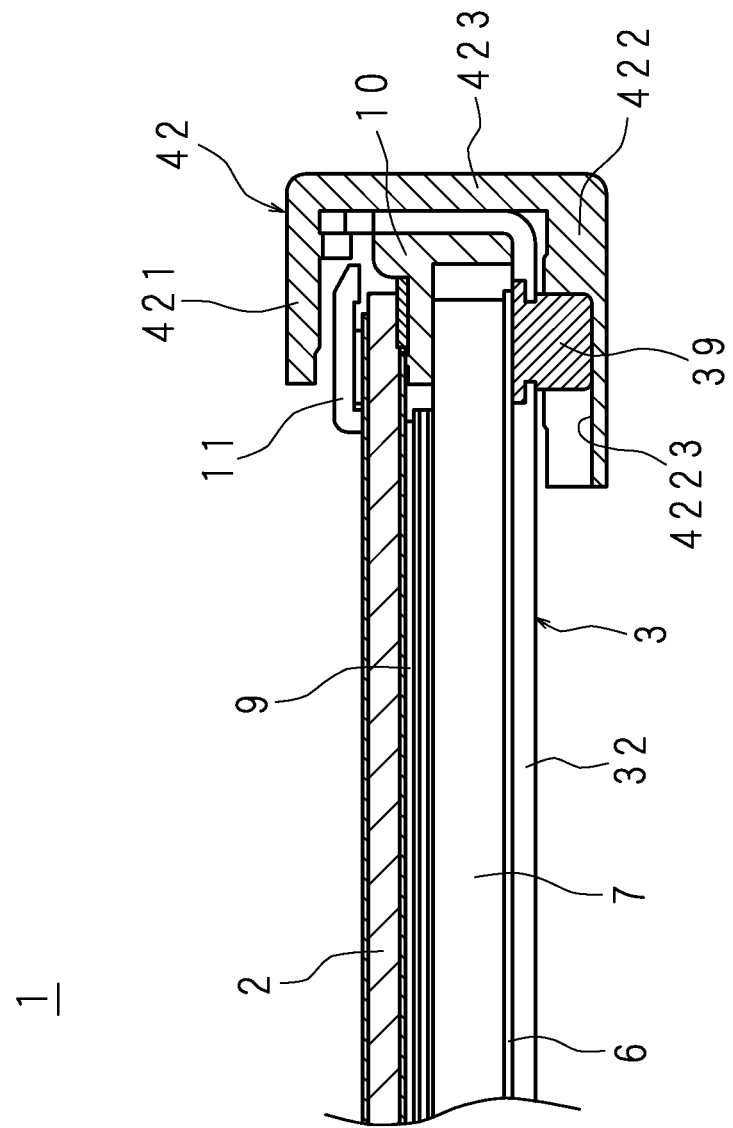

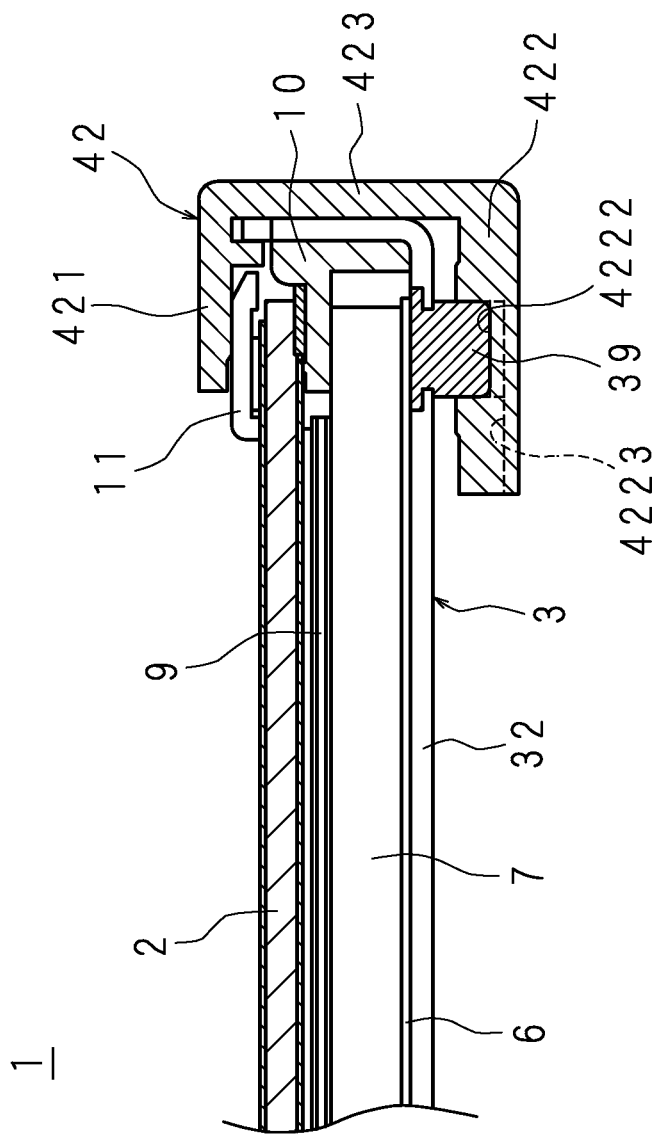

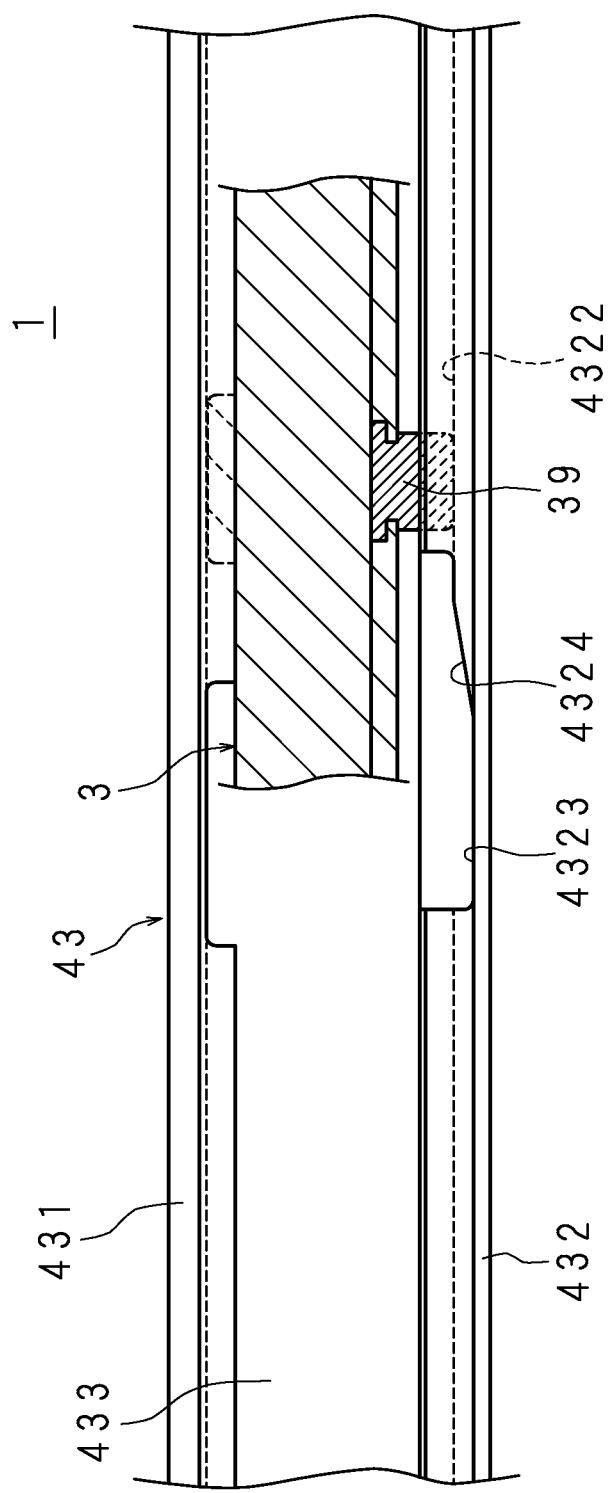

LIQUID CRYSTAL DISPLAY APPARATUS AND DISPLAY APPARATUS

CROSS-REFERENCE TO RELATED APPLICATIONS

This application is the National Phase of PCT International Application No. PCT/JP2013/076283, filed on Sep. 27, 2013, which claims priority under 35 U.S.C. 119(a) to Patent Application No. 2012-218140, filed in Japan on Sep. 28, 2012, No. 2012-218141, filed in Japan on Sep. 28, 2012, No. 2012-218142 filed in Japan on Sep. 28, 2012, No. 2012-218184 filed in Japan on Sep. 28, 2012, No. 2012-218185 filed in Japan on Sep. 28, 2012, No. 2012-218187 filed in Japan on Sep. 28, 2012, No. 2013-127831 filed in Japan on Jun. 18, 2013 and No. 2013-200463 filed in Japan on Sep. 26, 2013, all of which are hereby expressly incorporated by reference into the present application.

FIELD

The present invention relates to a liquid crystal display apparatus and a display apparatus.

BACKGROUND

A liquid crystal display apparatus includes component members such as a liquid crystal panel, an optical sheet, a backlight, and the like, and these component members are held by a frame body (for example, Japanese Patent Application Laid-open No. 2000-242189 and Japanese Patent Application Laid-open No. 2006-201318). The component members held by the frame body are housed in a casing including casing members such as a front cabinet, a back cabinet, and the like.

In addition, these component members are held by a dividable frame body so as to reduce manufacturing costs. The divided frame members are connected to each other by connecting members for securing strength thereof (for example, Japanese Patent Application Laid-open No. 2010-72207).

The component members are fixed to the casing, for example, by a locking structure including a dovetail form and dovetail groove (see Japanese Patent Application Laid-open No. 2010-72207), or a fixing member such as a screw, a pin, and the like (see Japanese Patent Application Laid-open No. 2003-61800 and Japanese Patent Application Laid-open No. H7-16138).

Generally, thin type display apparatuses having a small occupation area of a room relative to a size of a display screen can effectively use a limited indoor space, and thus have been widely distributed. The display apparatus includes a rectangular display panel, and a frame body covering the periphery of the display panel.

In recent years, a display apparatus using a frame body formed by connecting a plurality of rod bodies has been proposed (see Japanese Patent Application Laid-open No. 2008-197166). As compared to the case of manufacturing a rectangle-shaped frame body by integral molding, the frame body manufactured by connecting the rod bodies can be easily changed depending on various screen dimensions, and it is possible to reduce costs of a mold.

Japanese Patent Application Laid-open No. 2008-80044 discloses a rectangular frame body formed by connecting rod bodies having a U-shaped cross section. In the case of the rod bodies having a U-shaped cross section, since the display panel and an optical member may be disposed inside thereof, it is conceivable that these rod bodies are used in the frame body of the display apparatus.

The liquid crystal display apparatus includes a display unit in which a liquid crystal display panel and the backlight are unitized by a bezel. Front peripheral edges and a rear surface of the display unit are covered with a frame-shaped front cabinet and a back cabinet, respectively.

The display unit includes the liquid crystal display panel, and a backlight unit disposed on a rear side of the liquid crystal display panel (for example, Japanese Patent Application Laid-open No. 2009-14900). The liquid crystal display panel is connected with a plurality of flexible wiring boards, wherein a liquid crystal drive circuit for supplying a voltage based on an image signal is mounted on the flexible wiring boards by a chip on film (COF) method. In addition, the flexible wiring boards are connected with a printed circuit board. The printed circuit board is connected to a control board through a cable.

The liquid crystal display panel and the backlight unit are held and protected by the bezel. The bezel has an open quadrilateral-narrow frame shape, and is formed of a metallic material such as stainless steel, and the like having excellent thermal conductivity by pressing or the like. The bezel has a side wall part formed on an outer peripheral edge thereof standing rearward therefrom, and each side of the bezel has a substantially L-shaped cross section. In addition, the bezel has a plurality of protrusion parts which are formed on the side wall part so as to protrude inward by pressing or the like. The protrusion parts contact the flexible wiring board through a film base material.

As a method of thinning the liquid crystal display apparatus, a reflection sheet, a light guide plate, an optical sheet and a liquid crystal display panel are laminated on a tray-shaped housing body having a substantially rectangular shape in a front view, and each of four sides thereof are sandwiched by a frame body having grooves formed therein. According to this method, the bezel which unitizes the liquid crystal display panel and the backlight is not required, and it is possible to achieve the thinning of the liquid crystal display apparatus.

A liquid crystal display apparatus including an LED backlight has been disclosed (for example, Japanese Patent Application Laid-open No. 2006-216244). The LED backlight includes a rectangular light guide plate, a plurality of LED light sources disposed so that a light emitting surface thereof faces an incident side end face along the incident side end face of the light guide plate, and a frame supporting the light guide plate and the LED light sources.

The plurality of LED light sources are mounted on a wiring plate having the same width as the thickness of the light guide plate so as to form a tray shape. The wiring board is provided with a heat dissipater on both surfaces thereof, and the heat dissipater directly contacts the frame. The frame covers a peripheral edge of the light guide plate, and heat of the LED light sources is dissipated from a side of the liquid crystal display apparatus.

SUMMARY

In the liquid crystal display apparatus, with the size thereof becoming larger, weight lightening, thinning and narrowing of the frame are required. One method of achieving the weight lightening, thinning and narrowing of the frame is to reduce the number of parts. However, difficulties of reducing the number of parts while maintaining quality are increased. In order to achieve the weight lightening, thinning and narrowing of the frame, further researches to overcome the difficulties are required. In addition, the connecting members for connecting the divided frame members cause greater difficulty in weight lightening of the liquid crystal display apparatus.

In the locking structure according to Japanese Patent Application Laid-open No. 2010-72207, a space for providing the locking structure over the entire periphery of the liquid crystal display apparatus is needed, however this causes greater difficulty in the thinning and narrowing of the frame. In addition, for example, fixing by a plurality of screws requires a large amount of labor and time. Therefore, reduction of the fixing member is required to improve efficiency of assembly.

When manufacturing the frame body by connecting the rod bodies having a U-shaped cross section as disclosed in Japanese Patent Application Laid-open No. 2008-80044, gaps are likely to be formed in connection portions, thereby the entry of dust, light leakage, and a decrease in appearance quality may occur.

According to the liquid crystal display apparatus of Japanese Patent Application Laid-open No. 2009-14900, it is possible to dissipate heat generated from the liquid crystal drive circuit of the liquid crystal display panel by conducting the heat to the bezel. However, in a thin liquid crystal display apparatus whose bezels are eliminated, it is not possible to dissipate the heat using the bezel. Further, in Japanese Patent Application Laid-open No. 2009-14900, there is a need to align the protrusion part provided on the bezel with the liquid crystal drive circuit and bring them into contact with each other, such that a large amount of labor and time to assemble the liquid crystal display apparatus may be required.

By thinning of the liquid crystal display apparatus, the surface area of the side is narrowed, and it is difficult to sufficiently diffuse the heat emitted by the LED light sources from the side. Further, when a large amount of heat is diffused from the side of the liquid crystal display apparatus, a user touching the side is likely to feel that this is abnormal such as unusually hot, or the like, which may lead to a misunderstanding that a problem is occurring in the apparatus.

In consideration of the above-mentioned circumstances, it is an object of the present invention to provide a liquid crystal display apparatus capable of achieving the weight lightening, thinning and narrowing of the frame.

Another object of the present invention is to provide a liquid crystal display apparatus capable of achieving the weight lightening, thinning and narrowing of the frame by eliminating the connecting member.

Further, another object of the present invention is to provide a liquid crystal display apparatus which reduces a locking structure and fixing members for fixing component members and can improve efficiency of assembly.

Further, another object of the present invention is to provide a display apparatus capable of preventing a gap from being formed in connection portions of frame members forming the frame body.

Further, another object of the present invention is to provide a liquid crystal display apparatus capable of being thinned by employing a configuration in which a light guide plate, an optical sheet and a liquid crystal display panel are laminated on a housing body, and peripheral edges thereof are sandwiched by a frame body having grooves formed therein, as well as effectively dissipating heat generated from a liquid crystal drive circuit of the liquid crystal display panel without requiring alignment of the liquid crystal drive circuit.

Furthermore, another object of the present invention is to provide a liquid crystal display apparatus capable of being thinned by employing a configuration in which a light guide plate, an optical sheet and a liquid crystal display panel are laminated on a housing body, and peripheral edges thereof are sandwiched by a frame body having grooves formed therein, as well as diffusing heat of a light source of an edge-light-type from sides and a rear side, and suppressing an increase in temperature of side parts.

According to one aspect of the present invention, there is provided a liquid crystal display apparatus which includes a liquid crystal panel, an optical sheet, a backlight and a backlight housing body, which are sequentially laminated from a front side to a rear side, including: a rectangular frame body which sandwiches the liquid crystal panel, the optical sheet, the backlight and the backlight housing body, wherein the frame body may have a U-shaped cross section opened inward.

In the liquid crystal display apparatus according to the present invention, the frame body is configured to be divided into four linear frame members, and the frame members are each an extrusion-molded product.

In the liquid crystal display apparatus according to the present invention, the optical sheet is smaller than a front surface of the backlight, and the apparatus includes: a rectangular light shielding frame body which is located between peripheral edge parts of the liquid crystal panel and the backlight in an outside of the optical sheet, and shields light of the backlight to be leaked to an outside of the apparatus.

In the liquid crystal display apparatus according to the present invention, liquid crystal display apparatus include a back cabinet which covers the backlight housing body from the rear side, wherein the frame body sandwiches the liquid crystal panel, the optical sheet, the light shielding frame body, the backlight, the backlight housing body and the back cabinet.

According to another aspect of the present invention, there is provided a liquid crystal display apparatus which includes a liquid crystal panel, an optical sheet, a backlight and a backlight housing body, which are sequentially laminated from a front side to a rear side, including: a frame body which is configured to abut a front peripheral edge part of the liquid crystal panel and a rear peripheral edge part of the backlight housing body and sandwich the liquid crystal panel, the optical sheet, the backlight and the backlight housing body, and has a rectangular shape in a front view and a U-shaped cross section opened inward, wherein the frame body is configured to be divided into four linear frame members, and the frame members are joined with each other by a tenon assembly structure provided at a location to be butted with each other.

In the liquid crystal display apparatus according to the present invention, the tenon assembly structure is formed on a rear portion of the frame body abutting the rear peripheral edge part of the backlight housing body.

In the liquid crystal display apparatus according to the present invention, a mortise facing the other frame member to be jointed is provided in both end parts of the rear portion in one frame member, and a tenon which is fitted to the mortise is provided on the rear portion of the other frame member at a location to be butted with the one frame member.

In the liquid crystal display apparatus according to the present invention, the backlight housing body is formed in a box shape whose front surface is opened, the liquid crystal panel, the optical sheet and the backlight are laminated on an inner bottom of the backlight housing body, the front surface of the rear portion in the frame body is provided with a protrusion part, and the rear peripheral edge part of the backlight housing body facing the protrusion part is provided with a slit to which the protrusion part is fitted substantially parallel to the peripheral edge of the backlight housing body.

According to another aspect of the present invention, there is provided a liquid crystal display apparatus which includes a liquid crystal panel, an optical sheet, a backlight and a backlight housing body, which are sequentially laminated from a front side to a rear side, wherein the backlight housing body is formed in a box shape whose front surface is opened, the liquid crystal panel, the optical sheet and the backlight are laminated on an inner bottom of the backlight housing body, and including: a frame body which is configured to abut the liquid crystal panel and the backlight housing body and sandwich the liquid crystal panel, the optical sheet, the backlight and the backlight housing body, and has a rectangular shape in a front view and a U-shaped cross section opened inward, wherein any one of an inner surface of the frame body and an outer surface of the backlight housing body facing the inner surface is provided with a protrusion part, and the other thereof is provided with a groove part or an opening to which the protrusion part is fitted.

In the liquid crystal display apparatus according to the present invention, the opening is a slit, the groove part has first and second groove parts which are disposed in a series shape and have depths different from each other, and an inclined part which connects respective bottoms of the first and second groove parts, and the protrusion part has a height which is an intermediate length of a distance between the inner surface of the frame body or the outer surface of the backlight housing body and the respective bottoms of the first and second groove parts.

In the liquid crystal display apparatus according to the present invention, the frame body is configured to be divided into four linear frame members, and the frame members are each an extrusion-molded product.

In the liquid crystal display apparatus according to the present invention, the outer surface of the backlight housing body is provided with the protrusion part, the inner surface of the frame body is provided with the groove part, the frame body has a flat part which is cut more deeply than the groove part in one end direction of the groove part, and an inclined part which connects the flat part and the bottom of the groove part, wherein the protrusion part has a height which is an intermediate length of a distance between the outer surface of the backlight housing body and the bottom of the groove part and the flat part.

According to another aspect of the present invention, there is provided a display apparatus which includes a display panel to display an image, and a frame body which covers a periphery of the display panel, wherein the frame body includes a plurality of frame members extending along an edge of the display panel, wherein one frame member includes a panel insertion groove extending in a longitudinal direction in which an edge portion of the display panel is inserted, and a fitting concave part which is formed in an end part of the panel insertion groove, and is fitted to the other frame member, and the other frame member is provided with a protrusion part which is fitted to the fitting concave part on an end part thereof.

In the display apparatus according to the present invention, the protrusion part has a sharp end portion, and the fitting concave part is formed in the inner surface of the panel insertion groove, and is formed in a V shape corresponding to the sharp end portion.

In the display apparatus according to the present invention, the sharp end portion is an arc-shaped sharp end protrusion which protrudes from an outer peripheral surface of an end part of the other frame member, and the fitting concave part is formed in a groove shape having a V-shaped cross section, which extends in a U shape over the bottom and both sides of the panel insertion groove.

In the display apparatus according to the present invention, the fitting concave part is formed on the side of the panel insertion groove, and an opposing distance between the both sides of the fitting concave part becomes shorter toward a bottom side of the panel insertion groove.

In the display apparatus according to the present invention, the display panel is formed in a rectangular shape, and the fitting concave part has an inclined face which is inclined in a direction intersecting two peripheral surfaces of the display panel orthogonal to each other.

In the display apparatus according to the present invention, the fitting concave part and the protrusion part are provided in a direction orthogonal to the longitudinal direction of the other frame member, the protrusion part is provided on the inner surface of the panel insertion groove in the other frame member, and the protrusion part is fitted to the fitting concave part on the inside of the panel insertion groove in the other frame member.

In the display apparatus according to the present invention, one side of the panel insertion groove in the respective one and the other frame members is provided with the fitting concave part and the protrusion part, and the other side of the panel insertion groove facing the one side in the respective one and the other frame members is provided with a guide concave part and a guide convex part which guide the fitting by the fitting concave part and the protrusion part.

According to the liquid crystal display apparatus according to the present invention, it is possible to achieve the weight lightening, thinning and narrowing of the frame.

According to the liquid crystal display apparatus according to the present invention, it is possible to achieve the weight lightening, thinning and narrowing of the frame by eliminating the connecting member.

According to the liquid crystal display apparatus according to the present invention, it is possible to reduce a locking structure and fixing members for fixing component members and improve efficiency of assembly.

According to the liquid crystal display apparatus according to the present invention, the fitting concave part is formed in the panel insertion groove of one frame member, and a protrusion part of an end portion of the other frame member is fitted to the fitting concave part, thereby preventing a gap from being formed therein, such that the entry of dust and light leakage can be prevented, and appearance quality can be improved.

The above and further objects and features will more fully be apparent from the following detailed description with accompanying drawings.

BRIEF DESCRIPTION OF THE DRAWINGS

FIG. 7 is an explanatory view illustrating a method of attaching the frame body to the backlight chassis and the like.

FIG. 9 is a partial exploded perspective view of the television receiver.

FIG. 13A is an explanatory view illustrating a method of fixing a lower frame to the backlight chassis.

FIG. 19A is an explanatory view illustrating an attaching process of the side frame.

FIG. 19B is an explanatory view illustrating the attaching process of the side frame.

FIG. 19D is an explanatory view illustrating the attaching process of the side frame.

FIG. 19E is an explanatory view illustrating the attaching process of the side frame.

DETAILED DESCRIPTION

A liquid crystal display apparatus or a display apparatus of one embodiment according to the present invention includes a television receiver, an electronic blackboard, a monitor used by connecting to a tuner, a monitor used by connecting to a computer, and a display used by connecting to a digital signage. In addition, the liquid crystal display apparatus or the display apparatus of one embodiment according to the present invention includes a display used in a table type computer and a portable telephone. Hereinafter, as one example of the liquid crystal display apparatus or the display apparatus, the television receiver will be described with reference to the accompanying drawings relating to the embodiments thereof.

Embodiment 1

Figure 1:
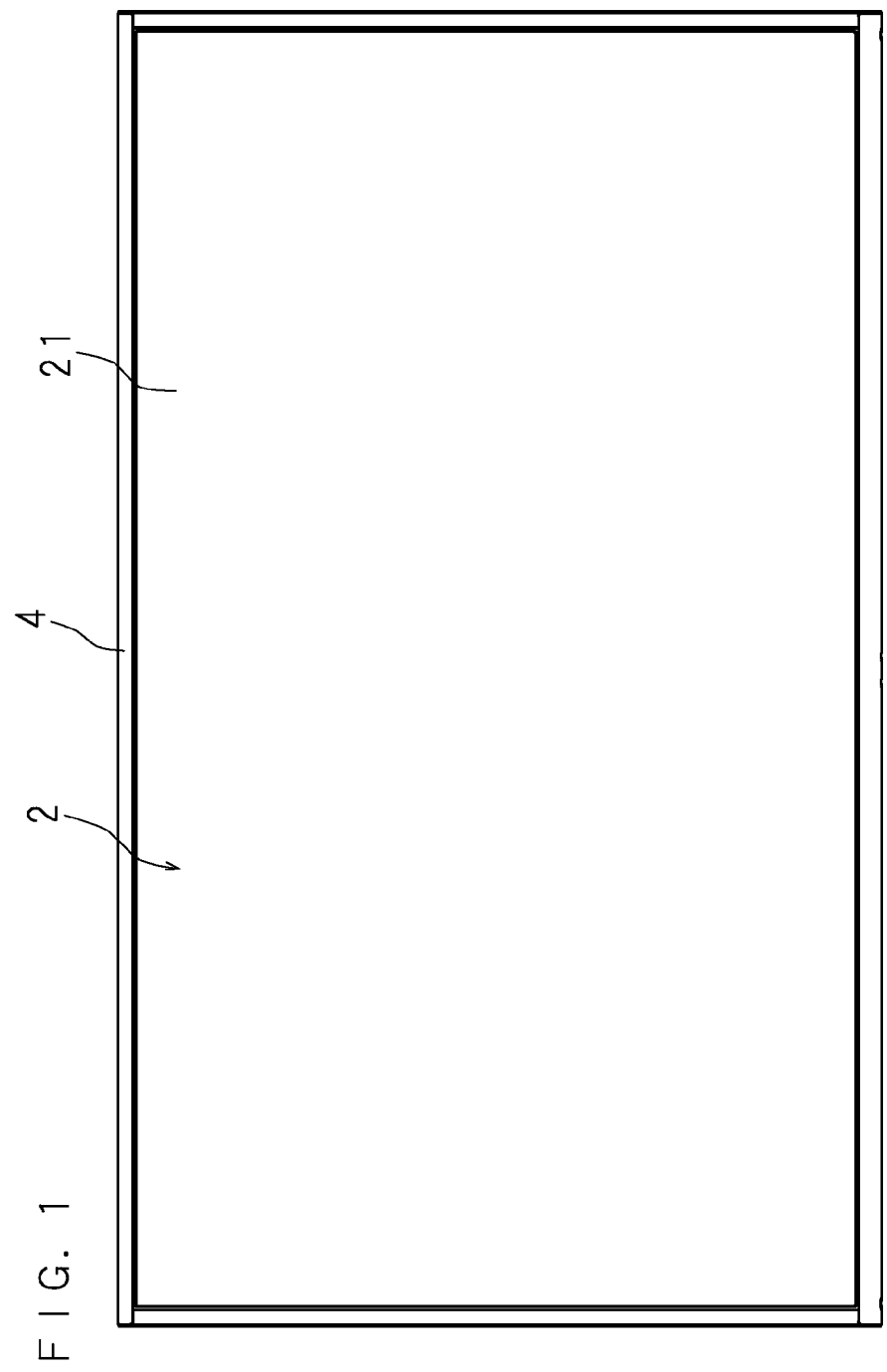
FIG. 1 is a front view of a television receiver.
Figure 2:
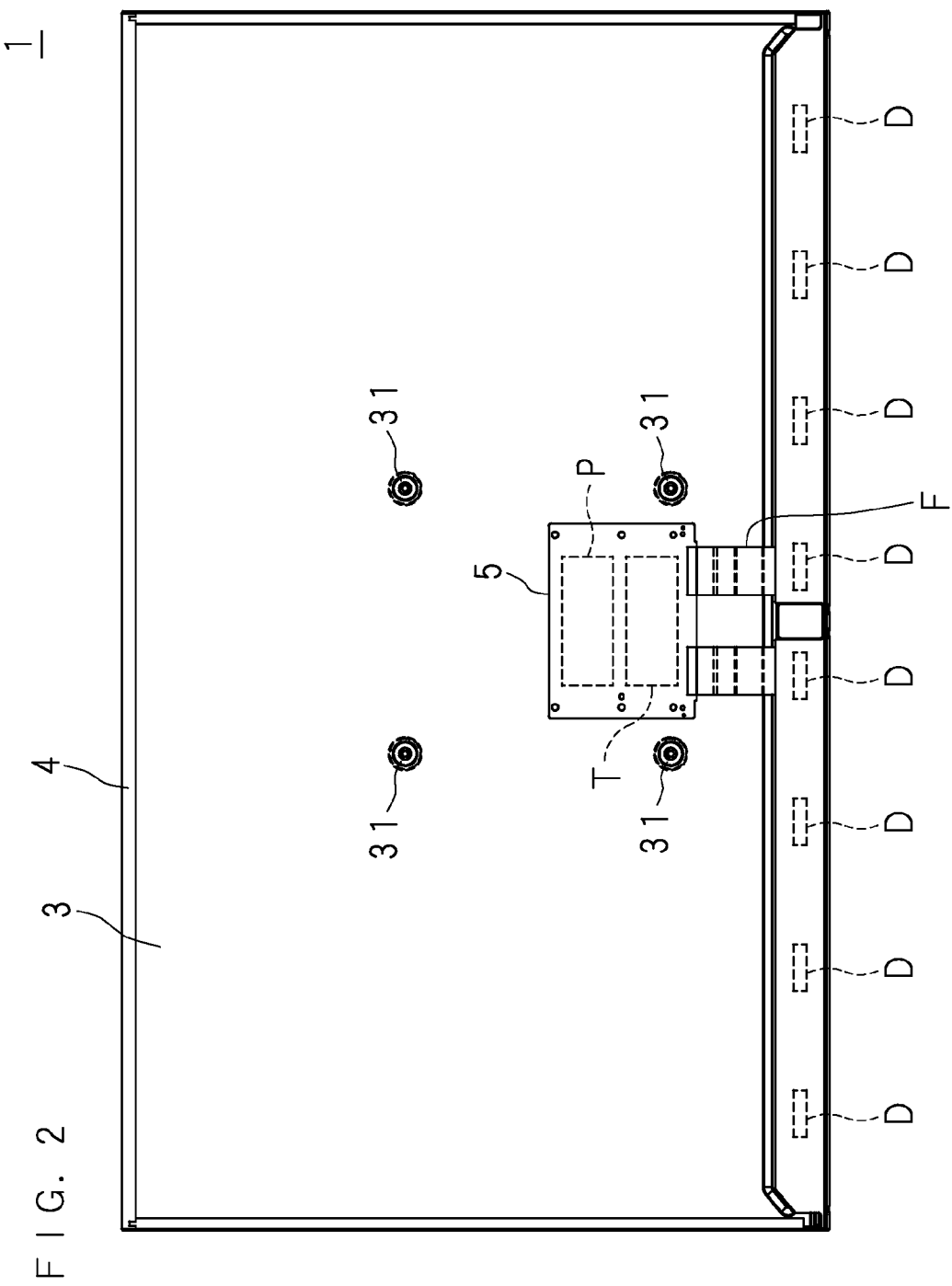
FIG. 2 is a rear view of the television receiver.

FIG. 1 is a front view of a television receiver 1. FIG. 2 is a rear view of the television receiver 1. Herein, when a viewer faces a screen 21 which displays an image by the television receiver 1, the viewer side of the screen 21 will be referred to as a front side, and the opposite side thereof will be referred to as a rear side. The screen 21 has a laterally long and substantially rectangular shape. From a viewer's position of facing the screen 21, the right side of the screen 21 in a longitudinal direction thereof will be referred to as a right side of the television receiver 1, and the left side of the screen 21 in the longitudinal direction thereof will be referred to as a left side of the television receiver 1. Further, in the vertically oriented screen 21, the upper side of the screen 21 in a lateral direction thereof will be referred to as a top side of the television receiver 1, and the lower side of the screen 21 in the lateral direction thereof will be referred to as a lower side of the television receiver 1.

The television receiver 1 includes a liquid crystal panel 2, a backlight chassis (backlight housing body) 3 and a frame body 4. The liquid crystal panel 2 has the screen 21 on the front side, and displays an image on the screen 21. The backlight chassis 3 is a box-shaped board for assembling internal parts (see FIG. 4) of the television receiver 1, and also serves as a role of a back cabinet covering the rear side of the television receiver 1. The backlight chassis 3 is made of iron, aluminum or copper, and formed by pressing.

The backlight chassis 3 includes four caulking bosses 31. The caulking boss 31 is a member used when installing the television receiver 1 on a wall. The caulking bosses 31 are provided at central region in a rear surface of the backlight chassis 3 as a self clinching fastener by press molding, for example. A shape connecting each caulking boss 31 is formed in a rectangular shape.

The frame body 4 is formed in a laterally long rectangular shape, and covers a front peripheral edge part, a rear peripheral edge part, and side parts of the television receiver 1. The liquid crystal panel 2, the backlight chassis 3, and the internal parts of the television receiver 1 are sandwiched by the frame body 4. When seeing the television receiver 1 from the front, the frame body 4 also plays a role of a frame to rim the periphery of the screen 21. A material of the frame body 4 is, for example, aluminum, a synthetic resin or a composite material such as carbon fiber reinforced plastic or glass fiber reinforced plastic and the like.

The television receiver 1 includes a power board P, a receiving unit T, a liquid crystal drive board D and a board cover 5 (FIG. 2). The power board P and the receiving unit T are disposed at a rear surface lower part of the backlight chassis 3, and covered by the board cover 5 of substantially rectangular shape. The power board P supplies power to each component of the television receiver 1. The receiving unit T receives an image signal relating to television broadcasts.

For example, eight liquid crystal drive boards D are provided, and each liquid crystal drive board is disposed at a front lower end portion of the backlight chassis 3 in a linear shape. The liquid crystal drive boards D are covered with a lower part rear surface of the frame body 4. The power board P and the receiving unit T and the like, and the liquid crystal drive board D are connected with each other by a wiring mounted on a flexible board F.

Figure 3:
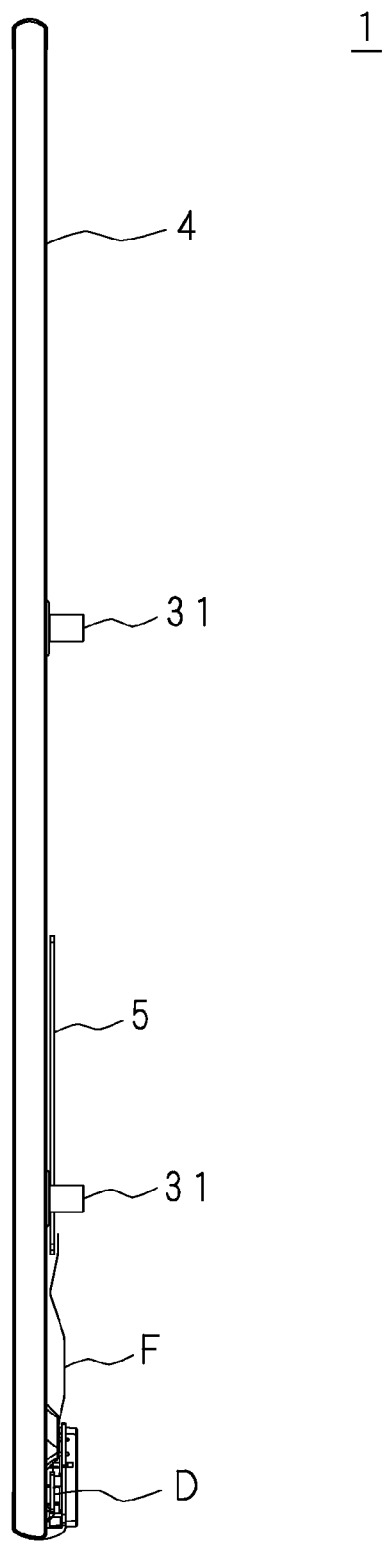
FIG. 3 is a right side view of the television receiver.

FIG. 3 is a right side view of the television receiver 1. The backlight chassis 3 and the frame body 4 also play a role of a casing exposed to an outside, thereby achieving thinning of the television receiver 1 that is unprecedented.

Figure 4:
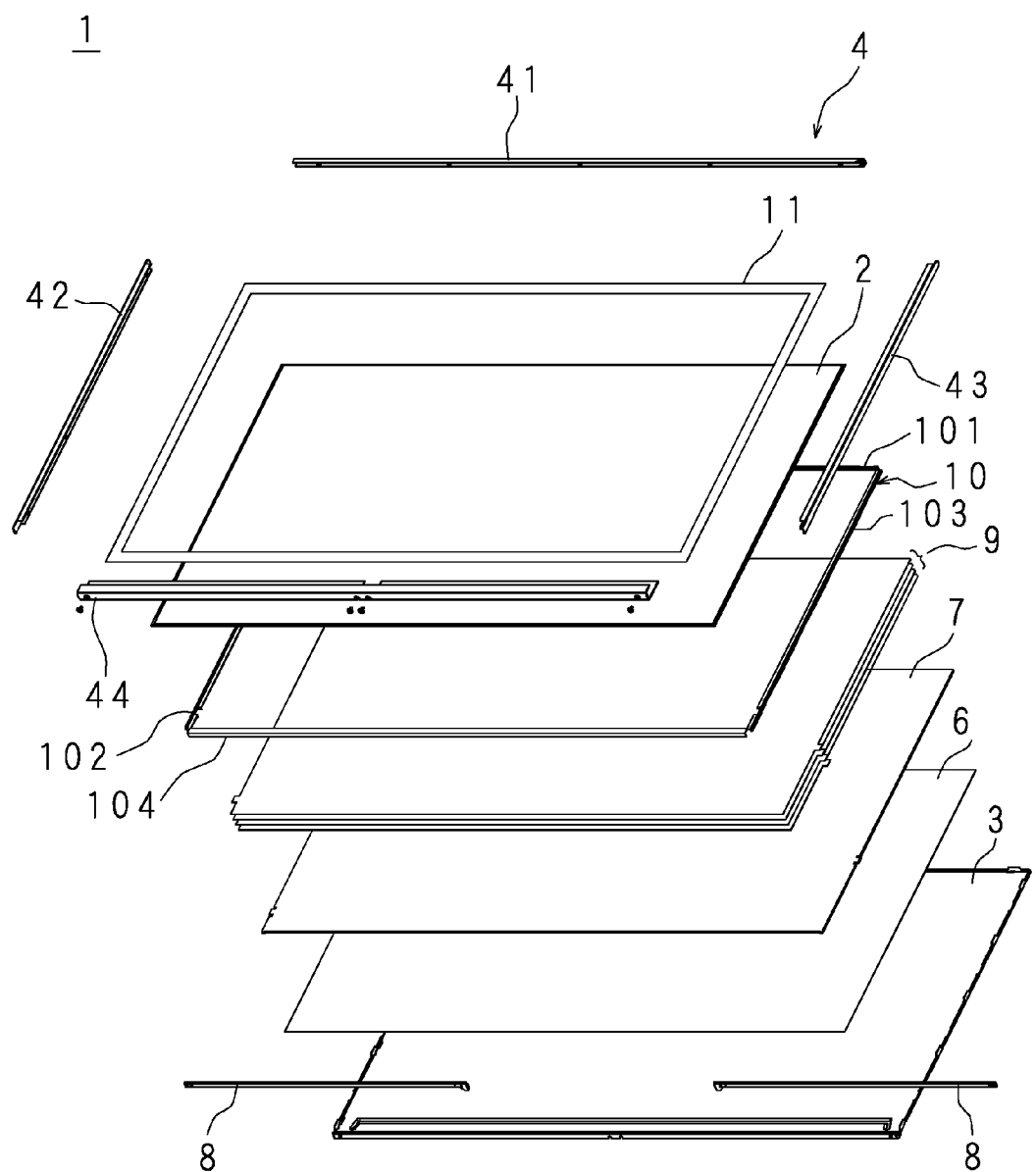
FIG. 4 is an exploded perspective view of the television receiver.

FIG. 4 is an exploded perspective view of the television receiver 1. FIG. 4 illustrates a state in which the components of the television receiver 1 are seen obliquely from the lower right. The television receiver 1 includes the backlight chassis 3, a reflective sheet 6, a light guide plate 7, an LED substrate 8, an optical sheet 9, a light shielding holder (light shielding frame body) 10, the liquid crystal panel 2, a panel cover (cover frame body) 11 and the frame body 4. The frame body 4 can be divided into four members, which can be united into one frame. In a step before attaching to the television receiver 1, the frame body 4 is divided into four members including an upper frame 41, a lower frame 44, and two side frames 42 and 43.

Figure 5A:
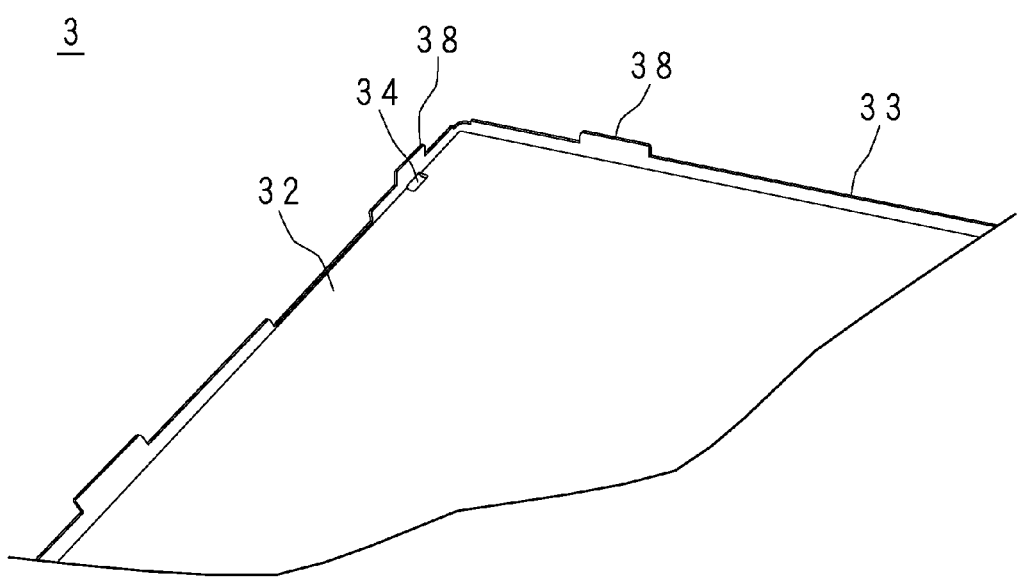
FIG. 5A is a partial perspective view of a backlight chassis.

FIG. 5A is a partial perspective view of backlight chassis 3. FIG. 5A illustrates a state in which an upper right corner portion of the backlight chassis 3 is seen obliquely from the front lower left. The backlight chassis 3 is a box or a tray whose front surface is opened, and includes a bottom plate 32 and a side plate 33. The side plate 33 is bent to the front side by press molding, for example, in each of the four sides of the bottom plate 32.

Figure 5B:
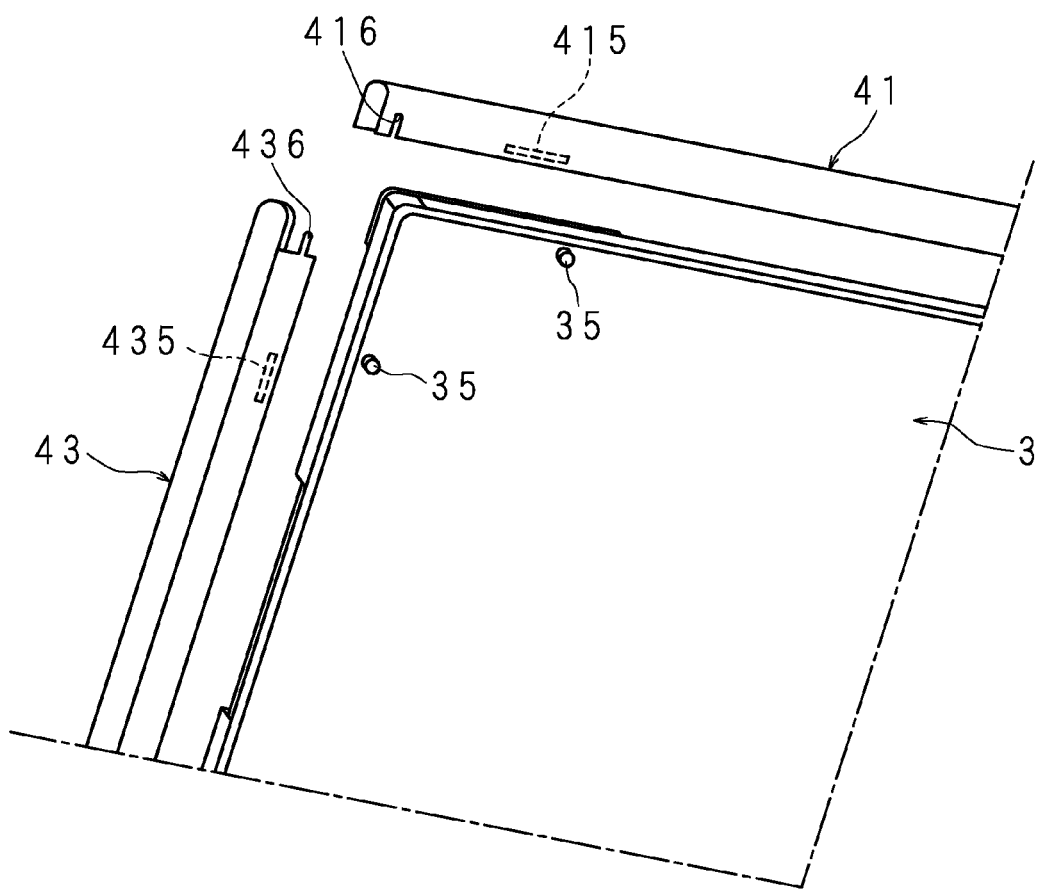
FIG. 5B is a partial perspective view of the television receiver in a step before attaching a frame body.

FIG. 5B is a partial perspective view of the television receiver 1 in the step before attaching the frame body 4. FIG. 5B illustrates a state in which an upper left corner portion of the television receiver 1 is seen obliquely from the rear upper left. The backlight chassis 3 includes protrusion parts 35. The protrusion part 35 is a cylindrical projection provided by press molding as a self clinching pin, for example. In FIG. 5B, two protrusion parts 35 are provided on the upper left corner portion of the rear surface of the bottom plate 32 of the backlight chassis 3. Another two protrusion parts 35 are provided on an upper right corner portion of the rear surface of the bottom plate 32 of the backlight chassis 3. Also, another two protrusion parts 35 are provided on a lower left side portion and a lower right side portion of the rear surface of the bottom plate 32 of the backlight chassis 3. As a result, the protrusion parts 35 are provided at a total of six places in the rear peripheral edge part of the bottom plate 32 one by one.

The LED substrate 8 is a member formed in an elongated rectangular shape, and made of a synthetic resin, for example. The LED substrate 8 is disposed between an inner surface of the lower side plate 33 of the backlight chassis 3 and a lower side of the light guide plate 7 (see FIG. 8B). As illustrated in FIG. 4, the LED substrate 8 includes two symmetrical substrates, which are disposed so as to face a left half and a right half of the lower side of the light guide plate 7, respectively.

The reflective sheet 6, the light guide plate 7 and the LED substrate 8 are parts forming the backlight of the television receiver 1. A plurality of LEDs 8a are mounted on the LED substrate 8 on a side facing the lower side of the light guide plate 7 (see FIG. 8B). The plurality of LEDs 8a are arranged at substantially equal intervals in the direction substantially identical to the longitudinal direction of the LED substrate 8.

The reflective sheet 6 is formed in a substantially rectangular shape corresponding to the bottom plate 32 of the backlight chassis 3. The reflective sheet 6 is made of a synthetic resin having a high reflectivity, for example. In order to effectively use light emitted from the light guide plate 7 to the rear side, the reflective sheet 6 reflects the light to the front side.

The light guide plate 7 is a plate having rectangular front and rear surfaces, and made of an acrylic resin, for example. A size of the light guide plate 7 is substantially the same as the size of the optical sheet 9 and the liquid crystal panel 2. The light guide plate 7 diffuses the incident light from the LEDs 8a disposed to face the lower side thereof, and emits the diffused light from the front surface to the optical sheet 9 and the liquid crystal panel 2.

The optical sheet 9 is a substantially rectangular sheet. A size of the optical sheet 9 is substantially the same as the size of the front surface of the light guide plate 7, but more precisely, slightly smaller than that of the front surface of the light guide plate 7. The optical sheet 9 includes, for example, one reflective polarizing sheet, one diffusion sheet and two prism sheets. The reflective polarizing sheet, for example, has a multi-layer structure in which layers having different refractive indices from each other are alternately laminated, and separates the light with enhanced directivity into p and s-waves, then selectively allows only the p-waves to transmit therethrough and selectively reflects the s-waves. The diffusion sheet diffuses the light. The prism sheet includes a plurality of lenses arranged adjacent to each other, and controls a traveling direction of the light. Further, the optical sheet 9 may include a viewing angle expansion sheet for expanding the range of a visual angle so as to obtain excellent display performance.

Figure 6:
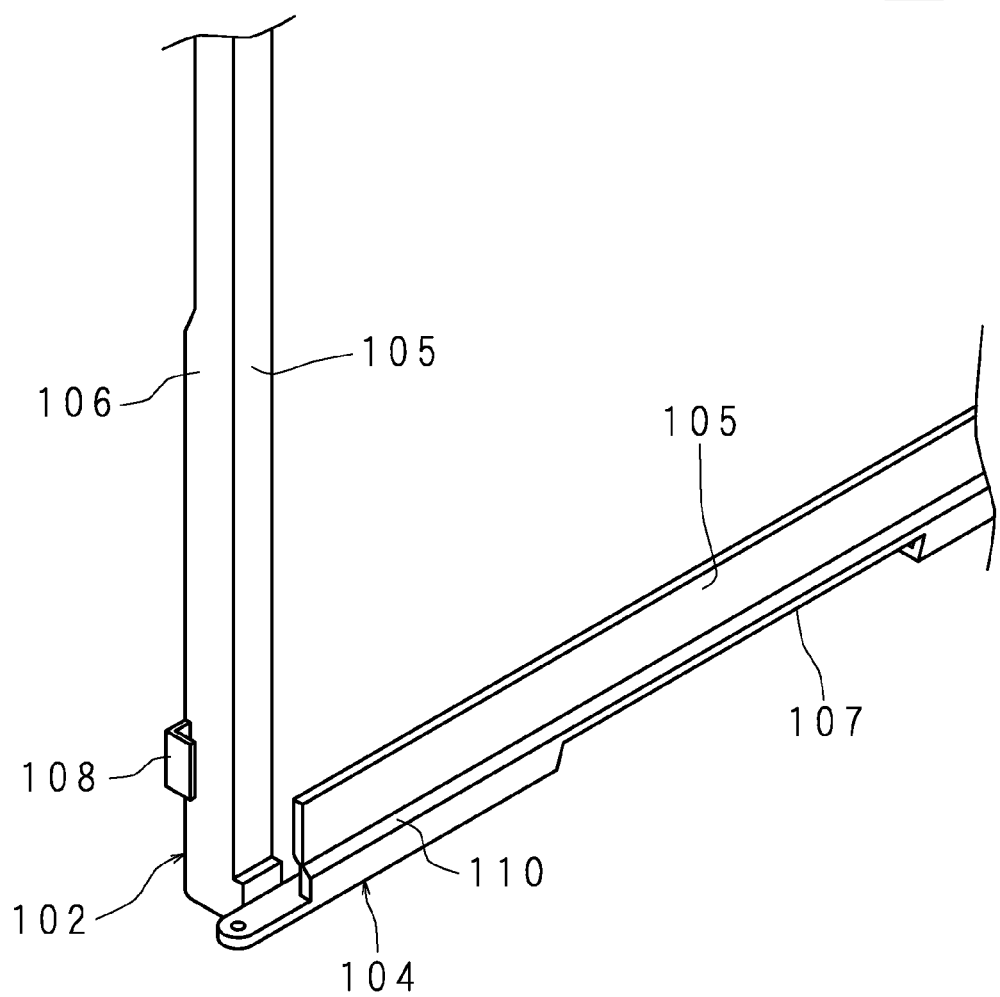
FIG. 6 is a partial perspective view of a light shielding holder.

FIG. 6 is a partial perspective view of the light shielding holder 10. FIG. 6 illustrates a state in which a lower left corner portion of the light shielding holder 10 is seen obliquely from the front upper left. As illustrated in FIG. 4, the light shielding holder 10 includes a linear upper frame 101, two side frames 102 and 103, and a lower frame 104, which are united into a rectangular frame when assembling the television receiver 1. FIG. 6 partially illustrates a state in which the left side frame 102 as seen from the front side and the lower frame 104 are united.

The light shielding holder 10 is a rectangular frame to prevent the light emitted from the light guide plate 7 from being leaked outside of the television receiver 1. The light shielding holder 10 may be made of a material such as a synthetic resin, for example. The light shielding holder 10 includes a front wall 105 and a side wall 106. The front wall 105 is a flat plate-shaped member covering a front peripheral edge part of the light guide plate 7. A thickness of the front wall 105 is substantially the same as the thickness of the optical sheet 9. The side wall 106 is a flat plate-shaped member abutting outer or inner surfaces of the side plate 33 of the backlight chassis 3, and bent or curved to the rear side from the outer peripheral edge of the front wall 105. The light shielding holder 10 has a substantially L-shaped cross section.

Further, in FIG. 6, the lower frame 104 of the light shielding holder 10 is provided with a notch 107 seen in the front wall 105 for inserting a flexible board (not illustrated) which connects liquid crystal drive boards D with the liquid crystal panel 2. In addition, in FIG. 6, the side frame 102 of the light shielding holder 10 is provided with a projection 108 seen at a lower part thereof, which is a portion which is fitted to an opening 34 seen around a corner of the backlight chassis 3 illustrated in FIG. 5A, for example. When the projection 108 is fitted to the opening 34, the light shielding holder 10 is locked to the backlight chassis 3. The projection 108 of the light shielding holder 10 and the opening 34 of the backlight chassis 3 are respectively provided around the upper and lower ends of the light shielding holder 10 and backlight chassis 3 on left and right sides thereof one by one.

The panel cover 11 is a rectangular frame body covering a front peripheral edge part of the liquid crystal panel 2 (FIG. 4). The panel cover 11 is made of a material such as a synthetic resin, for example. In order to sandwich the backlight chassis 3, the reflective sheet 6, the light guide plate 7, the optical sheet 9, and the liquid crystal panel 2 by the frame body 4, when attaching the frame body 4 to the backlight chassis 3 and the like, the divided linear frame body 4 is slid in a circumferential direction of the liquid crystal panel 2 as described below. In this case, the panel cover 11 has a function to protect the liquid crystal panel 2, so as to prevent the liquid crystal panel 2 from being damaged due to sliding the frame body 4.

The frame body 4 includes the upper frame 41, the two side frames 42 and 43 and the lower frame 44 (FIG. 4). The upper frame 41, two side frames 42 and 43, and lower frame 44 are, respectively, substantially elongated linear frame members formed by extrusion molding, for example. The upper frame 41 is a frame member forming the upper part of the frame body 4. The side frames 42 and 43 are frame members forming the sides of the frame body 4. The lower frame 44 is a frame member forming the lower part of the frame body 4. When assembling the television receiver 1, as described below, the upper frame 41, the two side frames 42 and 43 and the lower frame 44 are configured so as to be united as a frame for rimming the television receiver 1. The frame body 4 has a U-shaped cross section opened inward (FIG. 5B).

Next, an assembling method of the television receiver 1 will be briefly described. In order to assemble the television receiver 1, the reflective sheet 6, the light guide plate 7, the optical sheet 9, the light shielding holder 10, the liquid crystal panel 2, and the panel cover 11 are sequentially laminated on an inner bottom surface of the backlight chassis 3 from the rear side to the front side. Then, a lamination from the backlight chassis 3 to the panel cover 11, in which the reflective sheet 6 and the like is laminated, is sandwiched by the upper frame 41, the two side frames 42 and 43 and the lower frame 44.

FIG. 7 is an explanatory view illustrating a method of attaching the frame body 4 to the backlight chassis 3 and the like. FIG. 7 illustrates a state of attaching the upper frame 41, the two side frames 42 and 43 and the lower frame 44 to the backlight chassis 3 and the like. In FIG. 7, the caulking bosses 31 and the like, which are provided on the rear surface of the backlight chassis 3, will not be illustrated. Arrows in FIG. 7 illustrate a moving direction during attaching the upper frame 41, the two side frames 42 and 43 and the lower frame 44 to the backlight chassis 3 and the like. However, arrows denoting screws N illustrate an insertion direction of the screws N.

The upper frame 41 and the two side frames 42 and 43 are respectively provided with groove parts 415, 425 and 435 to which the protrusion parts 35 of the backlight chassis 3 are fitted. When sandwiching the backlight chassis 3 and the like by the upper frame 41 and the two side frames 42 and 43, by fitting the groove parts 415, 425 and 435 to the protrusion parts 35, the upper frame 41 and the two side frames 42 and 43 are fixed to the backlight chassis 3. Then, with the protrusion parts 35 being fitted to the groove parts 415, 425 and 435, the upper frame 41 and the two side frames 42 and 43 are slid in a direction substantially parallel to the circumferential direction of the backlight chassis 3. Thereby, the upper frame 41 and the two side frames 42 and 43 are united.

The backlight chassis 3 and the like is sandwiched by the lower frame 44. Thereby, the frame body 4 becomes to be in a united state. In this state, the component members of the television receiver 1 are temporarily fixed thereto. Finally, by fastening the four screws N inserted from the lower side of the lower frame 44, the component members of the television receiver 1 are permanently fixed thereto.

Figure 8A:
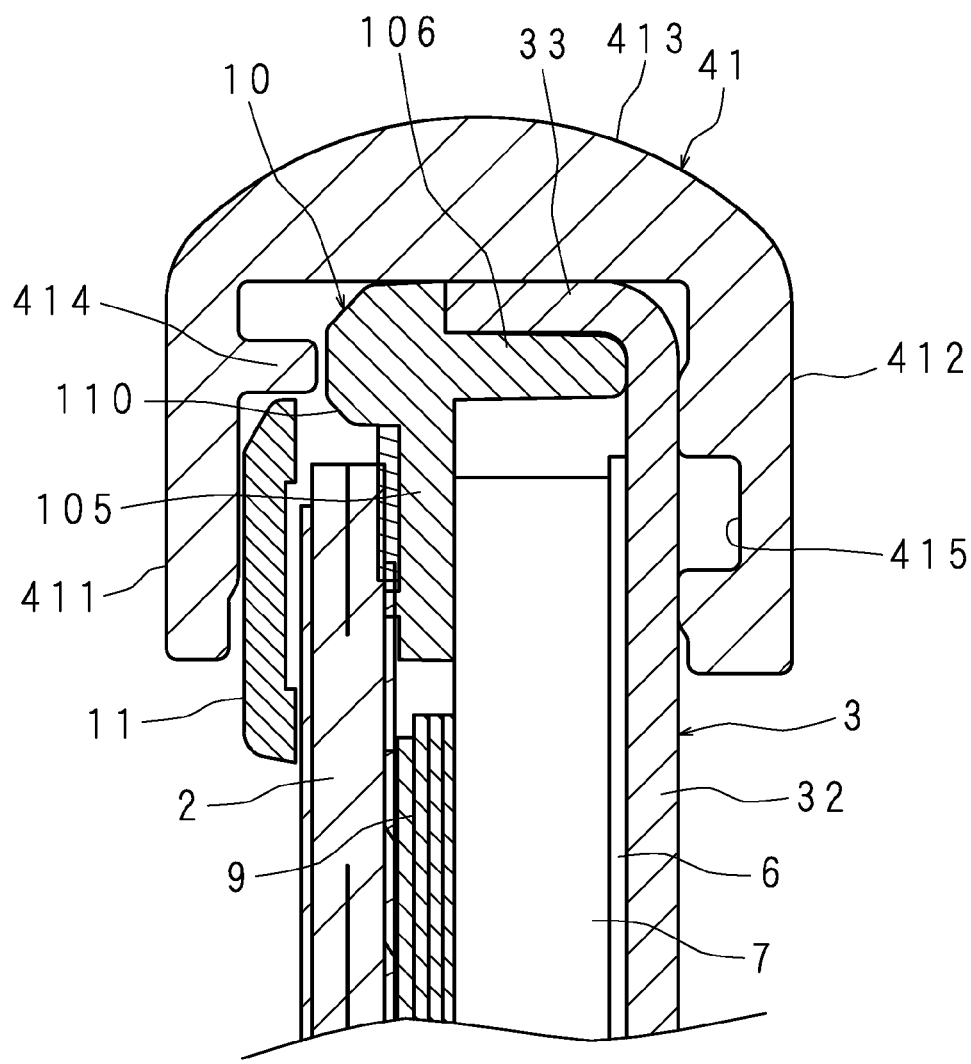
FIG. 8A is a partial cross-sectional view of the television receiver.
Figure 8B:
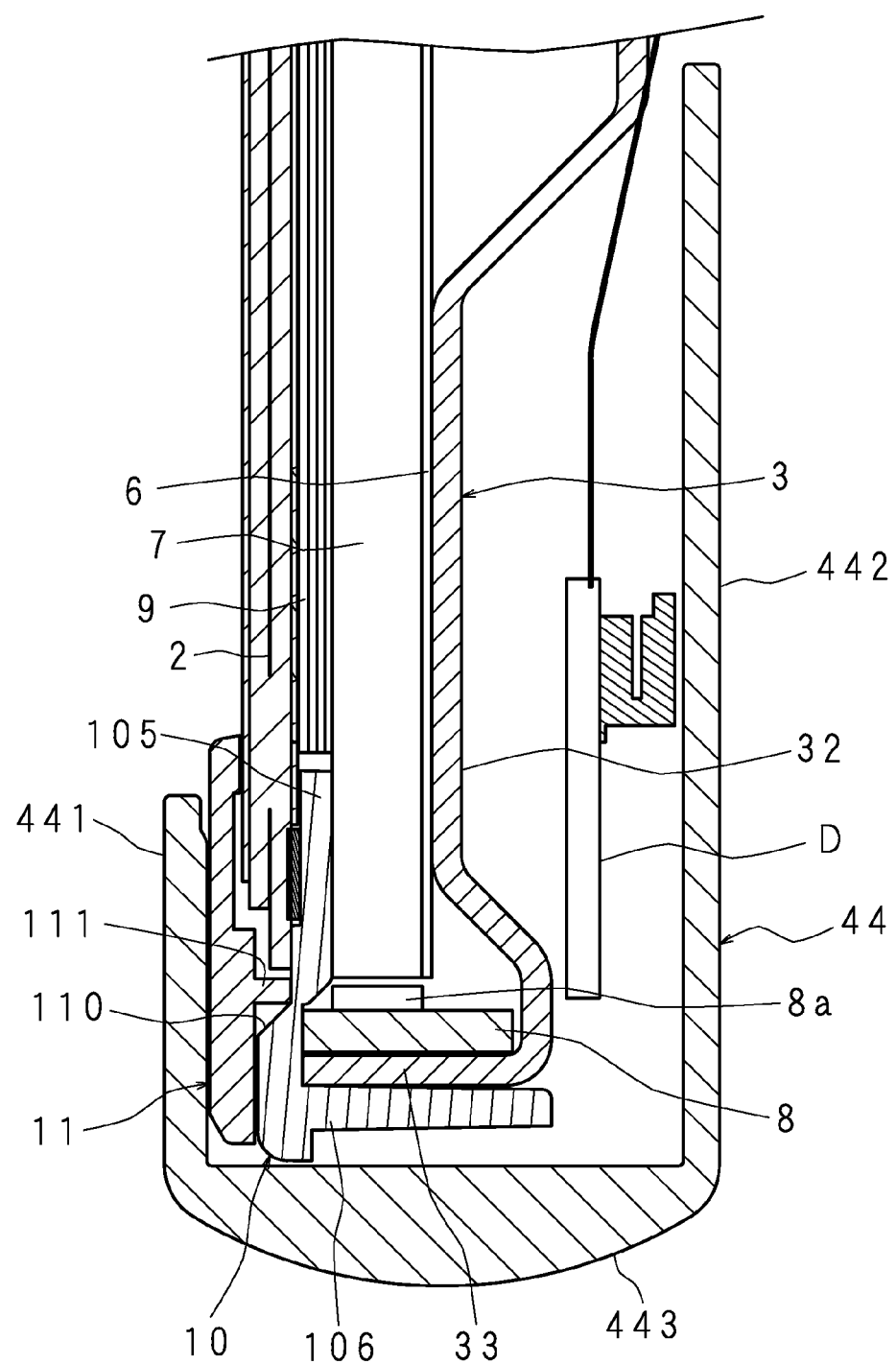
FIG. 8B is a partial cross-sectional view of the television receiver.
Figure 8C:
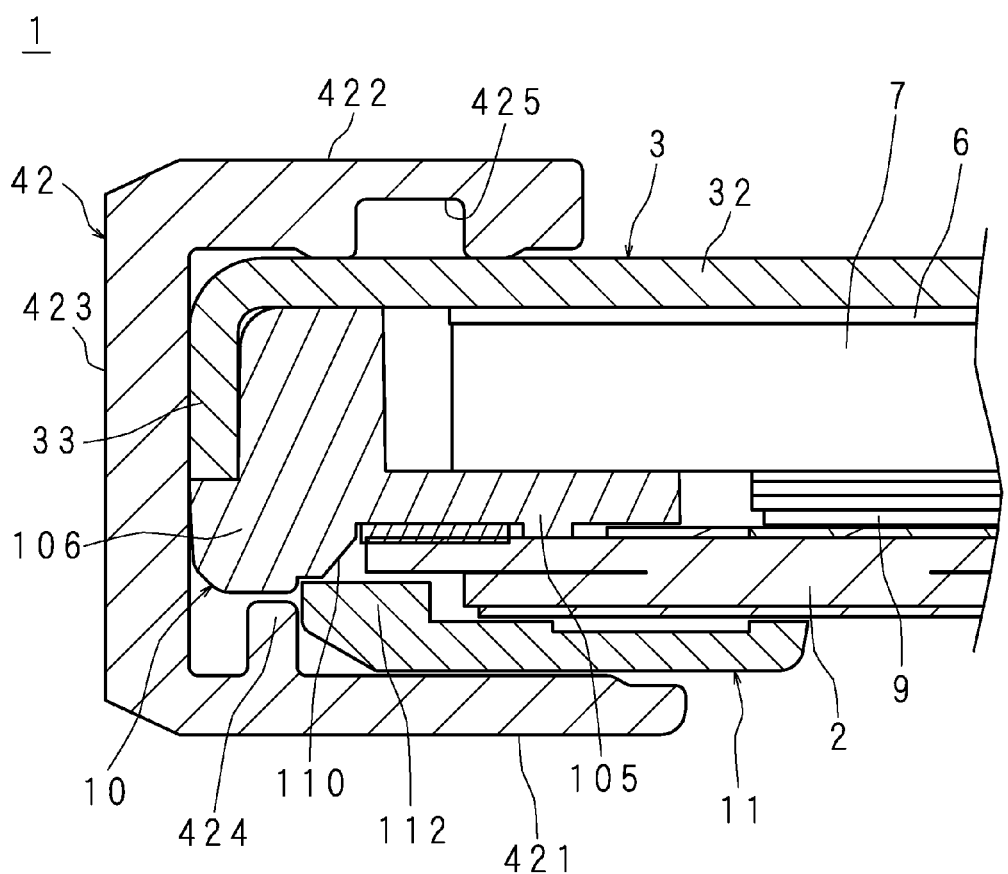
FIG. 8C is a partial cross-sectional view of the television receiver.
Figure 8D:
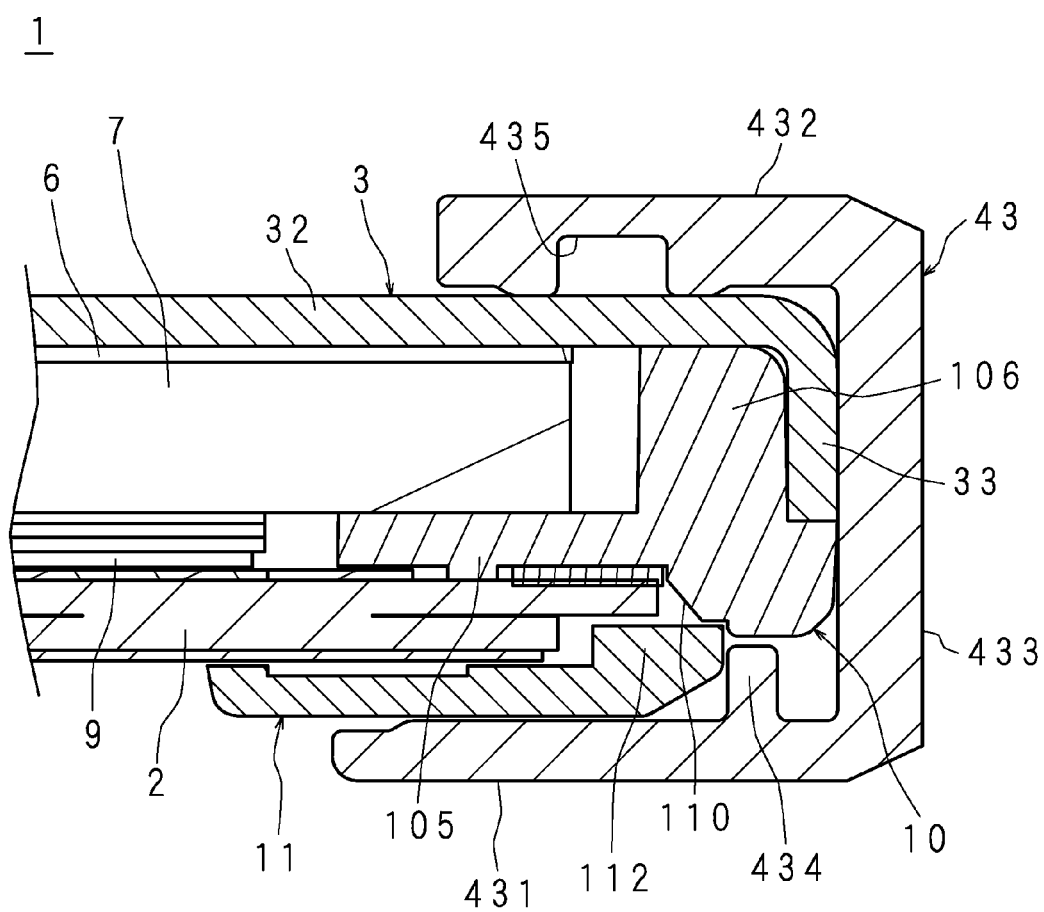
FIG. 8D is a partial cross-sectional view of the television receiver.

FIGS. 8A, 8B, 8C to 8D are partial cross-sectional views of the television receiver 1. FIG. 8A is a side cross-sectional view in the upper part of the television receiver 1. FIG. 8B is a lower side cross-sectional view of the television receiver 1. In FIGS. 8A and 8B, the left corresponds to the front side of the television receiver 1, and the right corresponds to the rear side of the television receiver 1. FIG. 8C is a top cross-sectional view of the television receiver 1 in the left part thereof. FIG. 8D is a top cross-sectional view of the television receiver 1 in the right part thereof. In FIGS. 8C and 8D, the bottom corresponds to the front side of the television receiver 1, and the top corresponds to the rear side of the television receiver 1.

The side wall 106 in the lower frame 104 of the light shielding holder 10 abuts an outer surface of the side plate 33 of the backlight chassis 3 (FIG. 8B). The side walls 106 in the upper frame 101 and the two side frames 102 and 103 of the light shielding holder 10 abut an inner surface of the side plate 33 of the backlight chassis 3 (FIGS. 8A, 8C and 8D). In the cross-section of the light shielding holder 10, the corner having a substantially L shape is located around a front tip in the side plate 33 of the backlight chassis 3.

As described above, the thickness of the front wall 105 in the light shielding holder 10 is substantially the same as the thickness of the optical sheet 9. In addition, the size of the optical sheet 9 is slightly smaller than the size of the front surface of the light guide plate 7. The front peripheral edge part of the light guide plate 7 which is not covered with the optical sheet 9 is covered with the front wall 105 of the light shielding holder 10.

The light shielding holder 10 has a function to press the light guide plate 7 from the front side to the rear side by the front wall 105, when each part is fixed by assembling the television receiver 1, other than the function to shield the light from the light guide plate 7. In addition, the light shielding holder 10 has a function to position the light guide plate 7 and the optical sheet 9 in a vertical direction, and a function to hold the positioned light guide plate and the optical sheet in a vertical position.

FIG. 9 is a partial exploded perspective view of the television receiver 1. FIG. 9 is an exploded perspective view by enlarging the lower right corner portion for the exploded backlight chassis 3, the light guide plate 7, and the light shielding holder 10, and illustrates a state in which the backlight chassis 3, the light guide plate 7, and the light shielding holder 10 are seen obliquely from the front lower right.

The light guide plate 7 includes a protrusion part 71. The protrusion part 71 is a projection protruding outwardly from the lower part of the right side of the light guide plate 7, and has a substantially rectangular shape. When the light guide plate 7 and the optical sheet 9 are laminated for assembling the television receiver 1, a protrusion part (not illustrated) is also provided on the optical sheet 9 at a position which overlaps with the protrusion part 71 of the light guide plate 7. The size and shape of the protrusion part 71 of the light guide plate 7 and the protrusion part of the optical sheet 9 are substantially the same as each other. In FIG. 9, one protrusion part 71 is illustrated. However, the protrusion part 71 is also provided on the lower part of the left side of the light guide plate 7. Similarly, the protrusion part of the optical sheet 9 is also provided on the lower left end portion of the optical sheet 9.

The light shielding holder 10 includes an engaging notch part 109. The engaging notch part 109 is provided in a lower part of the side frame of the light shielding holder 10, aside from the notch 107. The engaging notch part 109 is configured, when the light guide plate 7, the optical sheet 9 and the light shielding holder 10 are laminated for assembling the television receiver 1, to engage the protrusion part 71 of the light guide plate 7 with the protrusion part of the optical sheet 9. Thereby, the engaging notch part 109 of the light shielding holder 10 positions the light guide plate 7 and the optical sheet 9 in the vertical direction. In FIG. 9, one engaging notch part 109 is illustrated. However, the engaging notch part 109 is also provided in the lower part of the right side frame of the light shielding holder 10.

After the optical sheet 9 is overlapped on the light guide plate 7, when attaching the light shielding holder 10, the light guide plate 7 and the optical sheet 9 may be shifted from a correct position in the vertical direction. The projection 108 of the light shielding holder 10 is fitted to the opening 34 of the backlight chassis 3, thereby the light shielding holder 10 is locked to the backlight chassis 3. In this case, in order that the protrusion part 71 of the light guide plate 7 and the protrusion part of the optical sheet 9 are engaged to the engaging notch part 109, the light guide plate 7 and the optical sheet 9 are pressed by the light shielding holder 10 to be attached in the vertical direction so as to move the light guide plate 7 and the optical sheet 9 to the correct position.

In the above description, after the light guide plate 7 and the optical sheet 9 are assembled to the television receiver 1, the light shielding holder 10 is attached. However, after the light shielding holder 10 is attached to the peripheral edge parts of the backlight chassis 3 and the light guide plate 7, the optical sheet 9 may be placed on the front surface of the light guide plate 7. In this case, the optical sheet 9 is placed on the light guide plate 7, so as to be fitted into the engaging notch part 109 of the light shielding holder 10. Then, the optical sheet 9 is placed on the light guide plate 7, so that the protrusion part of the optical sheet 9 is engaged to the engaging notch part 109 of the light shielding holder 10.

A lateral side in the engaging notch part 109 is fitted to a surface substantially parallel to a lateral direction in the engaged protrusion part 71 of the light guide plate 7 and the protrusion part of the optical sheet 9. Thereby, the engaging notch part 109 of the light shielding holder 10 can hold the light guide plate 7 and the optical sheet 9 at the positioned vertical position. The LED substrate 8 on which the LEDs 8a for making light incident to the lower side of the light guide plate 7 are mounted is disposed under the light guide plate 7. A distance between the LEDs 8a and the light guide plate 7 is one of the factors affecting uniformity of the light incident on the light guide plate 7, and as far as possible, maintaining a prescribed length is required. In this regard, in order to hold the light guide plate 7 at the positioned vertical position, the engaging notch part 109 of the light shielding holder 10 contributes to the uniformity of the incident light which is directed to the light guide plate 7.

In addition, when assembling the television receiver 1, the light shielding holder 10 has a function to position the liquid crystal panel 2 in horizontal and vertical directions. Positioning of the liquid crystal panel 2 is performed when the liquid crystal panel 2 is disposed to the front side of the front wall 105 in the light shielding holder 10. The front wall 105 of the light shielding holder 10 covering the front peripheral edge part of the light guide plate 7 has a stepped portion which is depressed from the outside toward the inside. The stepped portion has a corner which is formed in an inclined face 110 inclining from the front side toward the rear side (FIGS. 6, 8A, 8B, 8C and 8D). With the peripheral end part of the liquid crystal panel 2 abutting the inclined face 110 of the light shielding holder 10, the liquid crystal panel 2 is disposed so as to close the opening part of the light shielding holder 10. In this case, the inclined face 110 of the light shielding holder 10 functions as a position guide for the liquid crystal panel 2.

When the liquid crystal panel 2 is disposed at a fixed position, a lower end of the liquid crystal panel 2 and the stepped part of the front wall 105 in the lower frame 104 of the light shielding holder 10 are slightly separated from each other (FIG. 8B). Therefore, an elongated groove part is formed between the lower end of the liquid crystal panel 2 and the stepped part of the front wall 105 in the lower frame 104 of the light shielding holder 10. When the liquid crystal panel 2 is disposed at the fixed position, a side end of the liquid crystal panel 2 and the stepped part of the front wall 105 in the side frame of the light shielding holder 10 are slightly separated from each other (FIGS. 8C and 8D). Therefore, an elongated groove part is formed between the side end of the liquid crystal panel 2 and the stepped part of the front walls 105 in the side frames 102 and 103 of the light shielding holder 10.

When a gap is present between the frame body 4 and the liquid crystal panel 2, there is a concern of light leakage from inside of the television receiver 1 and damage to the liquid crystal panel 2 caused by motion of the liquid crystal panel 2. Therefore, the panel cover 11 also has a function as a light shielding member for shielding the light emitted from the light guide plate 7 to the front side, and a spacer for protection of the liquid crystal panel 2. Further, the panel cover 11 may be dispensable. In this case, a cushion member for protecting the liquid crystal panel 2 may be provided in the inner surface of the frame body 4.

As described above, the panel cover 11 has a function to shield the light emitted from the light guide plate 7 to the front side. Therefore, even when the light from the light guide plate 7 cannot be completely shielded by the light shielding holder 10, the panel cover 11 can complement the shielding effect of the light shielding holder 10.

The lower part of the panel cover 11 has a T-shaped cross section (FIG. 8B). The lower part of the panel cover 11 has a substantially flat portion formed on the front side thereof corresponding to a lateral line of the T shape. The lower part of the panel cover 11 is provided with a rib 111 on the rear side thereof to be loosely fitted to a groove part formed between the lower end of the liquid crystal panel 2 and the stepped part of the light shielding holder 10. The rib 111 corresponds to a longitudinal line of the T shape. When attaching the lower part of the panel cover 11 for assembling the television receiver 1, the rib 111 of the lower part of the panel cover 11 is loosely fitted to the groove part between the lower end of the liquid crystal panel 2 and the stepped part of the lower frame 104 in the light shielding holder 10. The rib 111 is entered into the groove part between the peripheral edge of the liquid crystal panel 2 and the stepped part of the light shielding holder 10, thereby decreasing a space of the groove part. The more narrowed space portion of the groove part provides an allowance for positioning the liquid crystal panel 2 in the vertical direction, and the position of the liquid crystal panel 2 is regulated within the narrowed range of the allowance. Thereby, the panel cover 11 has a function to assist the positioning of the liquid crystal panel 2 in the vertical direction.

The side part of the panel cover 11 has an L-shaped cross section (FIGS. 8C and 8D). The side part of the panel cover 11 has a substantially flat portion formed on the front side thereof corresponding to a lateral line of the L shape. The side part of the panel cover 11 is provided with a rib 112 on the rear side thereof to be loosely fitted to a groove part formed between the side end of the liquid crystal panel 2 and the stepped part of the light shielding holder 10. The rib 112 corresponds to a longitudinal line of the L shape. When attaching the side part of the panel cover 11 for assembling the television receiver 1, the rib 112 of the side part of the panel cover 11 is loosely fitted to the groove part between the side end of the liquid crystal panel 2 and the stepped parts of the side frames 102 and 103 in the light shielding holder 10. The rib 112 is entered into the groove part between the side end of the liquid crystal panel 2 and the stepped part of the light shielding holder 10, thereby decreasing the space of the groove part. The more narrowed space portion of the groove part provides an allowance for positioning the liquid crystal panel 2 in the lateral direction, and the position of the liquid crystal panel 2 is regulated within the narrowed range of the allowance. Thereby, the panel cover 11 has a function to assist the positioning of the liquid crystal panel 2 in the lateral direction.

The upper frame 41, the side frames 42 and 43 and the lower frame 44 forming the frame body 4 respectively have front walls 411, 421, 431 and 441 located on the front side, and rear walls 412, 422, 432 and 442 located on the rear side (FIGS. 8A, 8B, 8C and 8D). In addition, the upper frame 41, the side frames 42 and 43 and the lower frame 44 respectively have side walls 413, 423 and 433 and 443 connecting between the front wall 411 and the like and the rear wall 412 and the like (FIGS. 8A, 8B, 8C and 8D).

The frame body 4 abuts the front surface of the panel cover 11 and the rear peripheral edge part of the bottom plate 32 of the backlight chassis 3 and respectively presses the front side and the rear side, thereby sandwiching the laminated the panel cover 11, the liquid crystal panel 2, the light shielding holder 10, the optical sheet 9, the light guide plate 7, the reflective sheet 6, and the backlight chassis 3 (FIGS. 8A, 8B, 8C and 8D).

The width of the side walls 413, 423 and 433 in the upper frame 41, and the side frames 42 and 43 is substantially the same as each other. The width of each side wall 413, 423 or 433 is slightly smaller than a total of the thickness of the panel cover 11, the liquid crystal panel 2, the light shielding holder 10, the optical sheet 9, the light guide plate 7, the reflective sheet 6, and the backlight chassis 3, which are sandwiched between the front wall 411 and the like and the rear wall 412 and the like. Therefore, when sandwiching the backlight chassis 3 and the like, the frame body 4 functions to hold the backlight chassis 3 and the like in a front-back direction.

The width of the side wall 443 in the lower frame 44 is larger than the width of the side walls 413, 423 and 433 in the upper frame 41, and the side frames 42 and 43. In order to provide a space for disposing the liquid crystal drive boards D between the lower frame 44 and the backlight chassis 3, the width of the side wall 443 in the lower frame 44 is larger than the width of the side walls 413, 423 and 433 in the upper frame 41, and the side frames 42 and 43.

The width of the front wall 411 and the rear wall 412 in the upper frame 41 is substantially the same as each other (FIG. 8A). However, the width of the front walls 421 and 431 in the side frames 42 and 43 is larger than the width of the rear walls 422 and 432 (FIGS. 8C and 8D). On the other hand, the width of the rear wall 442 in the lower frame 44 is larger than the width of the front wall 441 (FIG. 8B). The lower frame 44 has a J-shaped cross section. In particular, the width of the rear wall 442 of the lower frame 44 is remarkably larger than the width of the other rear walls 412, 422 and 432 (see FIG. 2). In order to cover the liquid crystal drive boards D disposed on the rear lower side of the backlight chassis 3, the width of the rear wall 442 is set to be wide. That is, the rear wall 442 of the lower frame 44 also has a function of the back cabinet covering the liquid crystal drive boards D disposed on the rear side.

The upper frame 41 and the side frames 42 and 43 include regulation ribs 414, 424 and 434. The regulation ribs 414, 424 and 434 are protrusion parts which protrude rearward from the rear surface in the front walls 411, 421 and 431, and extend in the longitudinal direction of the upper frame 41 and the side frames 42 and 43. When attaching the frame body 4 to the backlight chassis 3 and the like, the inner surfaces of the regulation ribs 414, 424 and 434 are disposed at positions facing the outer surface of the panel cover 11 at a slight interval (FIGS. 8A, 8C and 8D). Thereby, the regulation ribs 414, 424 and 434 regulate the panel cover 11 to be moved to the outside from the regulation ribs 414, 424 and 434.

When attaching the frame body 4 to the backlight chassis 3 and the like, rear tip surfaces of the regulation ribs 414, 424 and 434 are disposed at positions facing the front tip surface of the light shielding holder 10 at a slight interval (FIGS. 8A, 8C and 8D). Thereby, the regulation ribs 414, 424 and 434 regulate the light shielding holder 10 to be moved to the front side from the regulation ribs 414, 424 and 434.

The upper frame 41 and the side frames 42 and 43 include the groove parts 415, 425 and 435 (FIGS. 8A, 8C and 8D). The groove parts 415, 425 and 435 are cut in the front surface of the respective rear walls 412, 422 and 432, at a central region in a width direction of the rear walls 412, 422 and 432 along the longitudinal direction of the upper frame 41 and the side frames 42 and 43. A total of six groove parts 415, 425 and 435 are formed in both end parts of the respective upper frame 41 and the side frames 42 and 43 one by one.

When a concave part formed therein is fitted to a convex part formed on the backlight chassis 3, the frame body 4 is fixed to the backlight chassis 3. The protrusion part 35 corresponds to the convex part, and the groove parts 415, 425 and 435 correspond to the concave part. The width of the groove parts 415, 425 and 435 is slightly smaller than the diameter of the protrusion part 35. Therefore, when sandwiching the backlight chassis 3 and the like by the upper frame 41 and the side frames 42 and 43, the protrusion part 35 is fitted to the groove parts 415, 425 and 435, and the upper frame 41 and the side frames 42 and 43 are fixed to the backlight chassis 3. Further, the upper frame 41 and the side frames 42 and 43 are slid in the longitudinal direction of the groove part 415 while maintaining the fitted state to the groove parts 415, 425 and 435, and then the upper frame 41 and the side frames 42 and 43 are slid to the fixed position for attaching (FIG. 7). The length of the groove parts 415, 425 and 435 is defined, so that, when the upper frame 41 and the side frames 42 and 43 are slid to the fixed position for assembling the television receiver 1, the upper frame 41 and the side frames 42 and 43 cannot be slid beyond the fixed position.

Figure 10A:
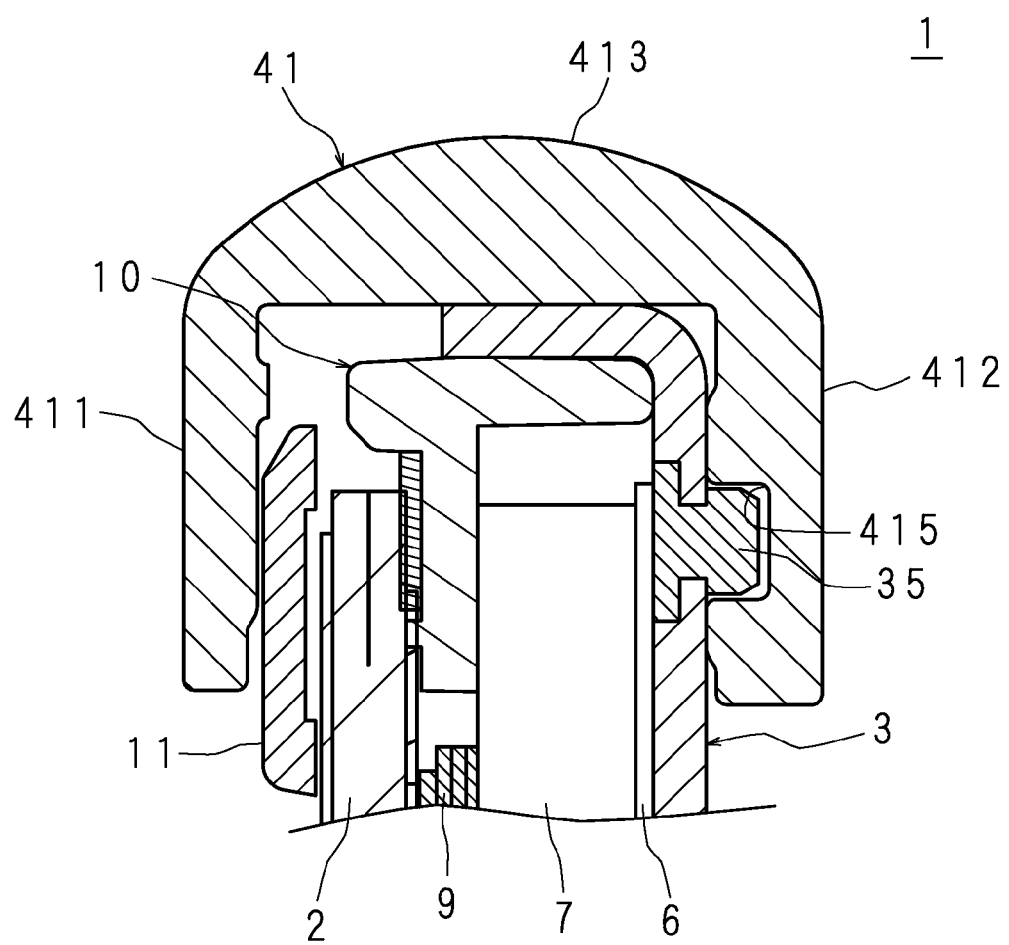
FIG. 10A is a partial cross-sectional view of the television receiver.
Figure 10B:
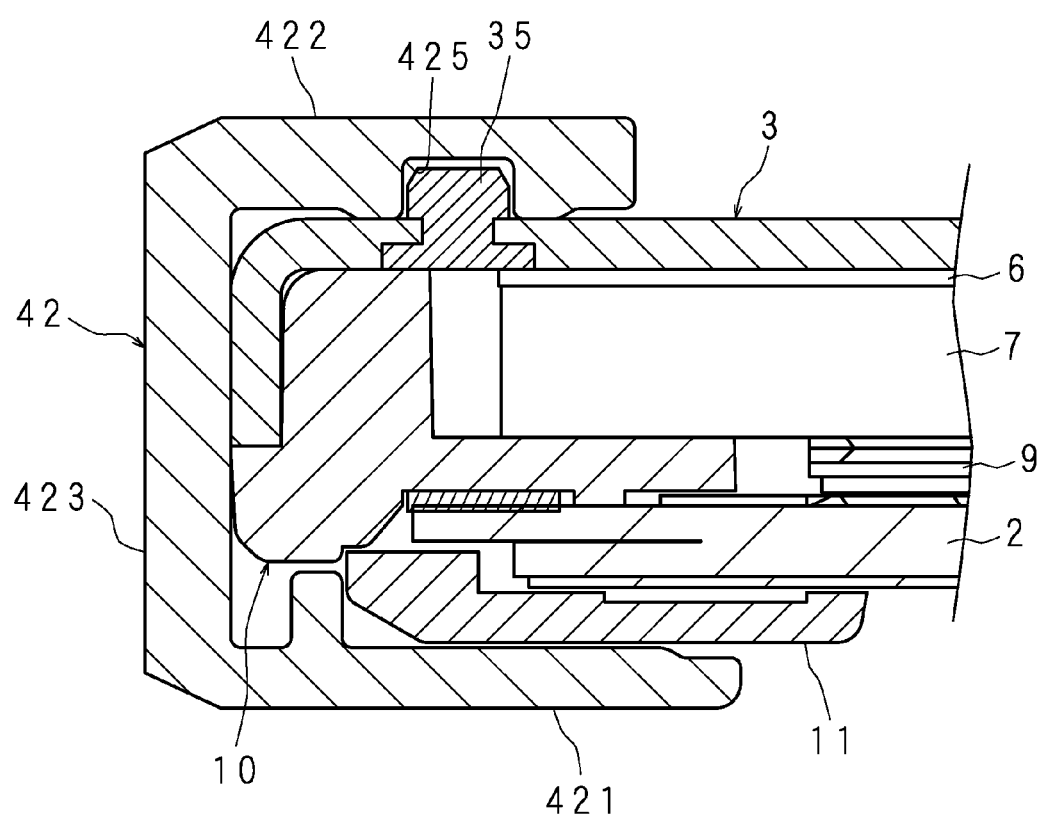
FIG. 10B is a partial cross-sectional view of the television receiver.
Figure 10C:
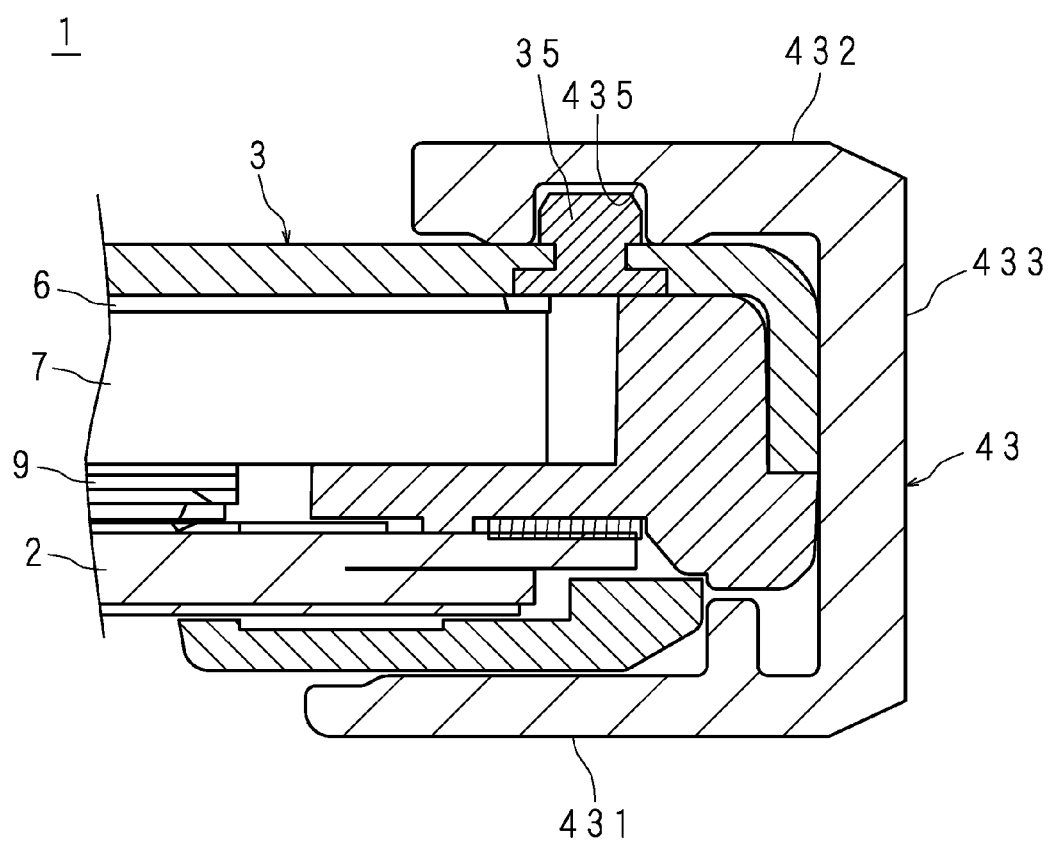
FIG. 10C is a partial cross-sectional view of the television receiver.

FIG. 10A, FIGS. 10B and 10C are partial cross-sectional views of the television receiver 1. FIG. 10A is a side cross-sectional view in the upper part of the television receiver 1. In FIG. 10A, the left corresponds to the front side of the television receiver 1, and the right corresponds to the rear side of the television receiver 1. FIG. 10B is a top cross-sectional view of the television receiver 1 in the left side thereof. FIG. 10C is a top cross-sectional view of the television receiver 1 in the right portion thereof. In FIGS. 10B and 10C, the bottom corresponds to the front side of the television receiver 1, and the top corresponds to the rear side of the television receiver 1. FIGS. 10A, 10B and 10C are cross-sectional views in which the protrusion parts 35 of the upper frame 41 and the side frames 42 and 43 moved to the fixed position by sliding are cut. On the other hand, FIGS. 8A, 8C and 8D are cross-sectional views in which the groove parts 415, 425 and 435 are cut after the protrusion parts 35 passing therethrough by sliding.

Figure 11:
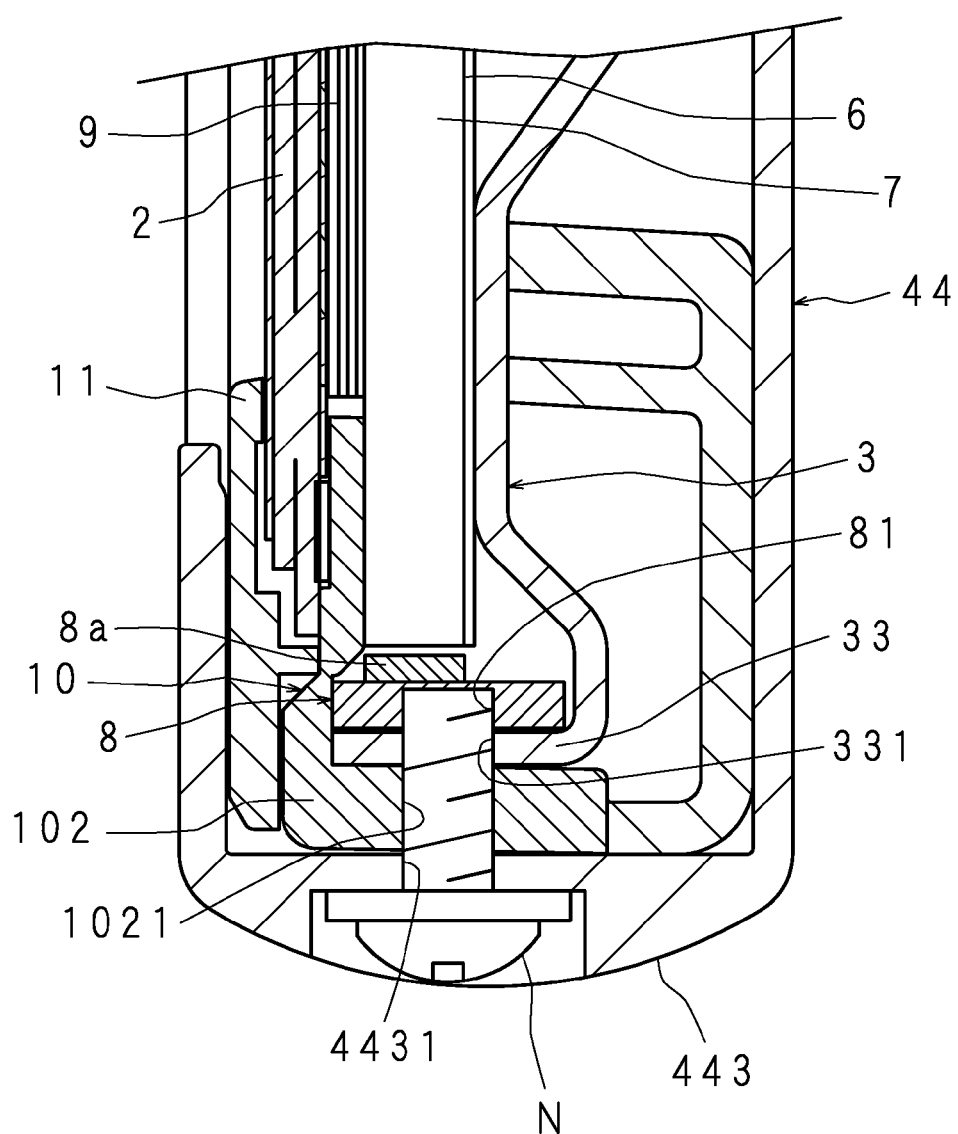
FIG. 11 is a partial cross-sectional view of the television receiver.

FIG. 11 is a partial cross-sectional view of the television receiver 1. FIG. 11 is a lower side cross-sectional view of the television receiver 1. In FIG. 11, the left corresponds to the front side of the television receiver 1, and the right corresponds to the rear side of the television receiver 1. The side wall 443 of the lower frame 44 is provided with a screw insertion hole 4431. A total of four screw insertion holes 4431 are provided in such a manner that two thereof are in both end parts of the side wall 443, and the other two are in a central region. Also, the side wall 106 of the light shielding holder 10 and the side plate 33 of the backlight chassis 3 are provided with screw insertion holes 1061 and 331 at positions overlapping with the screw insertion hole 4431, respectively (FIG. 9). Further, the LED substrate 8 is provided with screw holes 81 at positions overlapping with the screw insertion holes 4431, 1021 and 331. The screws N are inserted into the screw insertion holes 4431, 1021 and 331 from the lower side, and the inserted screws N are screwed into the screw holes 81. Thereby, the frame body 4 which is temporarily fixed to the backlight chassis 3 and the like is permanently fixed to the backlight chassis 3 and the like.

The upper frame 41 includes a mortise 416 (FIGS. 5B and 7). The side frames 42 and 43 include tenons 426 and 436 (FIGS. 5B and 7). The mortise 416 is provided so as to have an opening in the lower side of both end parts of the rear wall 412 in the upper frame 41. The tenon protrudes upward from the upper end parts of the rear walls 422 and 432 in the side frames 42 and 43.

The frame body 4 is joined by the tenon assembly structure. In the corner of the frame body 4 in which the both end parts of the upper frame 41 and the upper end parts of the side frames 42 and 43 are butted, the tenons 426 and 436 of the side frames 42 and 43 are fitted upward to the mortise 416 of the upper frame 41 from the bottom, thereby the upper frame 41 and the side frames 42 and 43 are joined with each other.

The tenon assembly structure of the frame body 4 is provided on the rear side of the frame body 4. Thereby, a joint of the frame body 4 is not visible to a viewer who views an image displayed on the front side of the screen 21, and design properties of the television receiver 1 is not deteriorated. Further, the tenon assembly structure may be provided on the front side or side of the frame body 4. Alternately, the tenon assembly structure may be provided inside of the frame body 4.

When attaching the frame body 4 to the backlight chassis 3 and the like, the upper frame 41, the side frames 42 and 43 and the lower frame 44 are closed from the outside of the backlight chassis 3 and the like toward the inside. The backlight chassis 3 and the like are sandwiched between the substantially U-shaped open front walls 411, 421, 431 and 441 and the rear walls 412, 422, 432 and 442, and the upper frame 41, the side frames 42 and 43 and the lower frame 44 are pressed toward the inside. Then, the upper frame 41, the side frames 42 and 43 and the lower frame 44 are slid in the longitudinal direction thereof (arrow direction in FIG. 7), and the upper frame 41 and the side frames 42 and 43 are jointed by the tenon assembly structure.

In this case, the upper frame 41, the side frames 42 and 43 and the lower frame 44 which form the frame body 4 are attached to the backlight chassis 3 and the like in this order. First, the upper frame 41 is attached. In this case, with the protrusion part 35 of the backlight chassis 3 being fitted to the groove part 415, the upper frame 41 is slid. Next, the side frames 42 and 43 are attached. In regards to an attaching sequence of the side frames 42 and 43, any one of the right side frame 42 and the left side frame 43 as seen from the front may be firstly attached. The sliding direction during attaching the side frames 42 and 43 is a direction from the bottom to the top. By sliding the side frames 42 and 43 upward, the tenons 426 and 436 are fitted into the mortise 416.

Then, the lower frame 44 is attached. The lower part of the backlight chassis 3 and the like is sandwiched by the lower frame 44 from the lower side. The lower ends of the side frames 42 and 43 are provided with stepped parts (not illustrated) to which the extending part can be fitted, inside of the lower frame 44 which sandwiches the backlight chassis 3 and the like from the lower side provided with an L angle-shaped extending part (not illustrated). The extending parts of the side frames 42 and 43 are fitted to the stepped parts of the lower frame 44, thereby the lower frame 44 is fitted to the side frames 42 and 43. Further, the extending part and the stepped part may be dispensable.

In this state, the upper frame 41, the side frames 42 and 43 and the lower frame 44 are united, and the temporarily fixation of each member forming the television receiver 1 is ended. Finally, the screw N is inserted from the screw insertion hole 4431 of the lower frame 44 to the screw insertion hole 331 of the backlight chassis 3 through the screw insertion hole 1061 of the light shielding holder 10. Then, the inserted screw N is screwed in the screw hole 81 of the LED substrate 8, thus the lower frame 44, the light shielding holder 10, the backlight chassis 3, and the LED substrate 8 are fastened. Thereby, permanent fixation of each member forming the television receiver 1 is ended. Further, the number of the screws N may be increased or decreased from four depending on the strength required for the television receiver 1

In the above description, the lower part of the frame body 4 is not provided with the tenon structure. However, the lower part of the side frame 42 may also be provided with the tenon assembly structure. In this case, the both end parts of the side frames 42 are provided with a mortise. In the above description, the mortise 416 and the tenons 426 and 436 are provided in the upper frame 41 and the side frames 42 and 43, respectively. However, the convexo-concave relationship of the tenon structure in the upper frame 41 and the side frames 42 and 43 may be reversed. That is, the tenon may be provided on both end parts of the upper frame 41, and the mortise may be provided in the upper end part of the side frames 42 and 43.

In the above description, as the tenon structure, the mortise 416 and the tenons 426 and 436 which are fitted in the vertical direction are illustrated. However, the tenon structure may employ the mortise and the tenon which are fitted in the lateral direction. For example, the mortise having an opening on the right side may be provided in the upper part of the left side frame 43 as seen from the rear side of the television receiver 1. The tenon fitting to the mortise is provided on the left end part of the upper frame 41 as seen from the rear side of the television receiver 1. When assembling the frame body 4, the right side frame 43 as seen from the rear side of the television receiver 1 is first attached, and then the upper frame 41 is attached. The sliding direction of the upper frame 41 is set to be a direction from the right to the left as seen from the rear side of the television receiver 1. Then, the right side frame 42 is attached as seen from the rear side of the television receiver 1. By sliding the side frame 42 upward, the tenon 426 of the side frame 42 is fitted to the mortise 416 of the upper frame 41. Further, only any one, two or three corners of four corners corresponding to the joint of the frame body 4 may employ the tenon assembly structure. All of the four corners corresponding to the joint of the frame body 4 may employ the tenon assembly structure.

After permanent fixation, the frame body 4 is combined without a gap by the tenon assembly structure. In addition, by fitting the groove parts 415, 425 and 435 to the protrusion parts 35, the frame body 4 is held in the vertical and lateral directions with respect to the backlight chassis 3. The panel cover 11, the liquid crystal panel 2, the light shielding holder 10, the optical sheet 9, the light guide plate 7, the reflective sheet 6, and the backlight chassis 3 are sandwiched by the frame body 4. The panel cover 11 and the light shielding holder 10 sandwiched between these members are engaged with other members such as in a mosaic form, and thereby the binding of these members becomes stronger. Further, the frame body 4 completely isolates the internal parts of the television receiver 1 from the outside, thereby producing an effect of preventing light leakage.

Figure 12A:
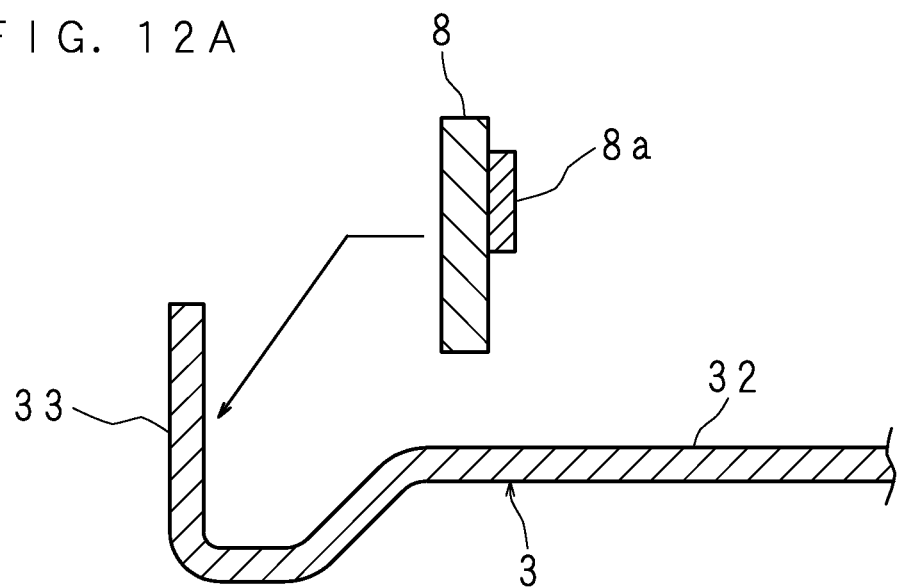
FIG. 12A is an explanatory view describing a sequence of assembling the television receiver.

Next, the assembling method of the television receiver 1 will be described in detail. FIGS. 12A, 12B, 12C, 12D, 12E, 12F, 12G, 12H, 12I and 12J are explanatory views describing a sequence of assembling the television receiver 1. FIGS. 12A to 12G illustrates a sequence of laminating the reflective sheet 6 and the like in the box-shaped backlight chassis 3. FIGS. 12H to 12J illustrates a sequence of attaching of the frame body 4. In FIGS. 12 A to 12J, the top illustrates the front side of the television receiver 1, and the bottom illustrates the rear side of the television receiver 1. In FIGS. 12A to 12G, the left illustrates the lower side of the television receiver 1. In FIGS. 12H and 12J, the left illustrates the upper side of the television receiver 1. In FIG. 12I, the left illustrates the left side of the television receiver 1 as seen from the front side.

First, with the opening surface of the backlight chassis 3 disposed upwards, the backlight chassis 3 is placed on a substantially horizontal table. The LED substrate 8 on which the LEDs 8a are previously mounted is disposed so that the surface on which the LEDs 8a are mounted faces the inner side, and, for example, a double-sided tape is attached on the inner side of the lower side plate 33 of the backlight chassis 3 (FIG. 12A). Further, a portion of the bottom plate 32 of the backlight chassis 3 corresponding to a position to which the LED substrate 8 is attached is recessed to the rear side along the side plate 33. Therefore, a worker may easily recognize the attaching position of the LED substrate 8. At the same time, the worker recognizes the lower side direction in the television receiver 1 to be assembled next.

Figure 12B:
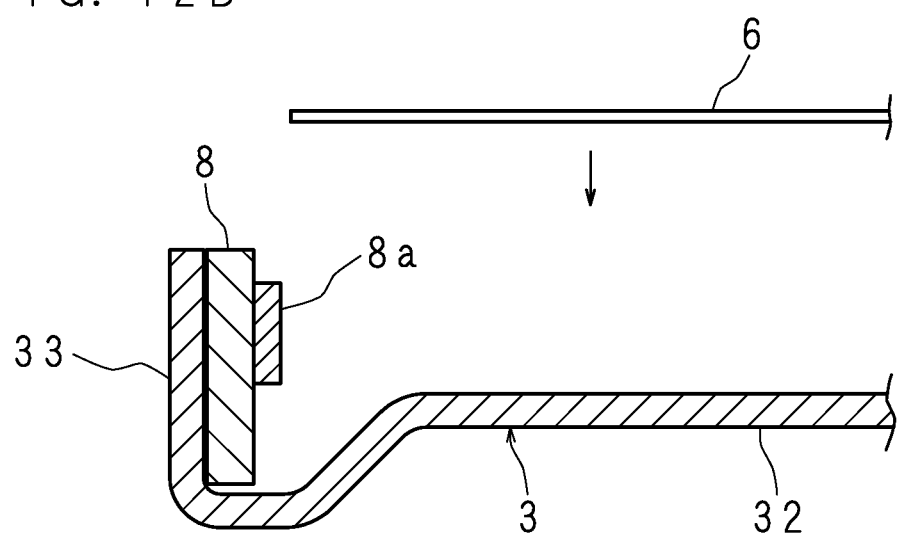
FIG. 12B is an explanatory view describing the sequence of assembling the television receiver.

Next, the reflective sheet 6 is attached on the inner surface in the bottom plate 32 of the backlight chassis 3 by the double-sided tape, for example (FIG. 12B). Alternately, the reflective sheet 6 is mounted on the inner surface in the bottom plate 32 of the backlight chassis 3 without using the double-sided tape. The shape of the reflective sheet 6 is a rectangular shape which is substantially the same as the shape of the inner surface of the bottom plate 32 in the backlight chassis 3. The reflective sheet 6 is attached so that each side of the reflective sheet 6 is substantially parallel to each side of the backlight chassis 3.

Figure 12C:
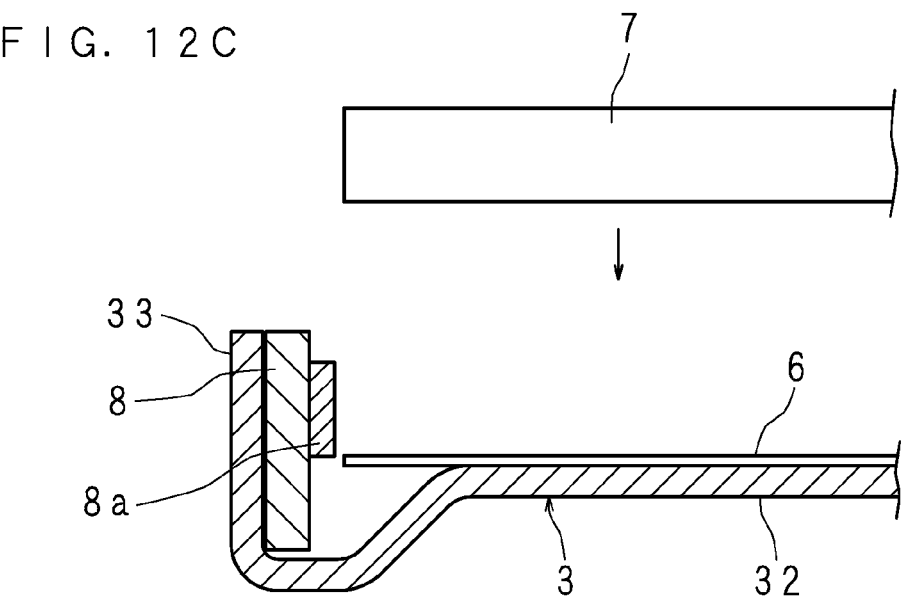
FIG. 12C is an explanatory view describing the sequence of assembling the television receiver.
Figure 12D:
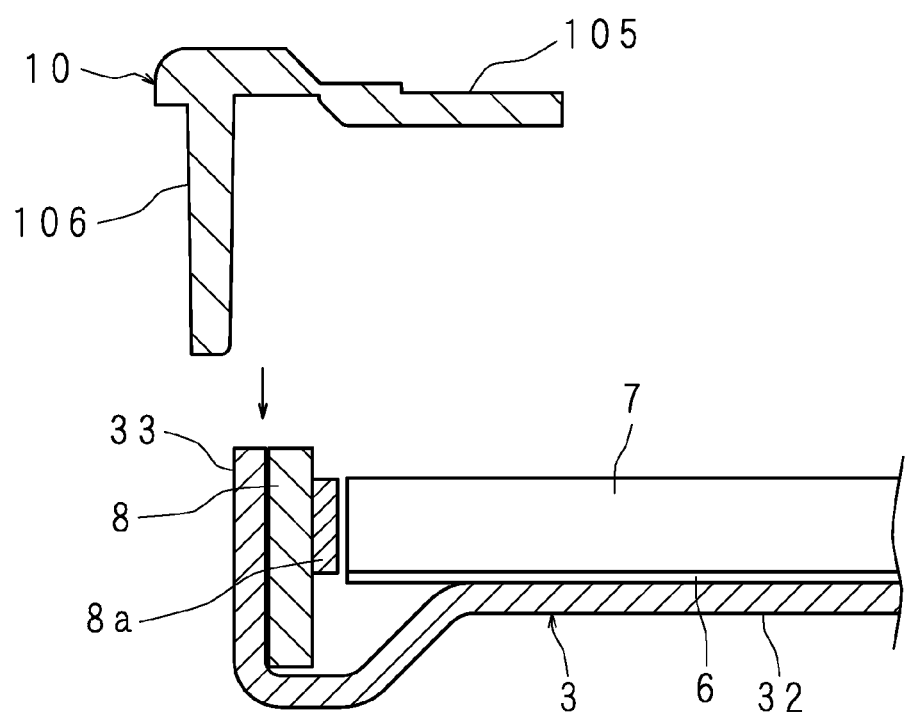
FIG. 12D is an explanatory view describing the sequence of assembling the television receiver.

The light guide plate 7 is overlapped on the reflective sheet 6 (FIG. 12C). The light shielding holder 10 is attached to the backlight chassis 3 (FIG. 12D). At this time, in the lower part of the backlight chassis 3, the light shielding holder 10 is attached to the backlight chassis 3, so that the side wall 106 of the light shielding holder 10 covers the outer surface of the side plate 33 of the backlight chassis 3 (FIG. 8B). On the other hand, in the upper part and the side part of the backlight chassis 3, the light shielding holder 10 is attached to the backlight chassis 3, so that the side wall 106 of the light shielding holder 10 covers the inner surface of the side plate 33 of the backlight chassis 3 (FIGS. 8A, 8C and 8D).

The projection 108 of the light shielding holder 10 is fitted to the opening 34 of the backlight chassis 3. In addition, the light shielding holder 10 is attached, so that the protrusion part 71 of the light guide plate 7 is engaged to the engaging notch part 109 of the light shielding holder 10 (FIG. 9). By this, the front wall 105 of the light shielding holder 10 attached along the periphery of the side plate 33 is disposed so as to cover the front peripheral edge part of the light guide plate 7.

Figure 12E:
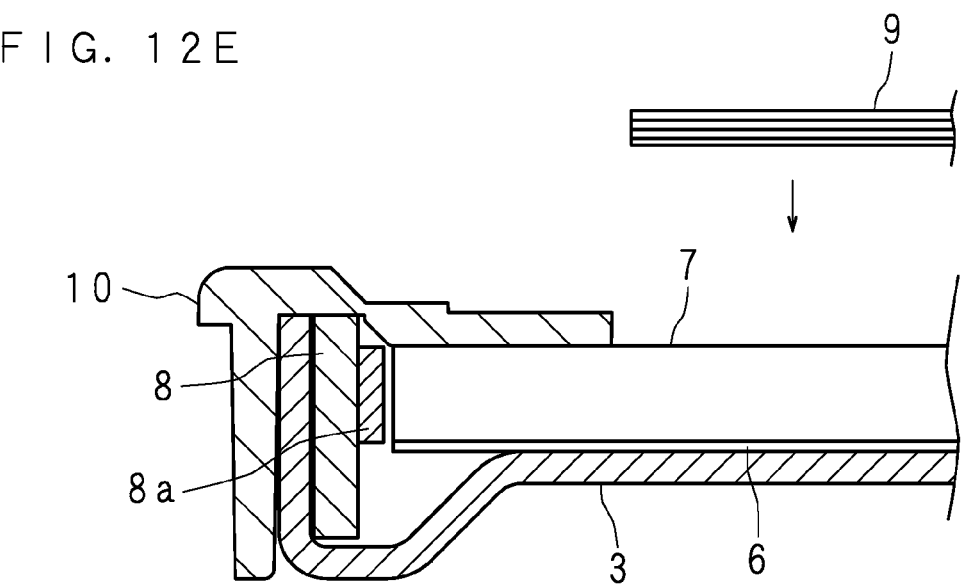
FIG. 12E is an explanatory view describing the sequence of assembling the television receiver.

The optical sheet 9 is overlapped on the front surface of the light guide plate 7 rimmed by the light shielding holder 10 (FIG. 12E). At this time, the optical sheet 9 is overlapped on the front surface of the light guide plate 7, so that the protrusion part of the optical sheet 9 is engaged to the engaging notch part 109 of the light shielding holder 10. Further, in the above description, the light shielding holder 10 is attached, and then the optical sheet 9 is overlapped on the light guide plate 7, but the optical sheet 9 may be overlapped on the light guide plate 7, and then the light shielding holder 10 may be attached. In the latter case, the protrusion part 71 of the light guide plate 7 and the protrusion part of the optical sheet 9 are engaged to the engaging notch part 109 of the light shielding holder 10.

Figure 12F:
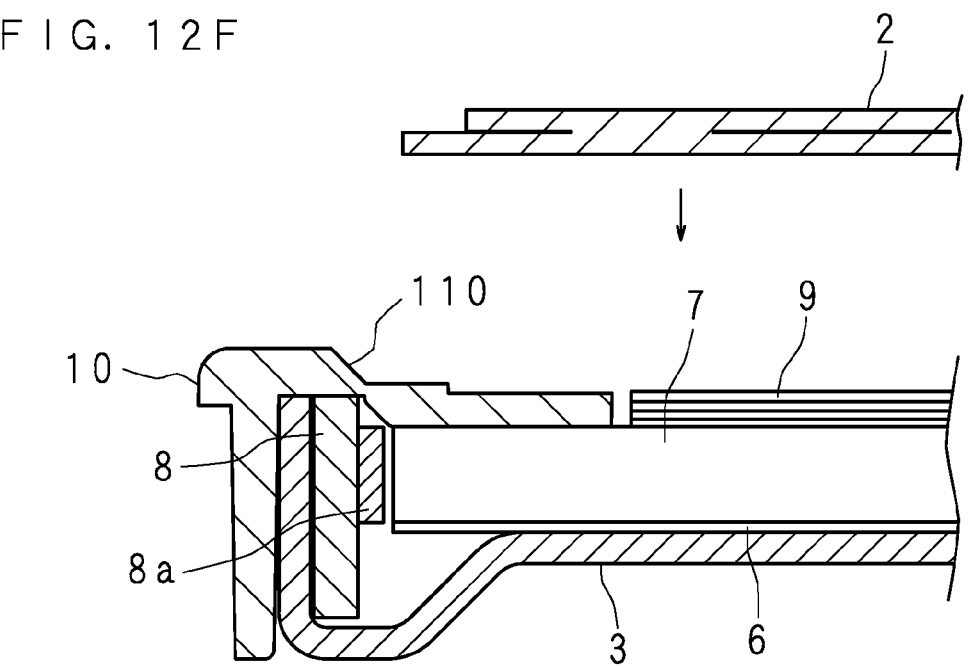
FIG. 12F is an explanatory view describing the sequence of assembling the television receiver.

The shape of the liquid crystal panel 2 is substantially the same as the shape of the opening in the light shielding holder 10, but the size of the liquid crystal panel 2 is slightly smaller than the opening in the light shielding holder 10. The peripheral edge of the rear surface in the liquid crystal panel 2 abuts the inclined face 110 of the light shielding holder 10, and the orientation of the liquid crystal panel 2 is fixed. The liquid crystal panel 2 is overlapped on the optical sheet 9 according to the guide of the inclined face 110 (FIG. 12F). Several flexible boards (not illustrated) are bonded to the side of the liquid crystal panel 2. The flexible boards are inserted to the outer side from the notch 107 provided in the light shielding holder 10 (FIG. 6). When a step of the attachment of the liquid crystal panel 2 is ended, an elongated groove part having an opening on the front side is generated between the liquid crystal panel 2 and the light shielding holder 10 around thereof.

Figure 12G:
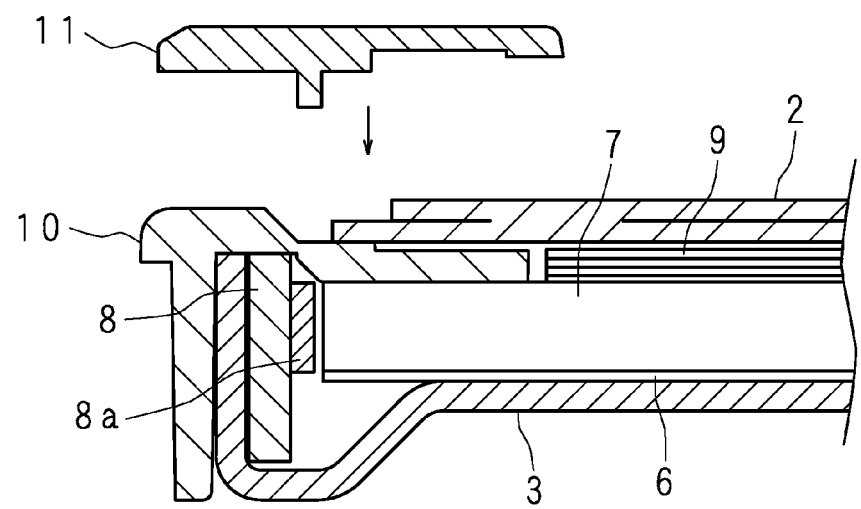
FIG. 12G is an explanatory view describing the sequence of assembling the television receiver.
Figure 12H:
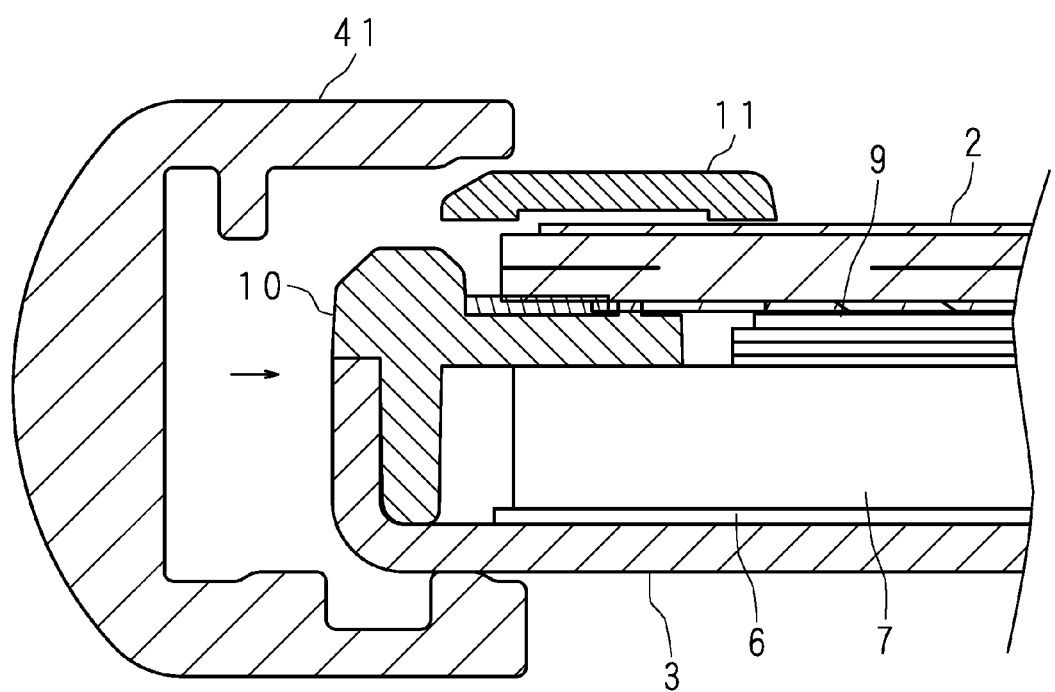
FIG. 12H is an explanatory view describing the sequence of assembling the television receiver.
Figure 12I:
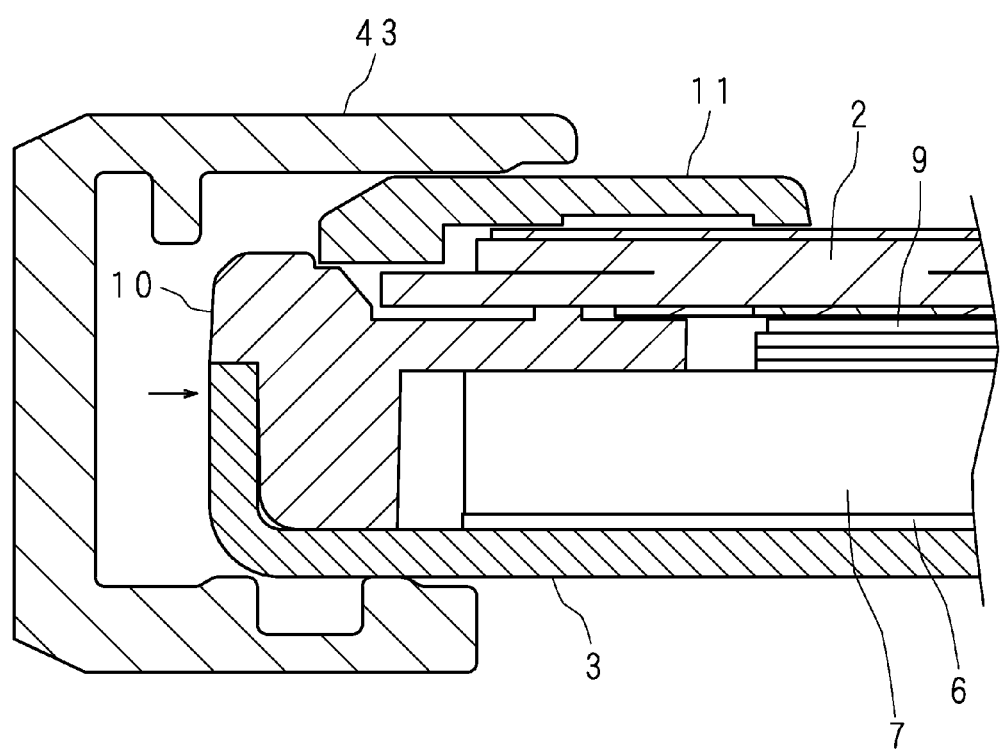
FIG. 12I is an explanatory view describing the sequence of assembling the television receiver.
Figure 12J:
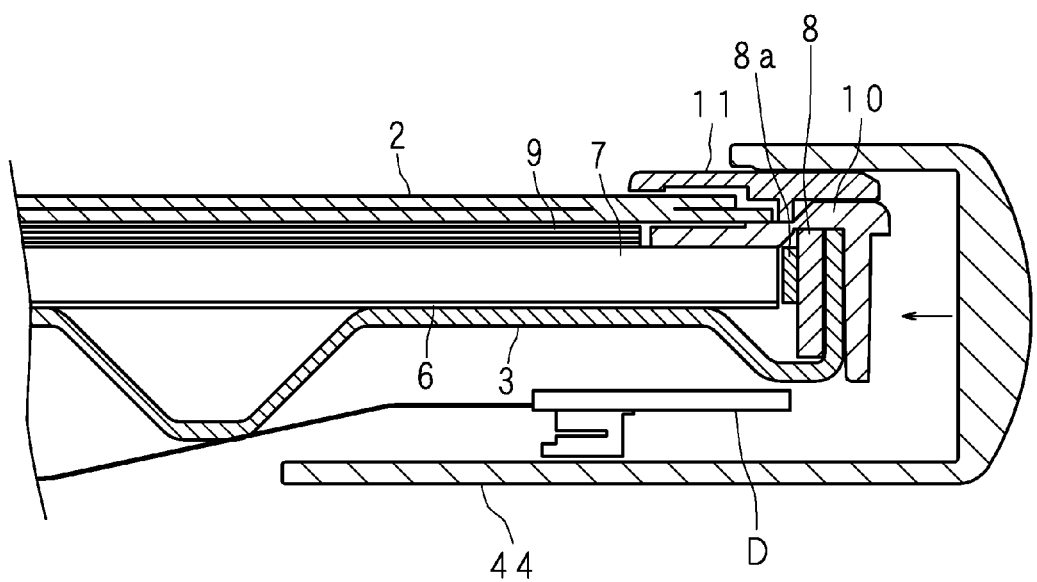
FIG. 12J is an explanatory view describing the sequence of assembling the television receiver.

The panel cover 11 is attached so as to cover the front peripheral edge part of the liquid crystal panel 2 (FIG. 12G). At this time, the ribs 111 and 112 of the panel cover 11 are loosely fitted to the groove part so as to fill the groove part between the liquid crystal panel 2 and the light shielding holder 10 (FIGS. 8B, 8C and 8D). Thereby, the gap between the liquid crystal panel 2 and the light shielding holder 10 is significantly narrowed. If the liquid crystal panel 2 is attached with being shifted from the fixed position, by attaching the panel cover 11, the liquid crystal panel 2 is pressed from the ribs 111 and 112 to be moved to the fixed position.

The reflective sheet 6, the light guide plate 7, the optical sheet 9, the light shielding holder 10, the liquid crystal panel 2, and the panel cover 11, which are laminated on the inner surface in the bottom plate 32 of the backlight chassis 3, including the backlight chassis 3 are sandwiched by the upper frame 41 (FIG. 12H). At this time, the protrusion part 35 provided on the rear surface in the bottom plate 32 of the backlight chassis 3 is fitted to the groove part 415 provided on the inner surface in the rear wall 412 of the upper frame 41. While holding the state in which the protrusion part 35 is fitted to the groove part 415, the upper frame 41 is slid in the longitudinal direction of the backlight chassis 3 or the liquid crystal panel 2, for example. When sliding the upper frame 41 until the protrusion part 35 reaches the edge of the groove part 415, the upper frame 41 is positioned at the fixed position. Accordingly, the position in which the backlight chassis 3 and the like is sandwiched by the upper frame 41 is a position in which the frame is previously shifted as much as a sliding distance after sandwiching in a direction opposite to the sliding direction. Further, the sliding direction of the upper frame 41 may be from the left to the right, or from the right to the left, when seeing the television receiver 1 from the front side. Depending on any one sliding direction, the displacement of the groove part 415 and the protrusion part 35 is determined in advance.

Next, similar to the upper frame 41, sandwiching and sliding for the side frames 42 and 43 are performed (FIG. 12I). At this time, in regard to the attaching sequence of the side frames, any one of the right side frame 42 and the left side frame 43 may be firstly attached or later attached. The side frames 42 and 43 are slid in a direction substantially parallel to the lateral direction of the backlight chassis 3 or the liquid crystal panel 2, and in a direction approaching to the upper frame 41. The tenons 426 and 436 provided on the upper ends of the side frames 42 and 43 are fitted to the mortises 416 provided in the both end parts of the upper frame 41, respectively.

The backlight chassis 3 and the like is sandwiched by the lower frame 44 (FIG. 12J). In order to sandwich the backlight chassis 3 and the like by the lower frame 44, the lower frame 44 is aligned to a position in which the screw insertion hole 4431 of the lower frame 44 and the screw insertion hole 1061 of the light shielding holder 10 are overlapped with each other (see FIG. 11). Then, the lower frame 44 is pressed to the direction substantially parallel to the lateral direction of the backlight chassis 3 or the liquid crystal panel 2. In this state, the backlight chassis 3 and the like which is sandwiched by the frame body 4 is temporarily fixed.

Four screws N are respectively stuck into the screw insertion holes 4431, and each stuck screw N is inserted into the screw insertion hole 1061 of the light shielding holder 10 and the screw insertion hole 331 of the backlight chassis 3. The screws N are respectively fastened into the screw holes 81 of the LED substrate 8, and permanently fixes the backlight chassis 3 and the like which is sandwiched by the frame body 4 (FIG. 7).

Figure 13B:
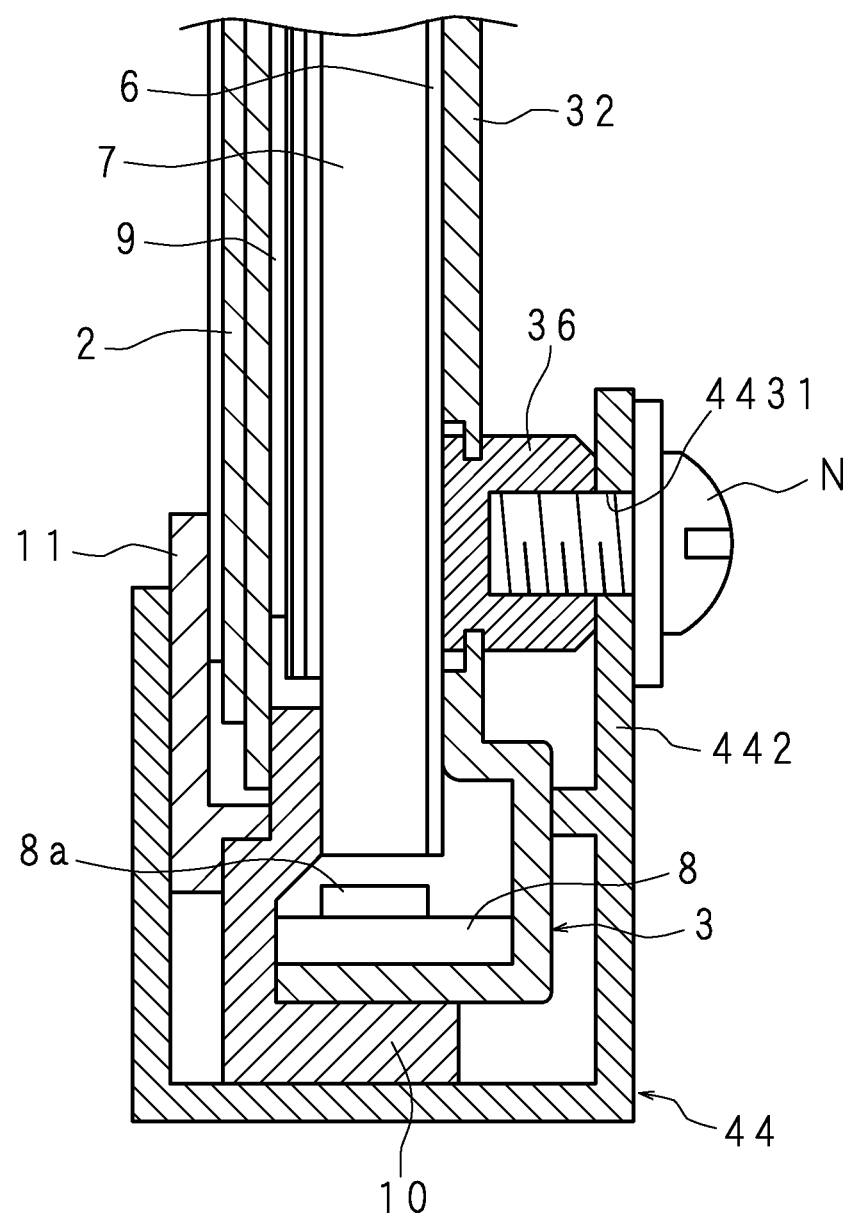
FIG. 13B is an explanatory view illustrating the method of fixing the lower frame to the backlight chassis.

In Embodiment 1, the television receiver 1 is permanently fixed by the screws N which are inserted upward from the screw insertion hole 4431 of the lower frame 44. However, television receiver 1 may be fixed by fastening of the screws N according to other embodiments. FIGS. 13A and 13B are explanatory views illustrating a method of fixing the lower frame 44 to the backlight chassis 3. FIG. 13A is a perspective view of the rear surface of the television receiver 1 as seen obliquely from the rear lower right. In FIG. 13A, three screws N disposed at substantially equal intervals are stuck into the rear wall 442 of the lower frame 44. Further, in the example of FIG. 13A, the flexible board F seen on the rear surface of the television receiver 1 is covered with the board cover 5 extending downward.

FIG. 13B is a partial side cross-sectional view of the television receiver 1. In FIG. 13B, the top is the upper side of the television receiver 1, and the left is the front side of the television receiver 1. A boss 36 is erected on the lower side of the rear surface of the bottom plate 32 in the backlight chassis 3. The rear wall 442 of the lower frame 44 facing the boss 36 is provided with the screw insertion hole 4431. The screw N is inserted into the screw insertion hole 4431 from the rear side, and screwed into a screw hole formed in the center of the boss 36. In order to increase the strength of the television receiver 1, a plurality of bosses 36 and the screw insertion holes 4431 may be provided along the long and short sides of the backlight chassis 3. Herein, the movement of the side frames 42 and 43, and the upper frame 41 which are bonded to the lower frame 44 is regulated by the tenon assembly structure. Therefore, the lower frame 44 is strongly fixed to the backlight chassis 3 by the screws N, thereby the television receiver 1 is permanently fixed thereto.

In Embodiment 1, the television receiver 1 employs the edge-light-type backlight. However, the television receiver 1 may employ a direct-type backlight.

In Embodiment 1, by fitting the concave part provided in the frame body 4, that is, the groove parts 415, 425 and 435 to the convex part provided on the backlight chassis 3, that is, the protrusion part 35, the frame body 4 is temporarily fixed to the backlight chassis 3. However, the convexoconcave relationship thereof may be reversed. That is, the convex part may be provided on the frame body 4, and the concave part may be provided in the backlight chassis 3. When forming the upper frame 41, the side frames 42 and 43 and the lower frame 44 by extrusion molding, the convex part of the frame body 4 may be formed by, for example, cutting and raising by press molding, press molding using a self-clinching pin, or extrusion molding and cutting of a unnecessary portion. Meanwhile, the concave part of the backlight chassis 3 may be formed by, for example, pressing or cutting.

In Embodiment 1, the groove parts 415, 425 and 435 of the frame body 4 are provided in the rear walls 412, 422 and 432, and the protrusion part 35 of the backlight chassis 3 is provided on the bottom plate 32. However, the convexconcave structure for temporarily fixing the frame body 4 to the backlight chassis 3 may be provided on the side of the television receiver 1. That is, the side walls 413, 423 and 433 of the frame body 4 and the side plate 33 of the backlight chassis 3 may be provided with the convex-concave structure fitting to each other.

According to the television receiver 1, it is possible to achieve the weight lightening, thinning and narrowing of the frame. The television receiver 1 excludes the front cabinet and back cabinet provided in a conventional television receiver. Therefore, the television receiver 1 can facilitate the weight lightening, thinning and narrowing of the frame by as much as an amount of weight and volume corresponding to the front cabinet and back cabinet.

According to the television receiver 1, the backlight chassis 3 and the frame body 4 secure an entire strength thereof. Conventionally, the front cabinet provided in the thin type television receiver is a casing covering the front peripheral edge part and sides of the television receiver, and has an L-shaped cross section. On the other hand, the television receiver 1 does not include the front cabinet, and the frame body 4 plays a part of the role of the casing. The frame body 4 has a U-shaped cross section, and has the rear walls 412, 422, 432 and 442 which are not included in the front cabinet. Therefore, a sectional secondary moment of the frame body 4 is larger than the sectional secondary moment of the conventional front cabinet. Accordingly, stiffness of the frame body 4 is higher than the stiffness of the conventional front cabinet. Thereby, the television receiver 1 can achieve the weight lightening, thinning and narrowing of the frame, while maintaining higher strength.

According to the television receiver 1, it is possible to reduce the number of parts, and improve the efficiency of assembly. In the conventional television receiver, in order to secure the strength of the casing, connecting members such as an L-shaped angle, or the like, and a plurality of screws are used at the corners of the casing. However, the television receiver 1 is temporarily fixed by fitting the convex part with the concave part which are provided in the backlight chassis 3 and the frame body 4, and the tenon assembly structure in which the upper frame 41 and the side frames 42 and 43 are fitted by sliding. The tenon assembly structure eliminates motion by filling the gap between the upper frame 41 and two side frames 42 and 43. In addition, the frame body 4 and the lamination of the backlight chassis 3 and the like are permanently fixed by four screws N inserted into only the lower frame 44. Therefore, the television receiver 1 does not require the connecting members and the plurality of screws for securing the strength of the casing. Due to such excluding of the connecting member and reducing of the fixing member, the number of assembling processes of the television receiver 1 can be reduced. Thereby, the television receiver 1 can improve the efficiency of assembly and overall productivity.

Embodiment 2

In Embodiment 1, the television receiver 1 does not include the back cabinet. However, the television receiver 1 may include the back cabinet. Embodiment 2 relates to a configuration in which the back cabinet is added to the television receiver 1 as a member thereof.

Figure 14:
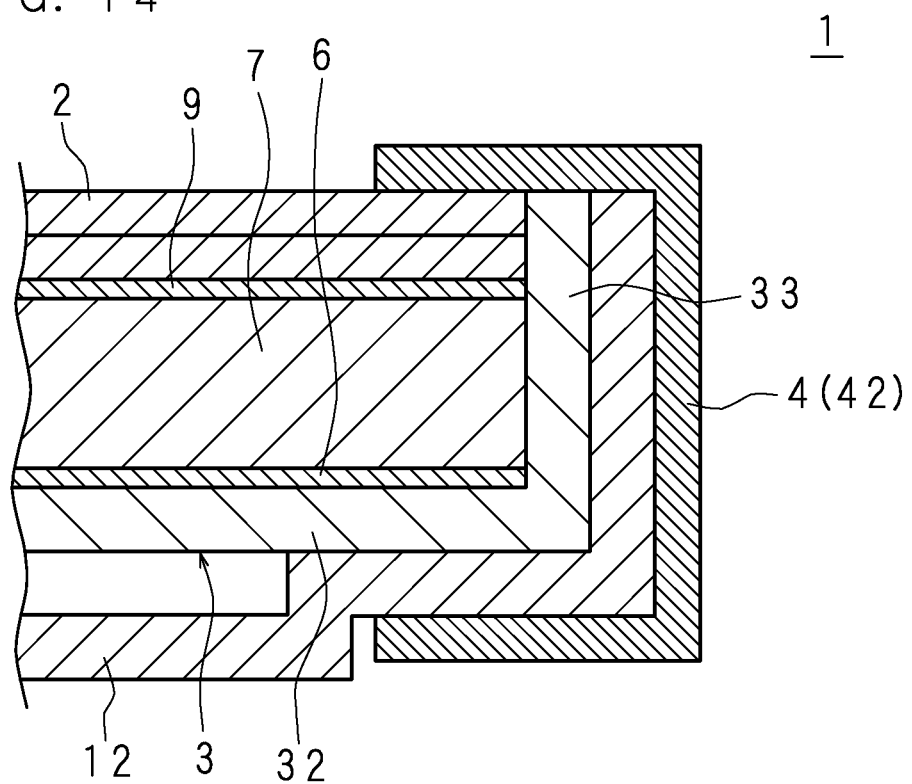
FIG. 14 is a partial cross-sectional view of the television receiver.

FIG. 14 is a partial cross-sectional view of the television receiver 1. FIG. 14 is a top cross-sectional view of the television receiver 1 in the left part thereof. In FIG. 14, the bottom corresponds to the rear side of the television receiver 1, and the top corresponds to the front side of the television receiver 1. In FIG. 14, the light shielding holder 10 and the panel cover 11 are not illustrated, thereby simplifying the illustration.

The television receiver 1 includes a back cabinet 12. The back cabinet 12 is made of a synthetic resin, for example, and is a box or a tray whose front surface is opened similarly to the backlight chassis 3. The back cabinet 12 is disposed on the rear side of the backlight chassis 3, and is slightly larger than the backlight chassis 3 so as to house the backlight chassis 3. The backlight chassis 3 and the like, in which the reflective sheet 6, the light guide plate 7, the optical sheet 9, and the liquid crystal panel 2 are laminated in this order from the rear side to the front side, is disposed on the inner bottom of the back cabinet 12. In addition, the frame body 4 sandwiches the back cabinet 12, the backlight chassis 3, the reflective sheet 6, the light guide plate 7, the optical sheet 9, and the liquid crystal panel 2.

The television receiver 1 may include the light shielding holder 10 and the panel cover 11, but as illustrated in FIG. 14, may not include the light shielding holder 10 and the panel cover 11. The side and the rear surface of the light guide plate 7 are covered with the backlight chassis 3 and the back cabinet 12, and light emitted from the front peripheral edge part of the light guide plate 7 to the front is shielded by the frame body 4 having a U-shaped cross section. In this regard, the light shielding is not necessarily required.

The back cabinet 12 can enhance aesthetics and strength of the television receiver 1, and prevent the light from being leaked. Further, the back cabinet 12 may cover only the bottom plate 32 of the backlight chassis 3, without covering the side plate 33 of the backlight chassis 3. In this case, the width of a frame portion in the television receiver 1 can be thinner than the width of the frame portion in FIG. 14, as much as an amount corresponding to the thickness of the back cabinet 12. Therefore, it is possible to narrow the frame of the television receiver 1.

Embodiment 2 is configured as described above, and other than that is the same as Embodiment 1, such that the corresponding parts will be denoted by the same reference numerals, and will not be described in detail.

Embodiment 3

Embodiment 3 relates to a configuration in which, as the convex-concave structure for fixing the frame body 4 to the backlight chassis 3, an L-shaped opening part is provided in the backlight chassis 3, and a protrusion part which is fitted to the opening part is provided on the frame body 4. In addition, this embodiment relates a configuration in which groove parts are provided in the front walls 411, 421 and 431 relating to the frame body 4, and protrusion parts to be fitted to the groove parts are formed on the tip of the side plate 33 of the backlight chassis 3.

Figure 15:
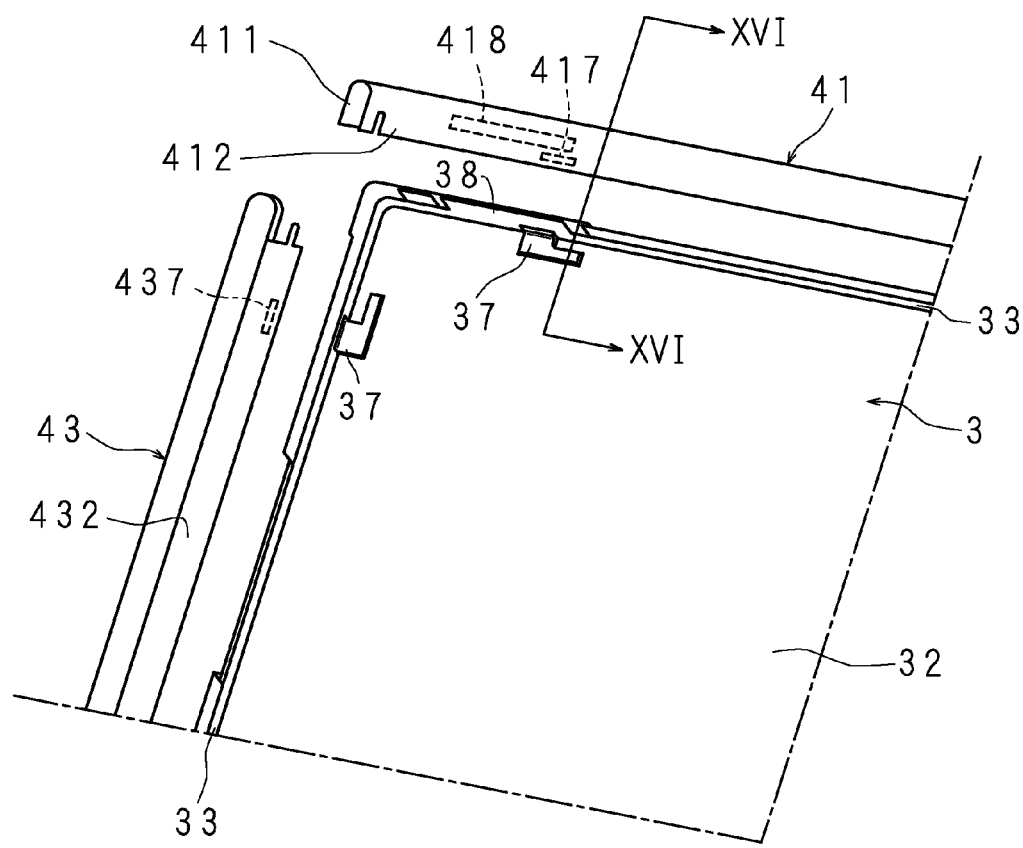
FIG. 15 is a partial perspective view of the television receiver in the step before attaching the frame body.

FIG. 15 is a partial perspective view of the television receiver 1 in the step before attaching the frame body 4. FIG. 15 illustrates a state in which the upper left corner portion of the television receiver 1 is seen obliquely from the rear upper lower left. The bottom plate 32 in the backlight chassis 3 is provided with an L-shaped opening part 37 in the peripheral edge part thereof. The L-shaped opening part 37 has an opening surface formed in a substantially L shape, when seen the backlight chassis 3 from the rear side. The L-shaped opening parts 37 are provided at a total of six places around both ends in the upper edge of the bottom plate 32 one by one, and around both ends of the left side edge and the right side edge thereof one by one, respectively. FIG. 15 illustrates two L-shaped opening parts 37 provided in the bottom plate 32 among them.

One segment forming the L shape is an elongated slit extending substantially parallel to the circumferential direction of the backlight chassis 3. A rectangular opening is provided from a ridge part where the bottom plate 32 and the side plate 33 of the backlight chassis 3 meet to one end portion of the slit. The other segment forming the L shape is the rectangular opening. A part of the rectangular opening reaches the side plate 33 of the backlight chassis 3. The overall shape of the opening into which the slit and the rectangular opening are united is formed in an L shape. In the L-shaped opening part 37, a direction in which the slit is provided from the rectangular opening is also the moving direction in which the upper frame 41 and the side frames 42 and 43 are slid, in order to attach the upper frame 41 and the side frames 42 and 43 to the backlight chassis 3 and the like.

In order to fix the upper frame 41 and the side frame 43 to the backlight chassis 3, fitting protrusion parts 417 and 437 are provided on the rear walls 412 and 432 of the upper frame 41 and the side frame 43 corresponding to the L-shaped opening part 37. The fitting protrusion parts 417 and 437 are formed in a rectangular parallelepiped shape extending in the longitudinal direction of the upper frame 41 and the side frame 43. The width of the fitting protrusion parts 417 and 437 in the lateral direction thereof is substantially the same as the width of the slit of the L-shaped opening part 37. The length of the fitting protrusion parts 417 and 437 in the longitudinal direction thereof is smaller than the length of the rectangular opening of the L-shaped opening part 37 in the circumferential direction of the backlight chassis 3.

The backlight chassis 3 includes a side protrusion part 38 (FIGS. 5A and 15). The side protrusion part 38 is a rectangular protrusion part provided on the front tip of the side plate 33, and is formed by cutting the tip part of the side plate 33 other than the side protrusion part 38, for example.

In order to fix the upper frame upper frame 41 and the side frames 42 and 43 to the backlight chassis 3, a side wall fitting groove part 418 is formed on the front walls 411, 421 and 431 of the upper frame 41 and the side frames 42 and 43 facing the side protrusion part 38. The side wall fitting groove part 418 is a groove part to which the side protrusion part 38 is fitted.

When attaching the upper frame 41 and the side frames 42 and 43 to the backlight chassis 3 and the like, the backlight chassis 3 and the like is sandwiched by the upper frame 41 and the side frames 42 and 43. At this time, the fitting protrusion parts 417 and 437 are loosely fitted to the rectangular opening in the L-shaped opening part 37. Then, the upper frame 41 and the side frames 42 and 43 are slid from the rectangular opening in the L-shaped opening part 37 in the direction in which the slit is provided. Thereby, the fitting protrusion parts 417 and 437 are fitted to the slit of the L-shaped opening part 37. In addition, when sliding the upper frame 41 and the side frames 42 and 43, the side protrusion part 38 is fitted to the side wall fitting groove part 418.

Figure 16:
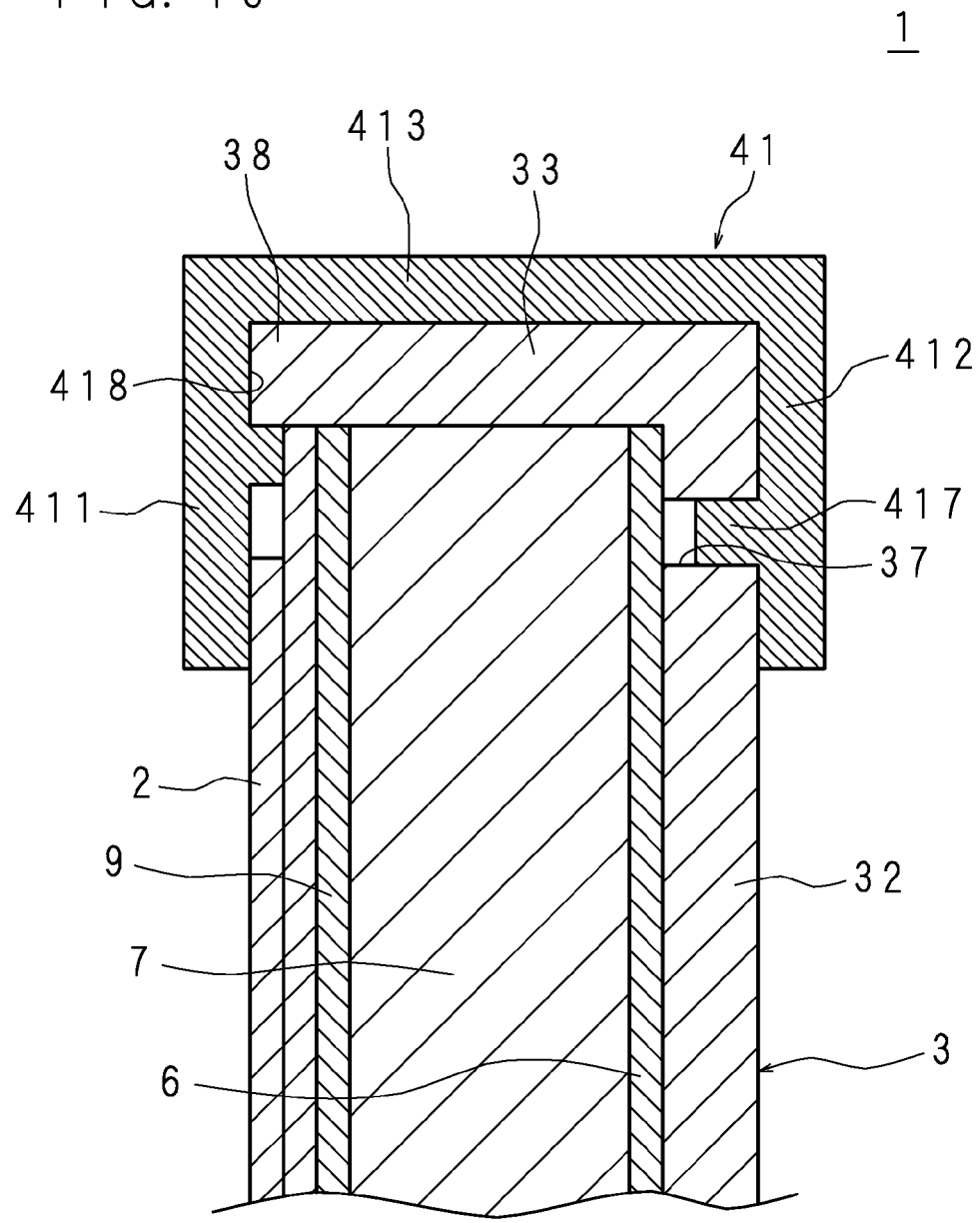
FIG. 16 is a cross-sectional view taken on line XVI-XVI in FIG. 15.

FIG. 16 is a cross-sectional view taken on line XVI-XVI in FIG. 15. Further, in FIG. 15, the light shielding holder 10 and the panel cover 11 will not be illustrated to simply. In addition, FIG. 16 is a cross-sectional view of the state in which the upper frame 41 is attached to the television receiver 1. The fitting protrusion part 417 of the upper frame 41 is fitted to the slit of the L-shaped opening part 37, and the upper side protrusion part 38 of the backlight chassis 3 is fitted to the side wall fitting groove part 418 of the upper frame 41.

Further, when the side frames 42 and 43 and the lower frame 44 are attached, the frame body 4 and the backlight chassis 3 and the like are temporarily fixed. When the lower frame 44 and the LED substrate 8 are strongly fastened by the screws N, the television receiver 1 is permanently fixed.

In Embodiment 3, the L-shaped opening part 37 is an L shape in which the slit and the rectangular opening are united. However, the L-shaped opening part 37 may be an I shape of only the slit. In addition, the L-shaped opening part 37 may be a T shape having a slit extending from the rectangular opening part in a direction opposite to the slit, other than the slit extending in one direction from the rectangular opening. Thereby, a direction in which the upper frame 41 and the side frames 42 and 43 are slid is two linear directions, and it is possible to provide flexibility in attaching of the upper frame 41 and the side frames 42 and 43.

In Embodiment 3, the fitting protrusion parts 417 and 437 are provided on the rear walls 412 and 432, and the L-shaped opening part 37 is provided in the bottom plate 32 of the backlight chassis 3. However, the fitting protrusion parts 417 and 437 may be provided on the side walls 413, 423 and 433 of the frame body 4, and the L-shaped opening part 37 may be provided in the side plate 33 of the backlight chassis 3.

According to the above-described television receiver 1, when sandwiching the backlight chassis 3 and the like by the upper frame 41 and the side frames 42 and 43, since the fitting protrusion parts 417 and 437 are loosely fitted to the rectangular opening in the L-shaped opening part 37, it is possible to smoothly sandwich the upper frame 41 and the side frames 42 and 43. Then, by sliding the upper frame 41 and the side frames 42 and 43, the fitting protrusion parts 417 and 437 and the side protrusion part 38 are fitted to the slit of the L-shaped opening part 37 and the side wall fitting groove part 418, respectively. Thereby, efficiency of the temporarily fixing operation of the television receiver 1 can be improved.

Embodiment 3 is configured as described above, and other than that is the same as Embodiments 1 and 2, such that the corresponding parts will be denoted by the same reference numerals, and will not be described in detail.

Embodiment 4

Embodiment 4 relates to a configuration in which, as the convex-concave structure for fixing the frame body 4 to the backlight chassis 3, protrusion parts are provided on the rear surface of the backlight chassis 3, and groove parts, to which the protrusion parts are fitted, are provided in the inner surface of the rear walls 412, 422 and 432. In addition, Embodiment 4 relates to a configuration in which a flat part which is cut more deeply than a bottom of the groove part is provided in an extending direction of the groove part, and an inclined part which gently connects the flat part and the bottom of the groove part is formed.

Figure 17:
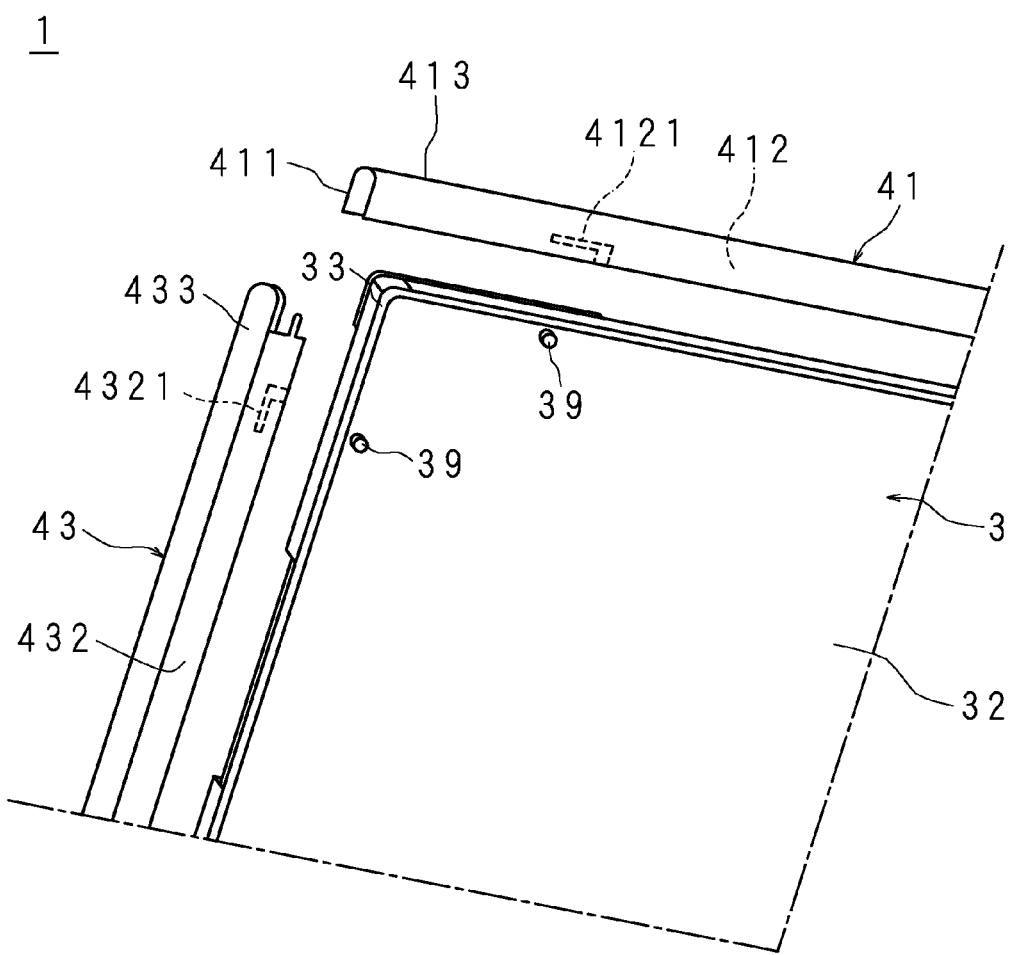
FIG. 17 is a partial perspective view of the television receiver in the step before attaching the frame body.

FIG. 17 is a partial perspective view of the television receiver 1 in the step before attaching the frame body 4. FIG. 17 illustrates a state in which the upper left corner portion of the television receiver 1 is seen obliquely from the rear upper left. The backlight chassis 3 includes flat protrusion parts 39. The flat protrusion parts 39 are provided as a cell spacer by pressing, for example, and are cylindrical protrusion parts having a flat apex. A total of six flat protrusion parts 39 are formed on both end parts of an upper side, and both end parts of sides in the rear surface of the bottom plate 32 one by one.

In order to fix the upper frame 41 and the side frames 42 and 43 to the backlight chassis 3, concave parts 4121 and 4321 are provided in the inner surface of the rear walls 412, 422 and 432 of the upper frame 41 and the side frames 42 and 43 corresponding to the flat protrusion part 39. The concave parts 4121 and 4321 are concaves to which the flat protrusion parts 39 can be slid and fitted.

Figure 18:
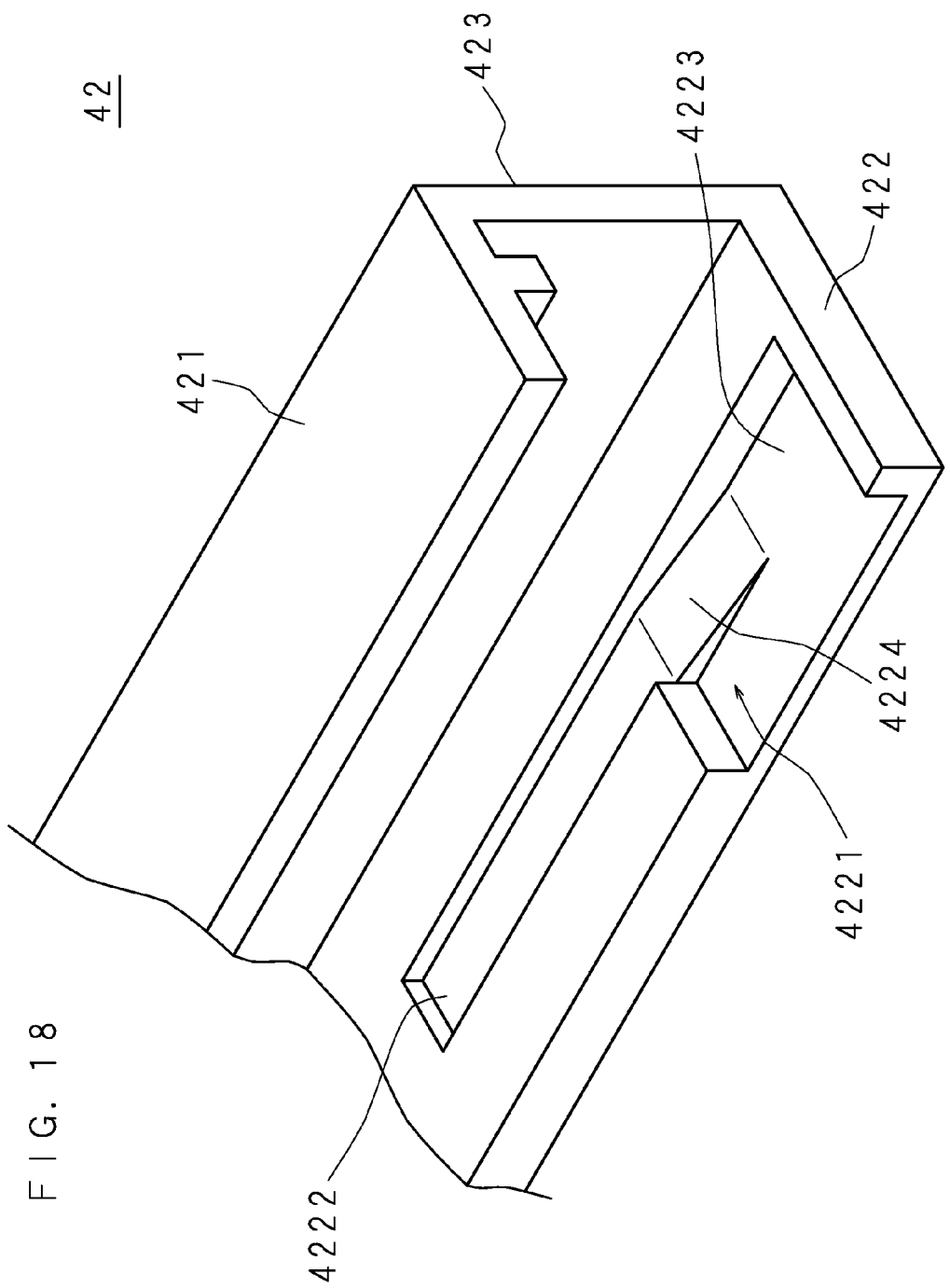
FIG. 18 is a perspective view of a concave part provided in a rear wall inner surface of a side frame.

FIG. 18 is a perspective view of a concave part 4221 provided in the inner surface of rear wall 422 of the side frame 42. The concave part 4221 includes a groove part 4222, a flat part 4223 and an inclined part 4224. The groove part 4222 is a concave cut in the rear wall 422 substantially parallel to the longitudinal direction of the side frame 42, and has a width to be fitted with the flat protrusion part 39.

The flat part 4223 is a flat surface cut more deeply than the groove part 4222 in one end direction of the groove part 4222. In order to attaching the side frame 42 to the backlight chassis 3 and the like, when sandwiching the backlight chassis 3 and the like by the side frame 42, the flat protrusion part 39 is housed in the flat part 4223 in such a manner that the flat apex thereof faces the surface of the flat part 4223. An interval between a flat surface of the flat part 4223 and the front wall 421 facing the flat part 4223 is wider than the thickness of the backlight chassis 3 and the like sandwiched therebetween including the flat protrusion part 39. Therefore, the backlight chassis 3 and the like including the flat protrusion part 39 can be inserted into the side frame 42 having a U-shaped cross section with no resistance. The direction from the flat part 4223 to the groove part 4222 is a direction opposite to the direction of sliding the side frame 42 with respect to the backlight chassis 3 and the like, for assembling the television receiver 1.

The inclined part 4224 is a gentle inclined face connecting the surface of the flat part 4223 and the bottom of the groove part 4222. When the side frame 42 is attached to the backlight chassis and the like, a height of the flat protrusion part 39 is greater than a distance between the rear surface of the bottom plate 32 of the backlight chassis 3 and the bottom of the groove part 4222, and lower than a distance between the rear surface of the bottom plate 32 of the backlight chassis 3 and the surface of the flat part 4223.

In order to fix the side frame 42 to the backlight chassis 3, when sliding the side frame 42, the flat protrusion part 39 moves from the flat part 4223 to the groove part 4222 via the inclined part 4224. Herein, the distance between the rear wall 422 and the front wall 421 is gradually smaller than the thickness of the backlight chassis 3 and the like including the flat protrusion parts 39. Therefore, the apex of the flat protrusion part 39 contacts the inclined face of the inclined part 4224, and then is fitted to the groove part 4222 while sliding. Further, when the side frame 42 is slid, the flat protrusion part 39 abuts the end portion of the groove part 4222, and the attachment of the side frame 42 to the backlight chassis 3 and the like is ended.

Figure 19C:
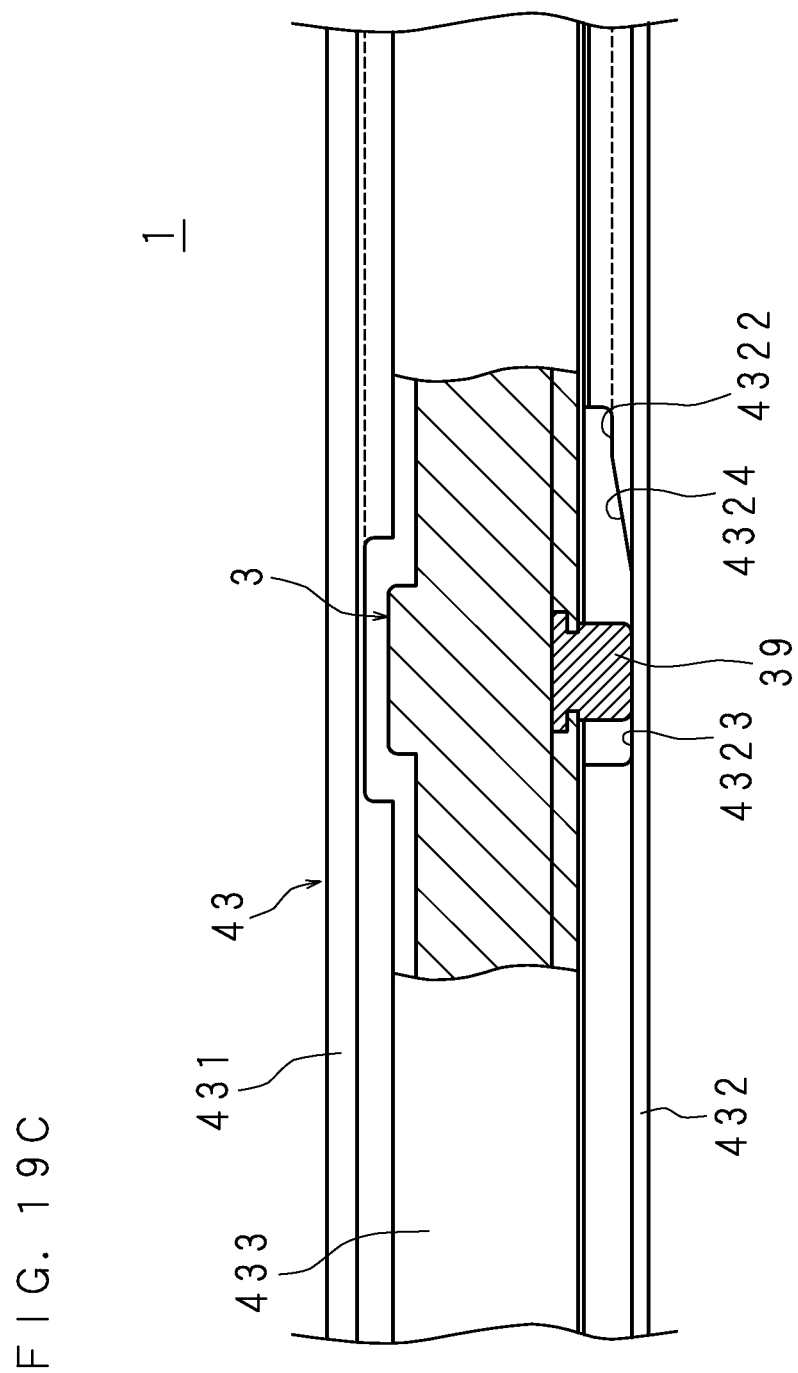
FIG. 19C is an explanatory view illustrating the attaching process of the side frame.

Next, an attaching process of the side frames 42 and 43 to the backlight chassis 3 and the like will be described with reference to the drawings. An attaching sequence of the upper frame 41 and the side frame 43 is the same as the attaching sequence of the side frame 42. FIGS. 19A, 19B and 19D are explanatory views illustrating the attaching process of the side frame 42. FIGS. 19C and 19E are explanatory views illustrating the attaching process of the side frame 43. In FIGS. 19A to 19E, the left illustrates the front side of the television receiver 1, and the right illustrates the rear side of the television receiver 1. FIGS. 19A, 19B and 19D are top cross-sectional views of the television receiver 1 in the right portion thereof. FIGS. 19C and 19E are side views of the imaginary television receiver 1 from which a part of the side wall 433 in the side frame 43 is partially removed. In FIGS. 19C and 19E, the top is the lower side of the television receiver 1.

FIG. 19A illustrates an inserting process of the side frame 42 into the backlight chassis 3 and the like. The side frame 42 is approached to the backlight chassis 3 in which all components from the reflective sheet 6 to the liquid crystal panel 2 and the panel cover 11 are attached. A part of the backlight chassis 3 and the like is inserted between the front wall 421 and the rear wall 422 of the side frame 42, and the flat protrusion part 39 is housed in a front space of the flat part 4223. At this time, since the distance between the front wall 421 and the flat part 4223 is larger than the thickness of the backlight chassis 3 and the like including the flat protrusion part 39, even when the apex of the flat protrusion part 39 abuts the flat part 4223, a gap is secured between the panel cover 11 and the front wall 421.

FIGS. 19B and 19C illustrate a process before sliding the respective side frame 42 and side frame 43 with respect to the backlight chassis 3 and the like. The flat protrusion parts 39 abut the ends of the flat parts 4223 and 4323, and the inserting process of the side frame 42 into the backlight chassis 3 and the like is ended. Also, in this state, the gap is secured between the panel cover 11 and the front wall 421. By the presence of the gap, it is possible to easily slide the side frame 42 with a light force.

The side frames 42 and 43 start the sliding. The apexes of the flat protrusion parts 39 contact the inclined parts 4224 and 4324. The side frames 42 and 43 are continuously slid, and the apexes of the flat protrusion parts 39 are slid with respect to the surface of the inclined parts 4224 and 4324. By the inclination of the inclined parts 4224 and 4324, the distance between the front walls 421 and 431 and the rear walls 422 and 432 is gradually reduced, and the gap between the panel cover 11 and the front walls 421 and 431 disappears. Further, when the side frames 42 and 43 are continuously slid, the backlight chassis 3 and the like including the flat protrusion parts 39 is guided by the inclined face of the inclined parts 4224 and 4324 and moves toward the front side. Therefore, the backlight chassis 3 and the like serves to push and open the side frames 42 and 43 having a U-shaped cross section. As a result, a force of fixing the backlight chassis 3 and the like by the side frames 42 and 43 is increased.

The apexes of the flat protrusion parts 39 ride on the bottoms of the groove parts 4222 and 4322. The flat protrusion parts 39 are fitted to the groove parts 4222 and 4322. Due to this fitting, the side frames 42 and 43 are locked to the backlight chassis 3 through the flat protrusion parts 39. In addition, the flat protrusion parts 39 abut the ends of the groove parts 4222 and 4322, and the attaching process of the side frames 42 and 43 to the backlight chassis 3 and the like is ended.

FIGS. 19D and 19E illustrate the state of the television receiver 1 after the sliding ends. The lamination from the backlight chassis 3 to the panel cover 11 is fixed by the side frames 42 and 43 in the front-back direction.

Further, the groove part 4222 has an edge on a side opposite to the direction in which the flat part 4223 is disposed (FIG. 18). However, the edge may not be provided in the groove part 4222. The upper end of the side frame 42 is provided with the tenon 426 which is fitted to the mortise 416 of the upper frame 41 (FIG. 7). When the groove part 4222 is not provided with the edge, the position of the tenon 426 can be freely advanced or retracted with respect to the mortise 416, so that the engagement of the upper frame 41 with the side frame 42 can be flexibly performed.

Figure 20:
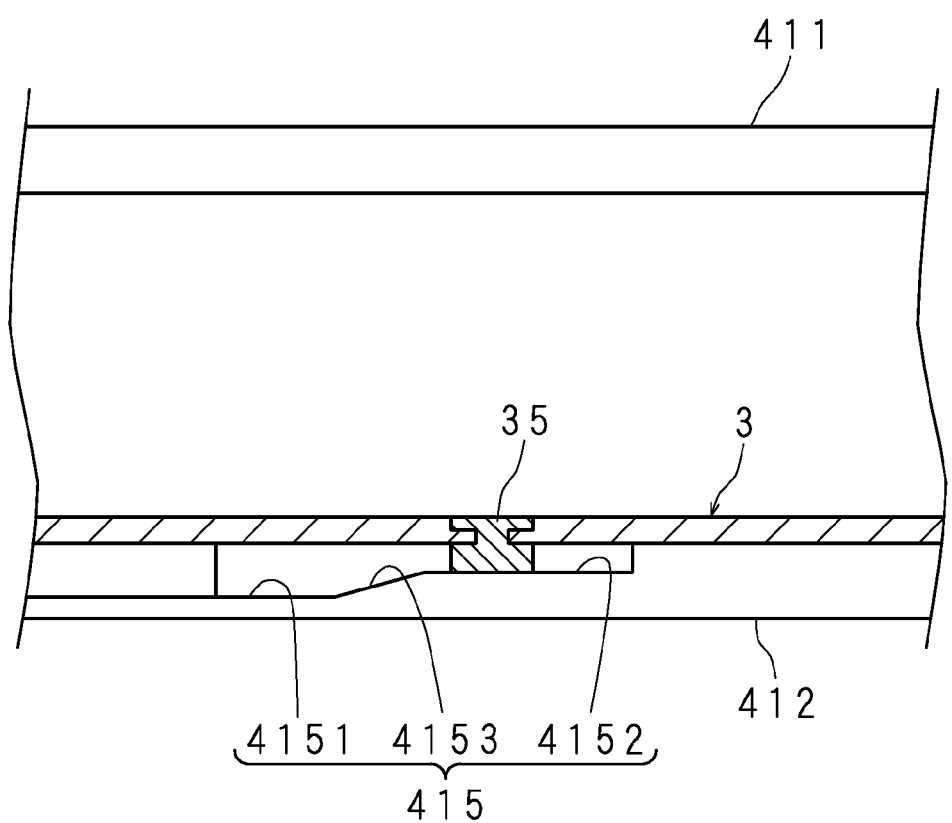
FIG. 20 is a partial top cross-sectional view of an upper frame.

In Embodiment 4, the inclined parts 4224 and 4324 are provided between the groove parts 4222 and 4322 and the flat parts 4223 and 4323. However, the structure corresponding to the inclined parts 4224 and 4324 may be provided in, for example, the groove part 415 of the upper frame 41 in Embodiment 1 (see FIG. 5B). FIG. 20 is a partial top cross-sectional view of the upper frame 41. FIG. 20 is a schematic cross-sectional view when cutting the upper frame 41 on a horizontal plane passing through the groove part 415. In FIG. 20, the top is the front side of the television receiver 1, and the bottom is the rear side of the television receiver 1. In the FIG. 20, the left is the left side of the television receiver 1 when seen from the rear side. FIG. 20 also shows the backlight chassis 3 and the protrusion part 35 by superimposing each other.

The groove part 415 has a first groove part 4151 and a second groove part 4152. A depth of the first groove part 4151 is deeper than the depth of the second groove part 4152. The first groove part 4151 and the second groove part 4152 are connected with each other by an inclined part 4153. The first groove part 4151 and the second groove part 4152 and the protrusion parts 35 can be fitted with each other. When the protrusion part 35 is fitted to the first groove part 4151, a gap is present between the panel cover 11 and the front wall 411. When the protrusion part 35 is fitted to the second groove part 4152, the gap between the panel cover 11 and the front wall 411 disappears, and thus the backlight chassis 3 and the like is sandwiched by the upper frame 41 to be fixed thereto. When the protrusion part 35 is moved by sliding from the first groove part 4151 to the second groove part 4152, since the protrusion part 35 moves via the inclined part 4153, the sliding of the upper frame 41 can be easily performed.

According to the television receiver 1, when sliding the upper frame 41 and the like, for attaching, the efficiency of assembly can be improved. The concave parts 4121, 4221 and 4321 have the groove parts 4222 and 4322, and the flat parts 4223 and 4323, whose depths are different each other. When the flat protrusion parts 39 are housed in front spaces of the flat parts 4223 and 4323, gaps are secured between the side frames 42 and 43 and the backlight chassis 3 and the like, and thereby the sliding may be easily performed. When the flat protrusion parts 39 are fitted to the groove parts 4222 and 4322, a force for sandwiching the backlight chassis 3 and the like by the side frame 42 is generated, in addition to the fitting of the flat protrusion parts 39 with the groove parts 4222 and 4322. The flat protrusion parts 39 are also fitted to the concave parts 4221 and 4321 of the upper frame 41 and the side frame 43, and the backlight chassis 3 and the like is temporarily fixed by the frame body 4. Since the inclined parts 4224 and 4324 are formed between the flat parts 4223 and 4323 and the groove parts 4222 and 4322, the component members of the television receiver 1 are continuously and smoothly transited from a state in which the gap is secured to a state in which the fixing (temporarily fixing) is ended.

Embodiment 4 is configured as described above, and other than that is the same as Embodiments 1 to 3, such that the corresponding parts will be denoted by the same reference numerals, and will not be described in detail.

Embodiment 5

Embodiment 5 relates to a configuration in which, as the convex-concave structure for fixing the frame body 4 to the backlight chassis 3, a T-shaped opening part is provided in the backlight chassis 3, and a T-shaped protrusion part which is fitted to the opening part is provided on the frame body 4.

Figure 21:
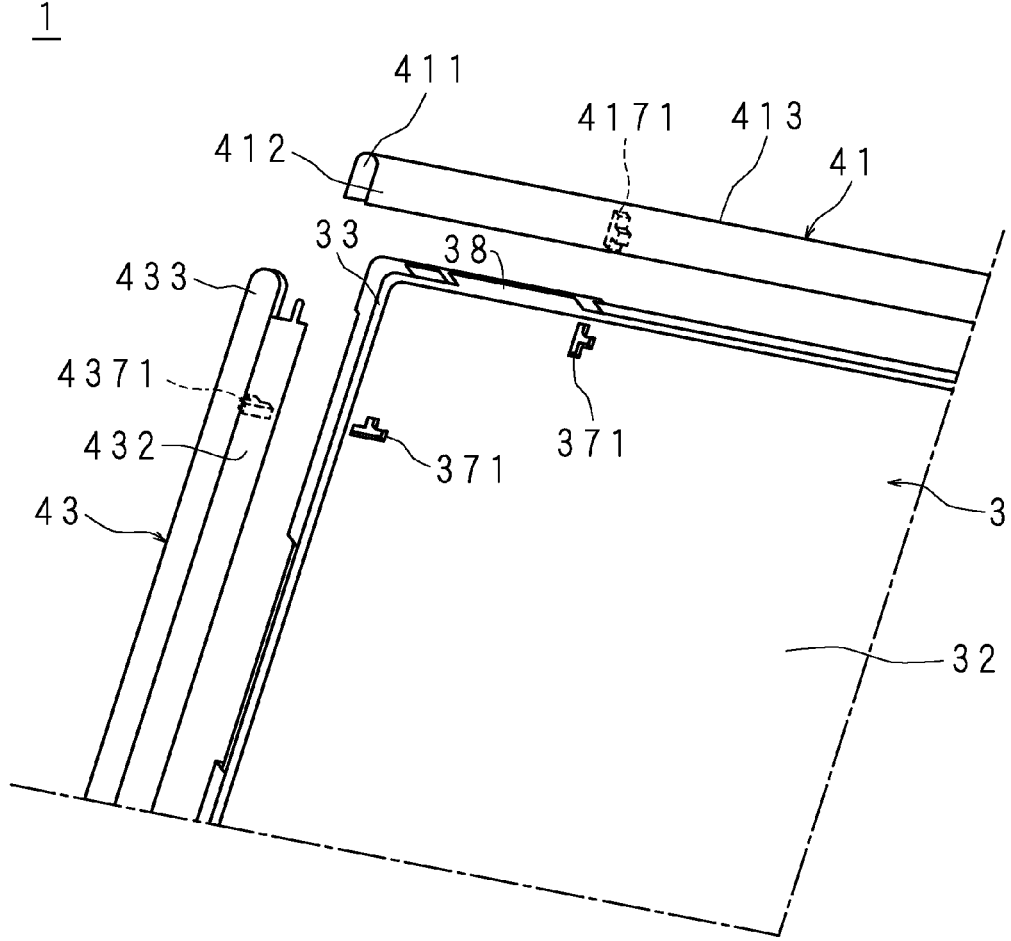
FIG. 21 is a partial perspective view of the television receiver in the step before attaching the frame body.

FIG. 21 is a partial perspective view of the television receiver 1 in the step before attaching the frame body 4. FIG. 21 illustrates a state in which the upper left portion of the television receiver 1 are seen obliquely from the rear upper left. The bottom plate 32 in the backlight chassis 3 is provided with a T-shaped opening part 371 on the peripheral edge part thereof. The T-shaped opening part 371 has an opening surface formed in a substantially T shape, when seen the backlight chassis 3 from the rear side. The T-shaped opening parts 371 are provided at a total of six places around both ends in the upper edge of the bottom plate 32 one by one, and around both ends of the left side edge and the right side edge thereof one by one, respectively. FIG. 21 illustrates two T-shaped opening parts 371 provided in the bottom plate 32 among them.

One segment forming the T shape is a rectangular opening or slit extending substantially parallel to the circumferential direction of the backlight chassis 3. The other segment forming the T shape is a rectangular opening or slit extending in a direction at substantially right angles to the circumferential direction of the backlight chassis 3. A direction from the openings extending in the direction substantially right angles to the circumferential direction of the backlight chassis 3 to the openings substantially parallel to the circumferential direction of the backlight chassis 3 is also the moving direction in which the upper frame 41 and the side frames 42 and 43 are slid in order to attach the upper frame 41 and the side frames 42 and 43 to the backlight chassis 3 and the like.

In order to fix the upper frame 41 and the side frame 43 to the backlight chassis 3, T-shaped protrusion parts 4171 and 4371 are provided on the rear walls 412 and 432 of the upper frame 41 and the side frame 43 corresponding to the T-shaped opening part 371. The T-shaped protrusion parts 4171 and 4371 respectively have a side cross-section and an upper cross-section, which are formed in a T shape.

Figure 22:
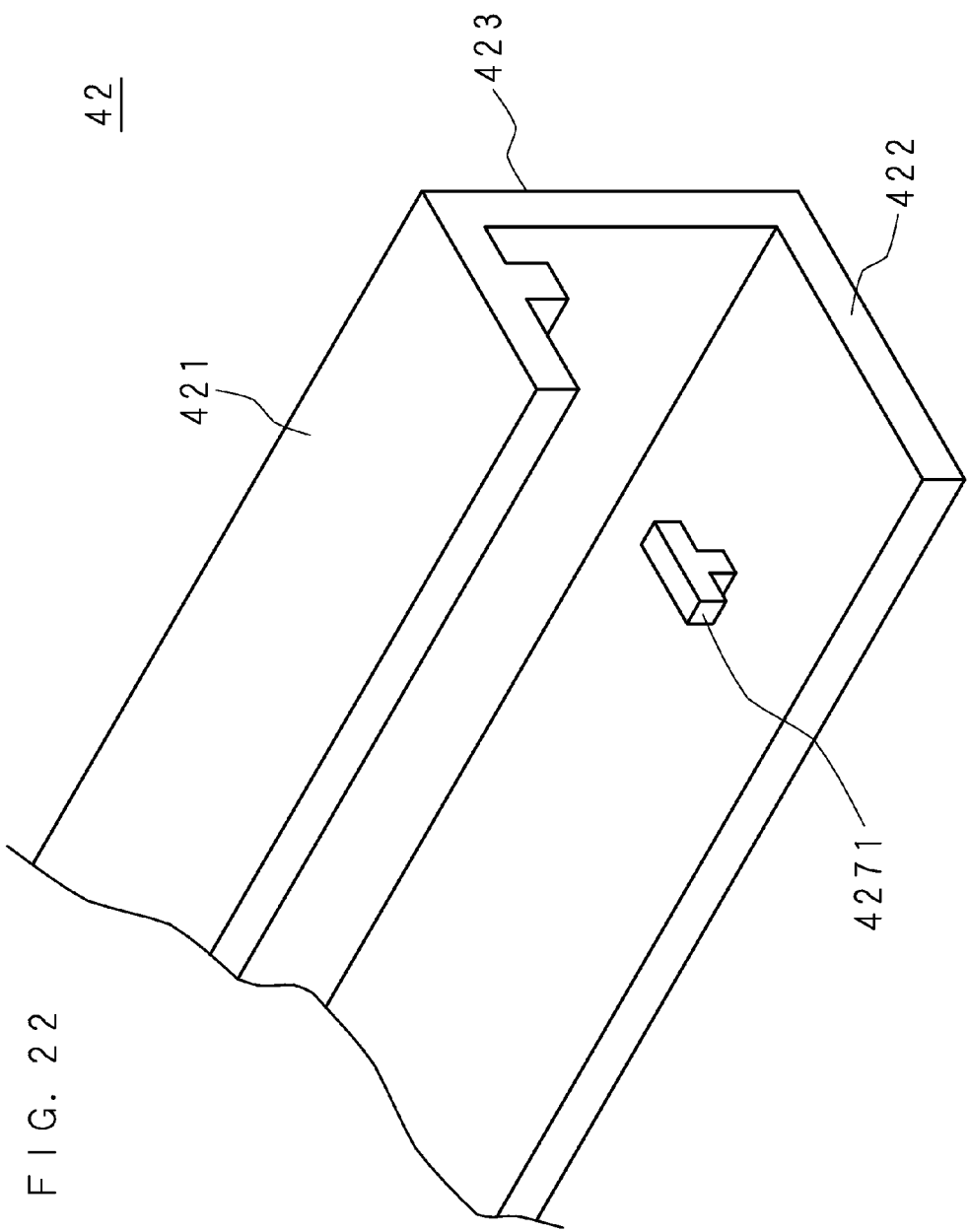
FIG. 22 is a perspective view of a T-shaped protrusion part provided on the rear wall inner surface of the side frame.

FIG. 22 is a perspective view of a T-shaped protrusion part 4271 provided on the inner surface of the rear wall 422 of the side frame 42. The T-shaped protrusion part 4271 has a leg part protruding rearward from the rear wall 422, and arm parts which are bifurcated from the leg part, and extend substantially parallel to the rear wall 422 within a plane perpendicular to the longitudinal direction of the side frame 42. Dimensions of the leg part are set to be loosely fitted to the openings extending in the direction subsequently right angles to the circumferential direction of the backlight chassis 3, and be fitted to the openings extending substantially parallel to the circumferential direction of the backlight chassis 3. In addition, a height of the leg part is slightly lower than the thickness of the bottom plate 32 in the backlight chassis 3. The dimensions of the arm part are set to be loosely fitted to the openings extending in the direction subsequently right angles to the circumferential direction of the backlight chassis 3.

When sandwiching the backlight chassis 3 and the like by the side frame 42, the side frame 42 is pressed to the backlight chassis 3 and the like. The arm parts of the T-shaped protrusion part 4271 are loosely fitted to the openings extending in the direction subsequently right angles to the circumferential direction of the backlight chassis 3 in the T-shaped opening part 371. Next, the side frame 42 is slid. The leg part of the T-shaped protrusion part 4271 is fitted to the opening extending substantially parallel to the circumferential direction of the backlight chassis 3. In this state, the arm parts of the T-shaped protrusion part 4271 abut the front surface of the bottom plate 32. Since the height of the leg part is slightly lower than the thickness of the bottom plate 32, the bottom plate 32 serves so as to press and expand between the rear wall 422 of the side frame 42 and the arm part of the T-shaped protrusion part 4271. On the other hand, the rear wall 422 of the side frame 42 and the arm part of the T-shaped protrusion part 4271 serve so as to sandwich the bottom plate 32 around the opening extending substantially parallel to the circumferential direction of the backlight chassis 3 in the T-shaped opening part 371. Thereby, the side frame 42 is fixed to the backlight chassis 3. The upper frame 41 and the side frame 43 are also fixed to the backlight chassis 3 similarly to the side frame 42.

Figure 23:
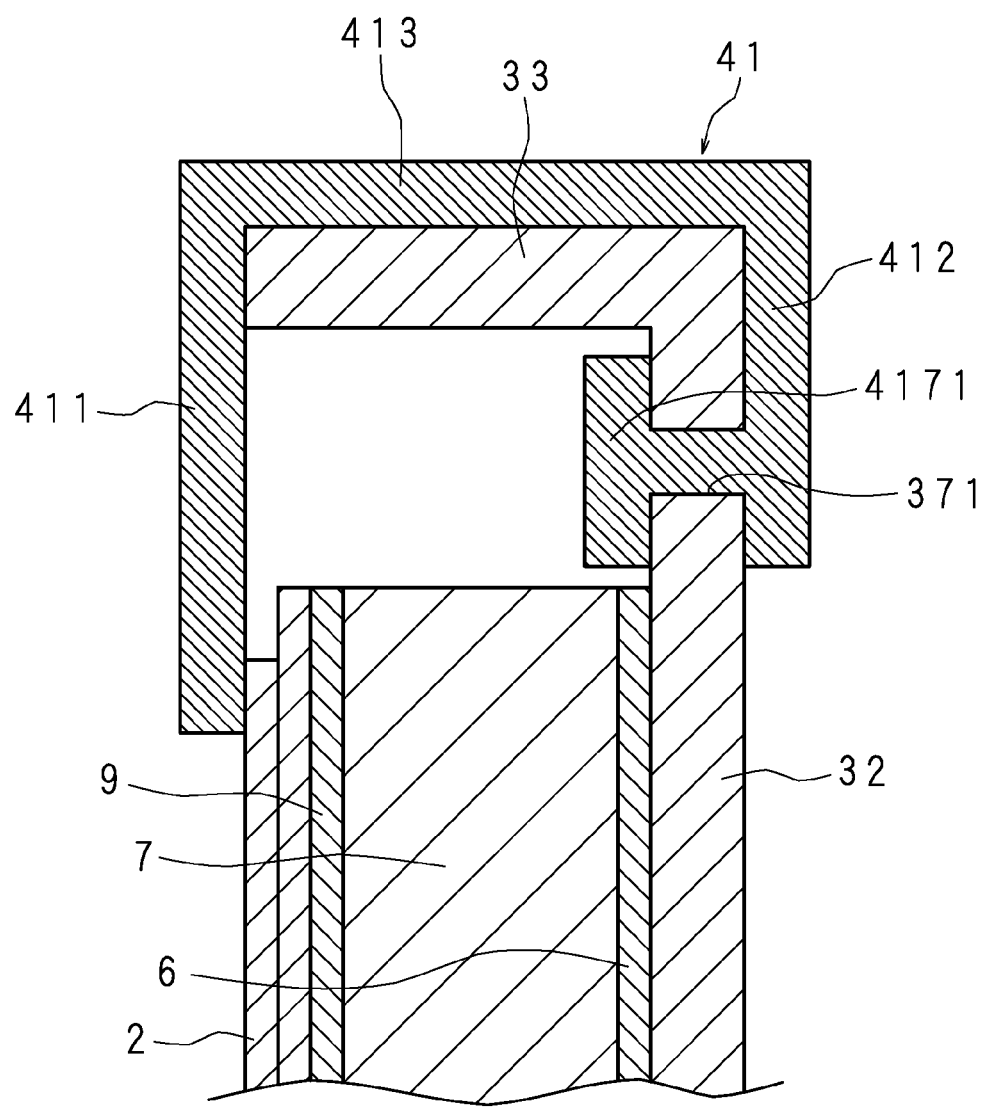
FIG. 23 is a partial cross-sectional view of the television receiver.

FIG. 23 is a partial cross-sectional view of the television receiver 1. FIG. 23 is a top cross-section view of the television receiver 1 in the left part thereof. In the FIG. 23, the left corresponds to the front side of the television receiver 1, and the right corresponds to the rear side of the television receiver 1. In FIG. 23, the light shielding holder 10 and the panel cover 11 are not illustrated, thereby simplifying the illustration. In FIG. 23, the bottom plate 32 of the backlight chassis 3 is sandwiched between the rear wall 412 of the upper frame 41 and the arm part of the T-shaped protrusion part 4171. Thereby, the upper frame 41 is fixed to the backlight chassis 3. In addition, the upper frame 41 fixed to the backlight chassis 3 sandwiches the backlight chassis 3 and the like in the front and back.

In Embodiment 5, the convex part provided on the frame body 4 is the T-shaped protrusion parts 4171, 4271 and 4371, and the opening provided in the backlight chassis 3 is the T-shaped opening part 371. However, the two arm parts included in the T-shaped protrusion parts 4171, 4271 and 4371 may be provided as only one arm in the T-shaped protrusion part. In this case, the convex part has a cross-section formed in an L shape. When the convex part has a cross-section formed in the L shape, the shape of the opening provided in the backlight chassis 3 may be formed in an L shape.

According to the television receiver 1, it is also possible to sandwich the backlight chassis 3 and the like by the upper frame 41 and the side frames 42 and 43, and be slid the same, by fitting the T-shaped protrusion parts 4171, 4271 and 4371 with the T-shaped opening part 371. Therefore, the attaching of the frame body 4 can be easily performed Embodiment 5 is configured as described above, and other than that is the same as Embodiments 1 to 4, such that the corresponding parts will be denoted by the same reference numerals, and will not be described in detail.

Embodiment 6

Figure 24:
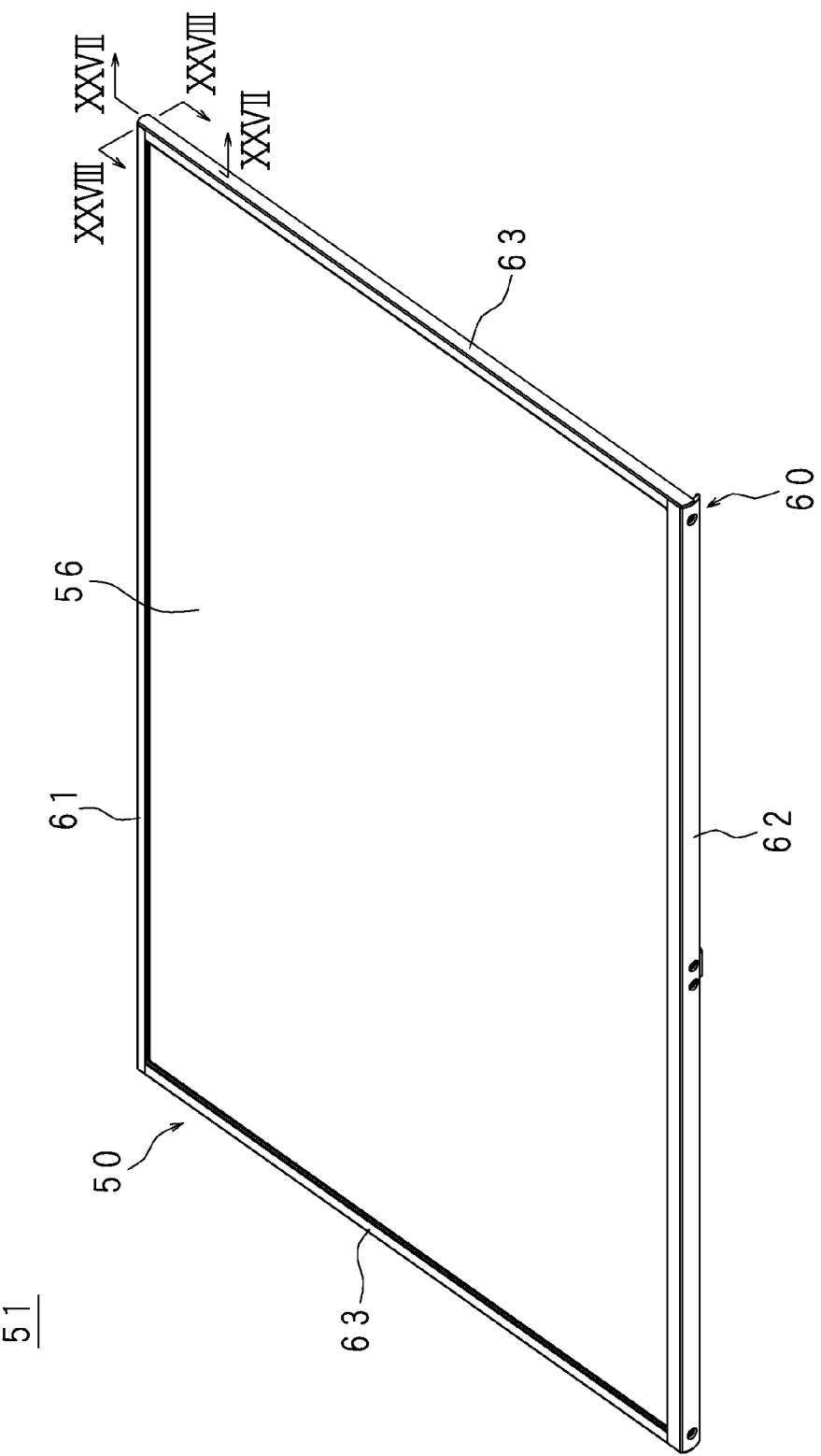
FIG. 24 is a schematic perspective view of a television receiver according to Embodiment 6.
Figure 25:
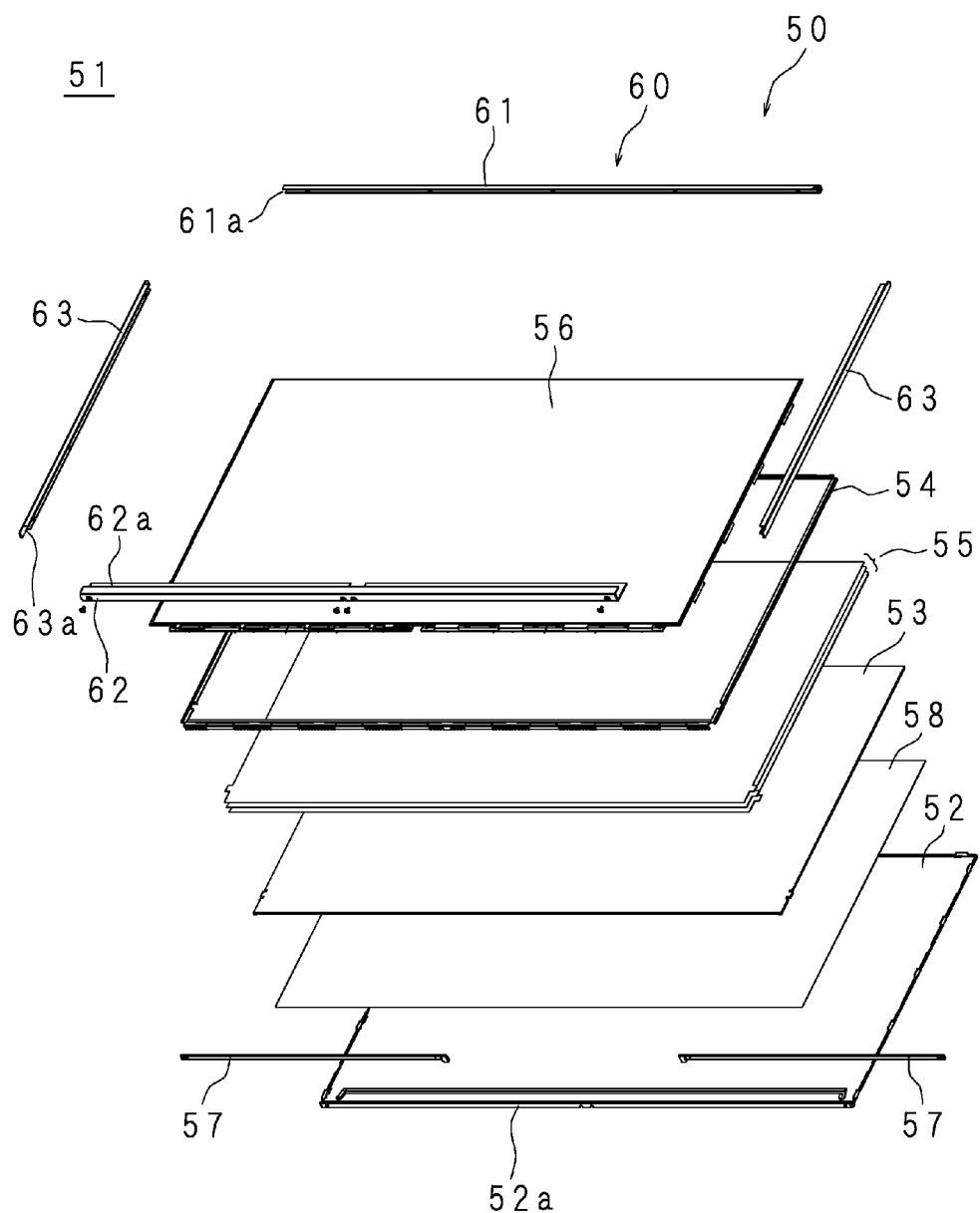
FIG. 25 is a schematic exploded perspective view of the television receiver.

Hereinafter, Embodiment 6 will be described in detail. FIG. 24 is a schematic perspective view of a television receiver according to Embodiment 6, and FIG. 25 is a schematic exploded perspective view of the television receiver.

A television receiver 51 includes a display apparatus 50 that displays an image, a tuner (receiving unit) which is arranged in the display apparatus 50 and receives a broadcast wave from an antenna (not illustrated), and a decoder which is arranged in the display apparatus 50 and decodes an encoded broadcast wave. In the television receiver 51, the broadcast wave received by the tuner is decoded by the decoder and an image is displayed on the display apparatus 50 based on the decoded information.

The display apparatus 50 includes a rectangular plate-shaped backlight chassis 52. The backlight chassis 52 has a protrusion plat part 52a protruding forward at right angles to the front side on a longitudinal edge part thereof. A light source, for example, an LED substrate 57 is supported on the protrusion plat part 52a. A reflection plate 58 is provided on the front of the backlight chassis 52, and a light guide plate 53 is provided on the front of the reflection plate 58. Further, the LED substrate 57 is fixed to the protrusion plat part 52a so that LEDs mounted on the LED substrate 57 face a peripheral surface of the light guide plate 53.

A light shielding part 54 is provided on the peripheral edge part of the light guide plate 53. A plurality of optical sheets 55, 55, . . . , 55 are provided on the front of the light guide plate 53, and a display panel 56 is provided on the front of the optical sheet 55. The display panel 56 is formed in a laterally long rectangular shape, and is a liquid crystal panel, for example. The peripheral edge parts of the display panel 56, the optical sheet 55, the light guide plate 53 and the backlight chassis 52 are surrounded by a laterally long rectangular frame body 60.

Light emitted from the LED substrate 57 is made incident inside of the light guide plate 53, emitted from the front of the light guide plate 53, and passes through the display panel 56. A user may view the image displayed on the display panel 56.

The frame body 60 has an upper frame member 61 and a lower frame member 62 which are laid along a longitudinal edge portion of the display panel 56, and two horizontal frame members 63 and 63 laid along edge portions perpendicular to the longitudinal edge portions. Both end parts of the horizontal frame member 63 and end parts of the upper frame member 61 and the lower frame member 62 are connected with each other to form the rectangular frame body 60.

The upper frame member 61, the lower frame member 62, and the horizontal frame members 63 and 63 include insertion grooves (panel insertion grooves) 61a, 62a, 63a and 63a formed along the edge portions of the display panel 56. The peripheral edge parts of the display panel 56, the optical sheet 55, the light guide plate 53 and the backlight chassis 52 are inserted in the insertion grooves 61a, 62a, 63a and 63a. The upper frame member 61, the lower frame member 62, and the horizontal frame member 63 sandwich the display panel 56, the optical sheet 55, the light guide plate 53, the reflection plate 58 and the backlight chassis 52, and hold the same.

Figure 26:
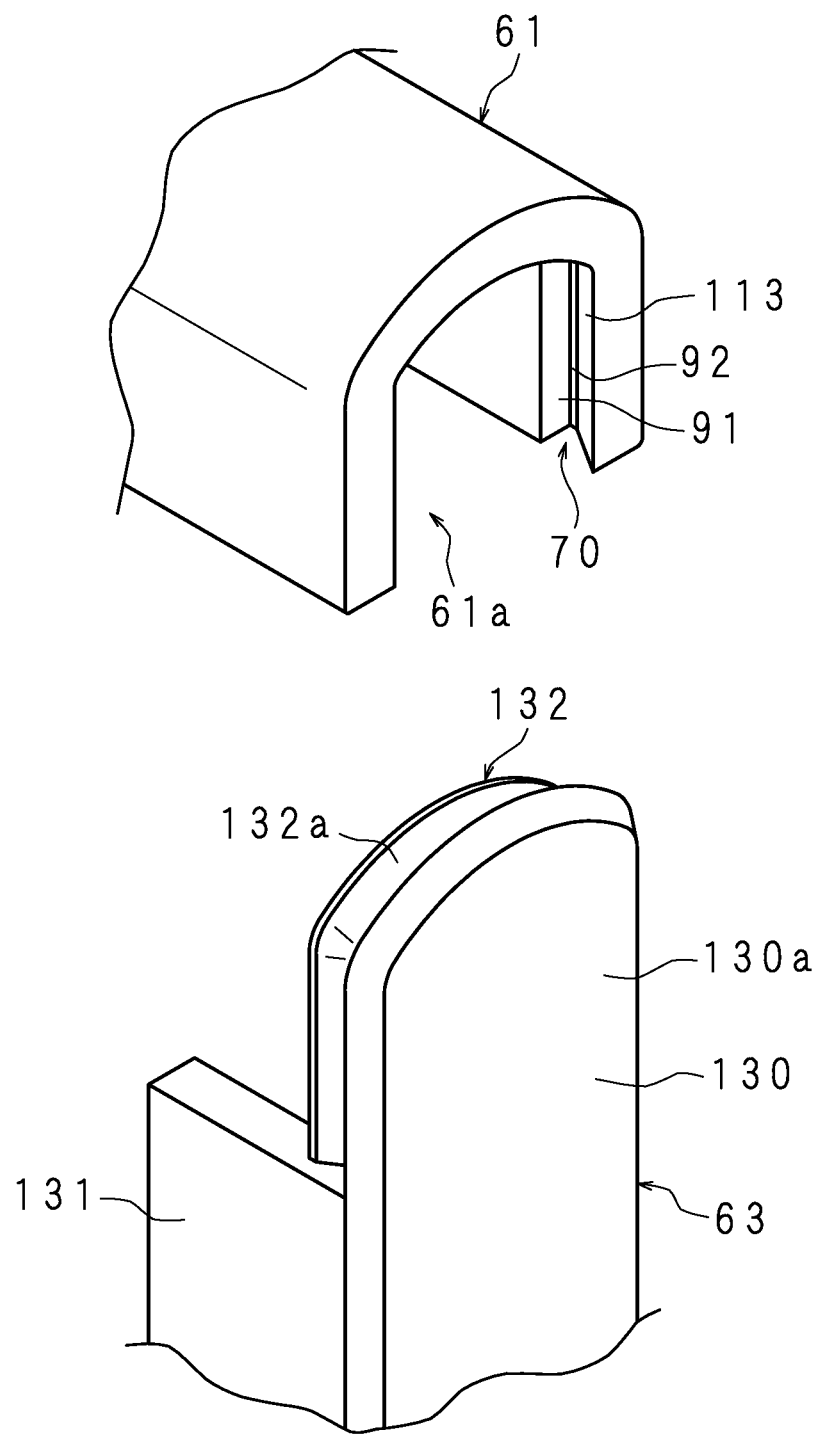
FIG. 26 is a partial exploded perspective view schematically illustrating a connection portion of an upper frame member and a horizontal frame member.
Figure 27:
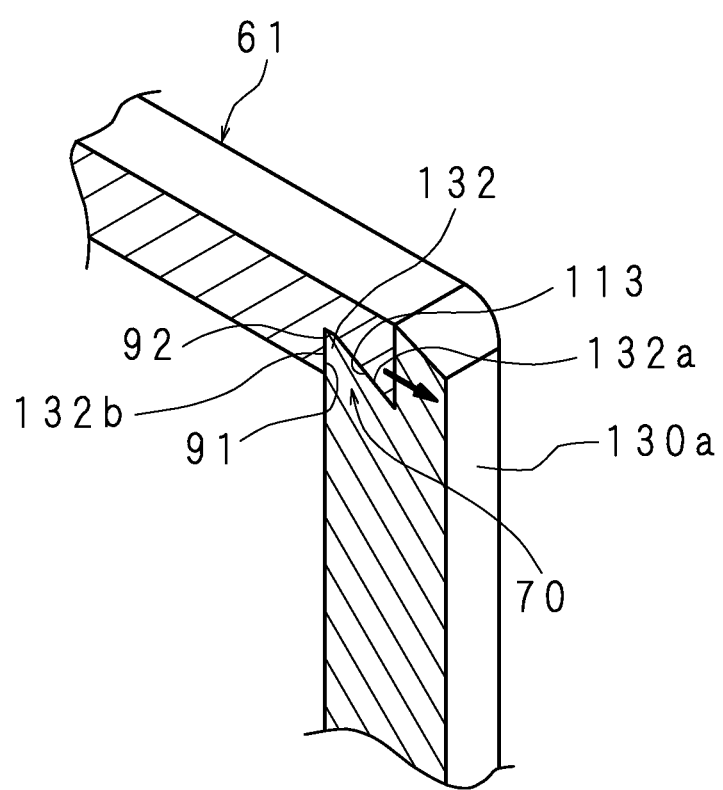
FIG. 27 is a partial cross-sectional view taken on line XXVII-XXVII illustrated in FIG. 24.
Figure 28:
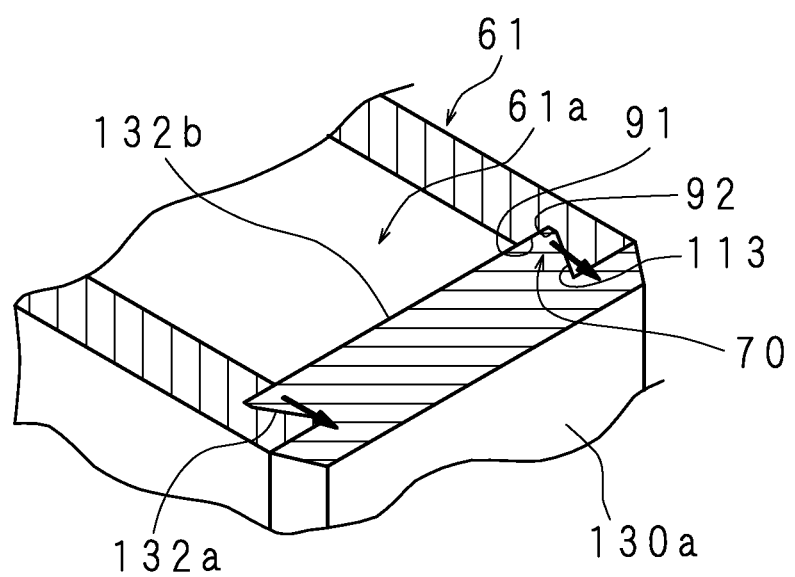
FIG. 28 is a partial cross-sectional view taken on line XXVIII-XXVIII illustrated in FIG. 24.

FIG. 26 is a partial exploded perspective view schematically illustrating a connection portion of the upper frame member 61 and the horizontal frame member 63, FIG. 27 is a partial cross-sectional view taken on line XXVII-XXVII illustrated in FIG. 24, and FIG. 28 is a partial cross-sectional view taken on line XXVIII-XXVIII illustrated in FIG. 24.

The insertion groove 61a of the upper frame member 61 has a cross-section formed in a U shape in a cutting plane orthogonal to the longitudinal direction. A U-shaped fitting groove 70 (fitting concave part) to which a sharp end protrusion 132 which will be described below is formed in the end part of the upper frame member 61 at sides and bottom (inner peripheral surface) of the insertion groove 61a. The fitting groove 70 has a cross-section formed in a V shape.

The fitting groove 70 has sides 91 perpendicular to the longitudinal direction of the upper frame member 61, a bottom 92 which continues to the sides 91 and is parallel to the longitudinal direction of the upper frame member 61, and an inclined face 113 which continues to the bottom 92 and intersects in the longitudinal direction of the upper frame member 61. As illustrated in FIG. 27, in the bottom part of the insertion groove 61a, the inclined face 113 is inclined in a direction intersecting two peripheral surfaces of the display panel 56 orthogonal to each other.

The horizontal frame member 63 has an elongated base plate 130 facing the peripheral surface of the display panel 56, and plate-shaped ribs 131 and 131 protruding from both longitudinal edges of the base plate 130 at right angles. Both ribs 131 and 131 protrude to the upper frame member 61 side and extend along the base plate 130. The rib 131 does not protrude from both end parts of the base plate 130, however, both end parts of the base plate 130 protrude in the longitudinal direction from the rib 131 (hereinafter, the protruding portion is referred to as a protrusion part 130a).

An end portion of the protrusion part 130a is formed in a semicircular plate shape protruding outward. The sharp end protrusion 132 protruding outward is formed on the outer peripheral surface of the protrusion part 130a. The sharp end protrusion 132 includes an opposed face 132b which faces the sides 91 and is parallel to the longitudinal direction of the horizontal frame member 63, and an inclined face 132a which intersects the opposed face 132b and is inclined in substantially the same direction as the inclined face 113.

A worker connects the upper frame member 61 with the horizontal frame member 63 by inserting the sharp end protrusion 132 into the fitting groove 70. The sharp end protrusion 132 is inserted from the open side of the insertion groove 61a. The opposed face 132b of the sharp end protrusion 132 moves on the sides 91 of the fitting groove 70, and the sides 91 of the fitting groove 70 guide the opposed face 132b of the sharp end protrusion 132.

The inclined face 132a of the sharp end protrusion 132 faces the inclined face 113 of the fitting groove 70, and the sharp end protrusion 132 moves inside of the fitting groove 70. The fitting groove 70 has the bottom 92 parallel to the longitudinal direction of the upper frame member 61, and the tip of the sharp end protrusion 132 smoothly moves along the bottom 92. When the fitting groove 70 does not have the bottom 92, the tip of the sharp end protrusion 132 is caught by a sharp gap formed by the inclined face 113 and the side 91 of the fitting groove 70, thereby the tip cannot move smoothly.

As described above, in the bottom part of the insertion groove 61a, the inclined face 113 of the fitting groove 70 is inclined in the direction intersecting two peripheral surfaces of the display panel 56 orthogonal to each other. In addition, the inclined face 132a of the sharp end protrusion 132 is inclined in substantially the same direction as the inclined face 113 of the fitting groove 70.

Therefore, as illustrated by arrows in FIGS. 27 and 28, when the entire sharp end protrusion 132 is fitted to the fitting groove 70, a force is applied from the inclined face 132a of the sharp end protrusion 132 to the inclined face 113 of the fitting groove 70, and the upper frame member 61 approaches the horizontal frame member 63.

In the television receiver 51 according to Embodiment 6, the fitting groove 70 is formed in the insertion groove 61a of the upper frame member 61, and the protrusion part 130a of the end part of the horizontal frame member 63 is fitted to the fitting groove 70, thereby preventing the occurrence of the gap. Therefore, the entry of dust and the light leakage can be prevented, and appearance quality can be improved.

In addition, since the sharp end protrusion 132 is inserted into the fitting groove 70 having a V-shaped cross section, the sharp end protrusion 132 comes into close contact with the fitting groove 70, and thereby the entry of dust and the light leakage can be reliably prevented. In addition, since the inclined face 113 which is inclined in the direction intersecting two peripheral surfaces of the display panel 56 orthogonal to each other is formed in the fitting groove 70, a force coming into close proximity to the upper frame member 61 acts on the horizontal frame member 63, and thereby the horizontal frame member 63 and the upper frame member 61 can be solidly connected with each other.

Further, after connecting, there is no need to close the gap, and thus manufacturing processes can be reduced.

Embodiment 7

Figure 29:
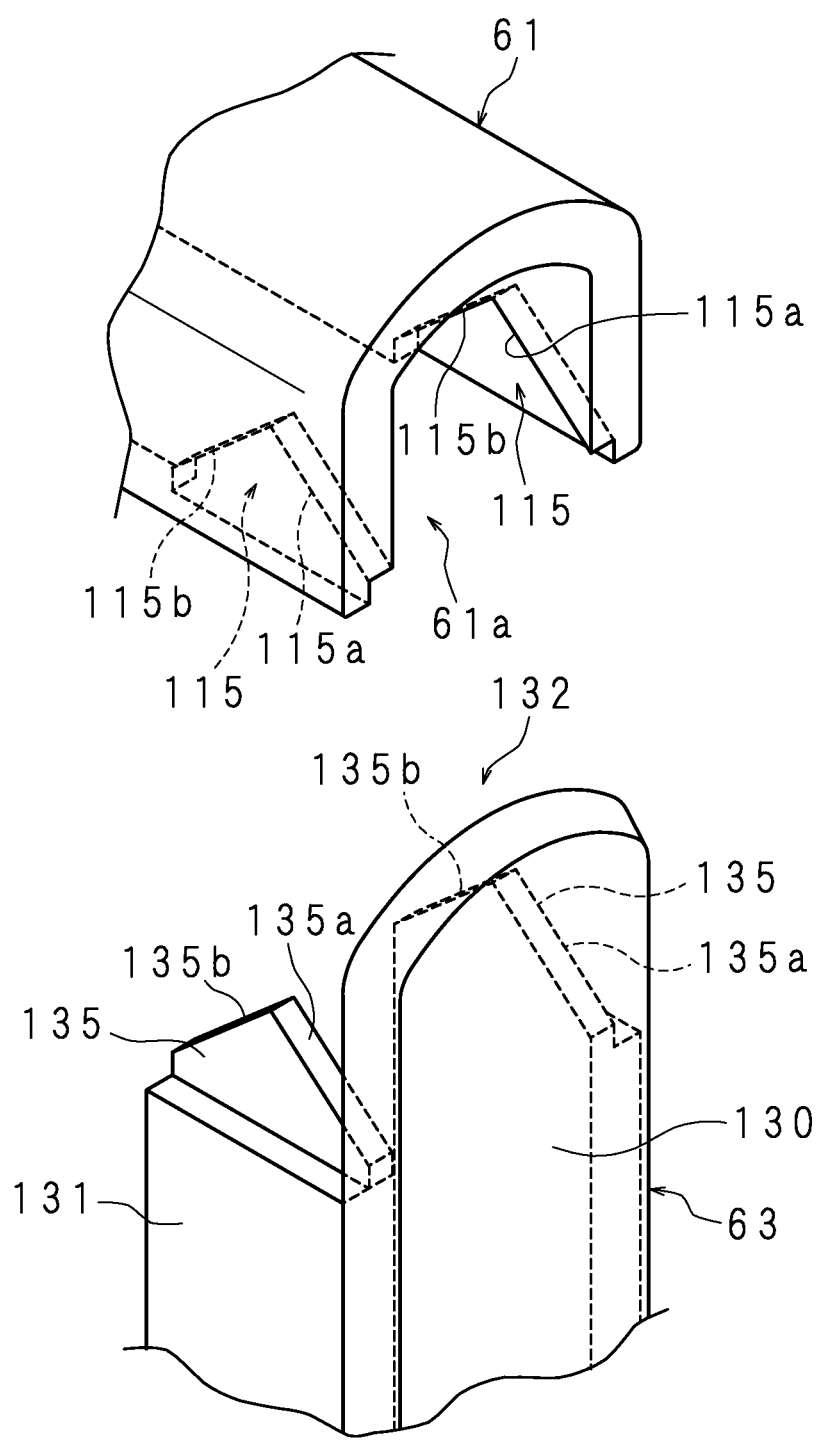
FIG. 29 is a partial exploded perspective view schematically illustrating a connection portion of an upper frame member and a horizontal frame member of a television receiver according to Embodiment 7.
Figure 30:
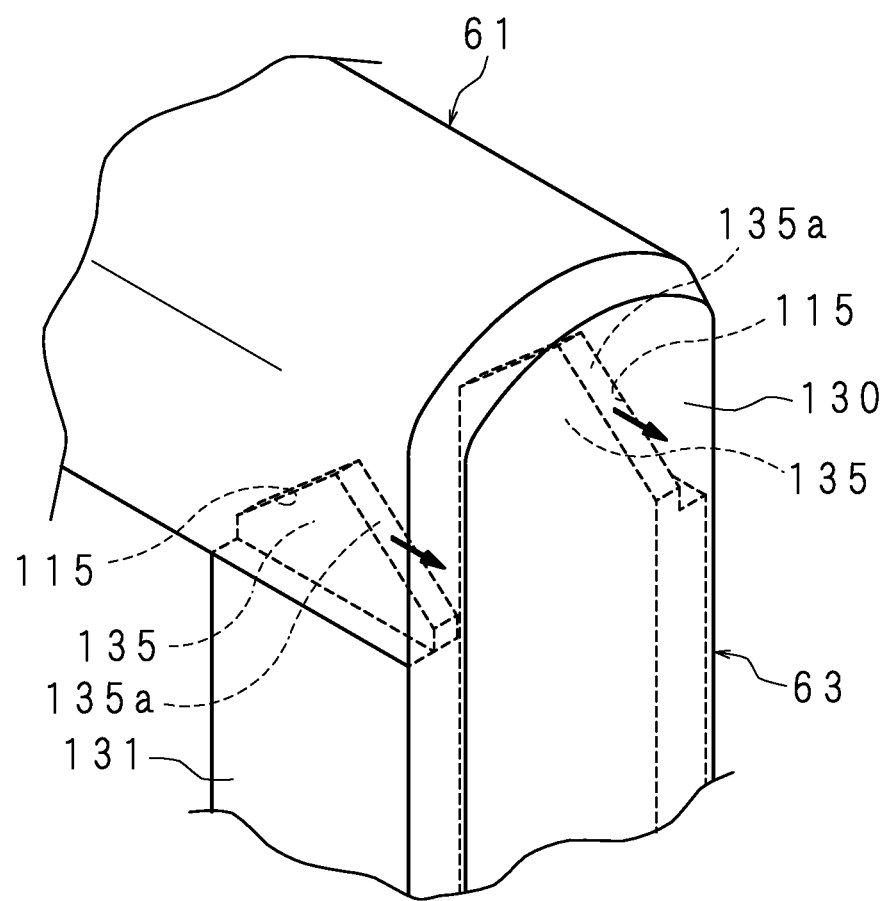
FIG. 30 is an enlarged perspective view schematically illustrating the connection portion of the upper frame member and the horizontal frame member.

Hereinafter, Embodiment 7 will be described in detail. FIG. 29 is a partial exploded perspective view schematically illustrating a connection portion of the upper frame member 61 and the horizontal frame member 63, and FIG. 30 is an enlarged perspective view schematically illustrating the connection portion of the upper frame member 61 and the horizontal frame member 63.

The end part of the upper frame member 61 is provided with fitting grooves 115 and 115 (fitting concave parts) formed in both sides of the insertion groove 61a. The fitting groove 115 is opened to the horizontal frame member 63 side. When a surface orthogonal to the front-back direction is set to the cutting surface, the fitting groove 115 has a cross section formed in an inverted V shape.

Two facing sides 115a and 115b of the fitting groove 115 are inclined with respect to the longitudinal direction (vertical direction) of the horizontal frame member 63, and an opposing distance between the both sides 115a and 115b becomes shorter with increasing distance away from the horizontal frame member 63. In other words, the opposing distance becomes shorter toward the bottom side of the insertion groove 61a. The side 115a of the fitting groove 115 near the end part of the upper frame member 61 is inclined in the direction intersecting two peripheral surfaces of the display panel 56 orthogonal to each other, in the front view.

The rib 131 of the horizontal frame member 63 has a sharp end portion (protrusion part) 135 protruding outward from the end part thereof. The sharp end portion 135 is formed in a triangular plate shape with the upper frame member 61 side as an apex. The sharp end portion 135 has two inclined faces 135a and 135b perpendicular thereto on the front of the rib 131. Both inclined faces 135a and 135b correspond to the both sides 115a and 115b, and the respective inclined faces 135a and 135b are inclined in substantially the same direction as the respective sides 115a and 115b. The distance between the inclined faces 135a and 135b corresponds to the opposing distance between the sides 115a and 115b.

A worker connects the upper frame member 61 with the horizontal frame member 63 by inserting the sharp end portion 135 of the rib 131 into the fitting groove 115. The sharp end portion 135 is inserted from the opening side of the insertion groove 61a. The both inclined faces 135a and 135b abut the both sides 115a and 115b.

As described above, the side 115a of the fitting groove 115 near the end part of the upper frame member 61 is inclined in the direction intersecting two peripheral surfaces of the display panel 56 orthogonal to each other, in the front view. Therefore, as illustrated by arrows in FIG. 30, when the inclined face 135a abuts the side 115a, a force acts from the inclined face 135a to the side 115a, such that the upper frame member 61 approaches the horizontal frame member 63.

Further, the connection structure of the lower frame member 62 and the horizontal frame member 63 can be configured the same as the connection structure of the upper frame member 61 and the horizontal frame member 63.

In the television receiver 51 according to Embodiment 7, the fitting groove 115 is formed in the insertion groove 61a of the upper frame member 61, and the protrusion part at the end of the horizontal frame member 63 is fitted to the fitting groove 115, thereby preventing the occurrence of the gap. Therefore, the entry of dust and the light leakage can be prevented, and appearance quality can be improved.

In addition, since the fitting groove 115 having the cross section formed in an inverted V shape is formed in the side of the insertion groove 61a, and the opposing distance between the both sides 115a and 115b of the fitting groove 115 becomes shorter with increasing distance away from the horizontal frame member 63, positioning of the upper frame member 61 and the horizontal frame member 63 can be easily performed. Further, since the side 115a of the fitting groove 115 near the end part of the upper frame member 61 is inclined in the direction intersecting two peripheral surfaces of the display panel 56 orthogonal to each other, in the front view, a force coming into close proximity to the upper frame member 61 acts on the horizontal frame member 63, and thereby the horizontal frame member 63 and the upper frame member 61 can be solidly connected with each other. Further, after connecting, there is no need to close the gap, and manufacturing process can be reduced.

The configuration that is the same as Embodiment 6 of the configuration according to Embodiment 7 will be denoted by the same reference numerals, and will not be described in detail.

Embodiment 8

Figure 31:
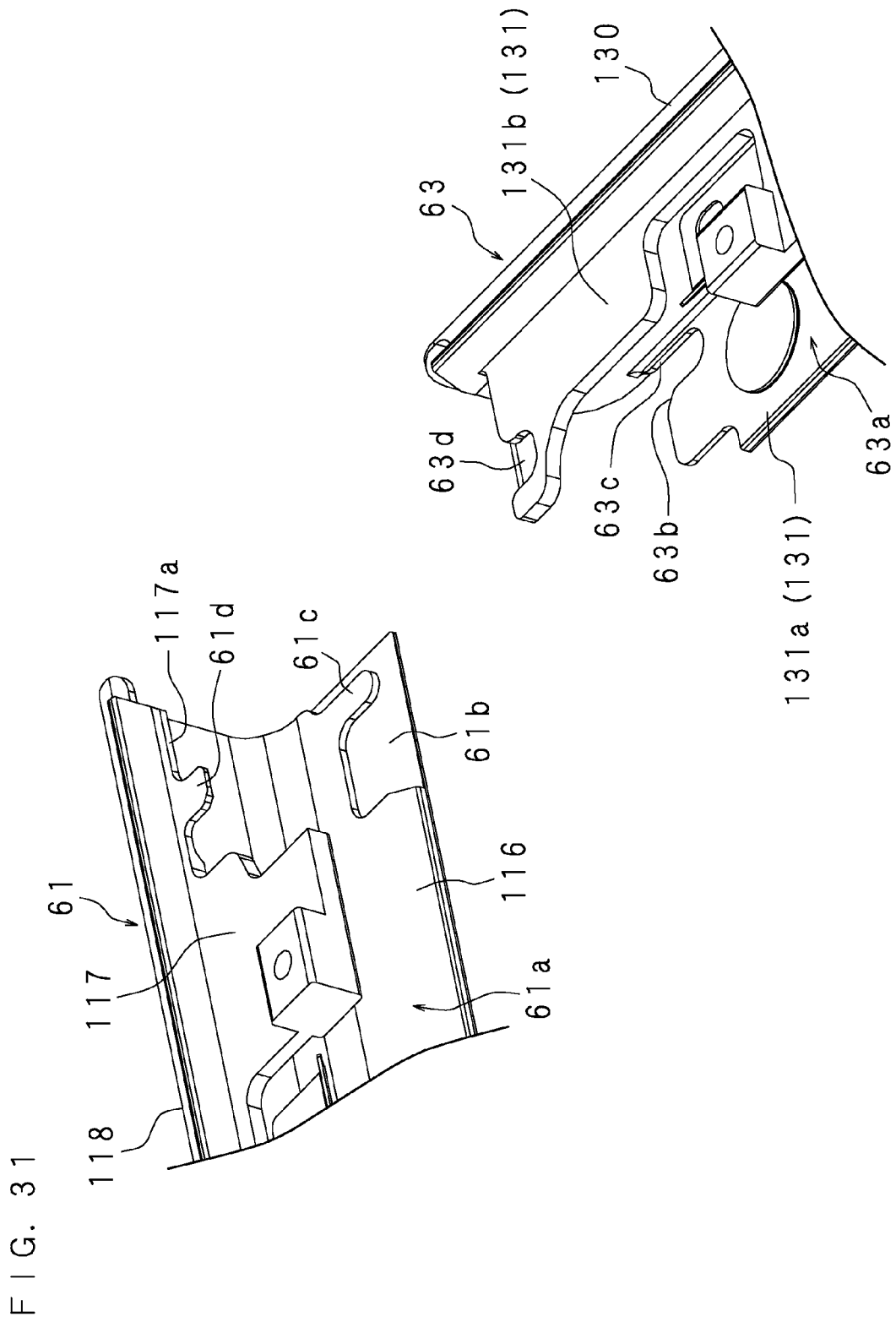
FIG. 31 is a partial exploded perspective view schematically illustrating a connection portion of an upper frame member and a horizontal frame member of a television receiver according to Embodiment 8 as seen from a rear side thereof.
Figure 32:
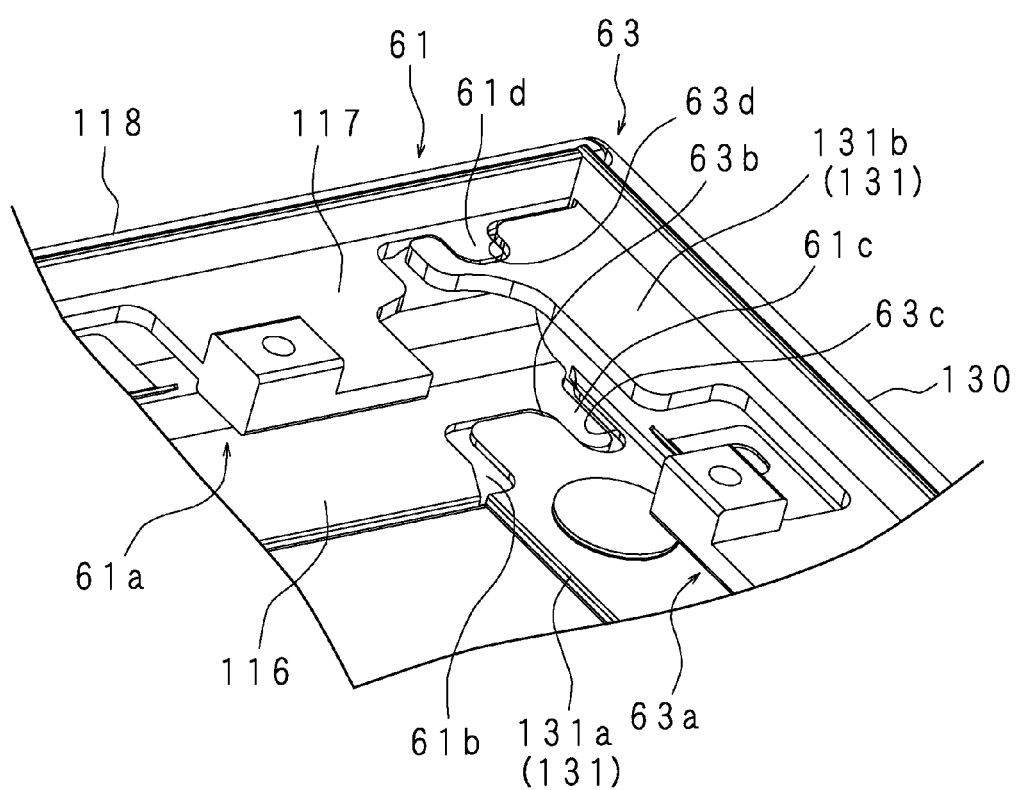
FIG. 32 is a partial perspective view schematically illustrating the connection portion of the upper frame member and the horizontal frame member as seen from the rear side.
Figure 33:
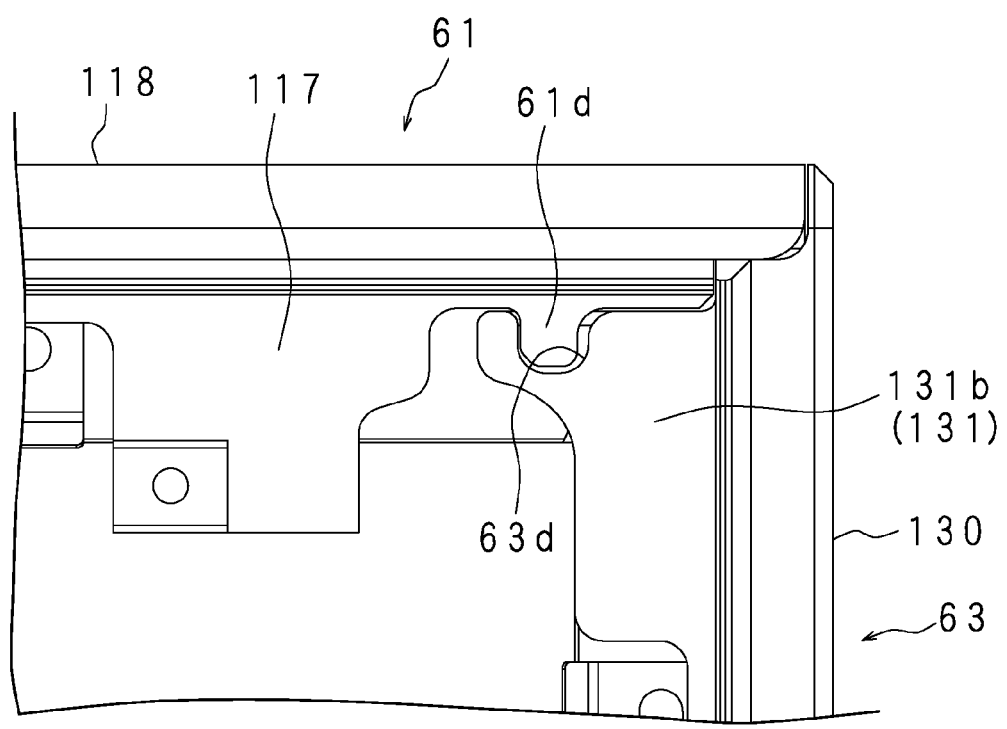
FIG. 33 is a partial rear view schematically illustrating the connection portion of the upper frame member and the horizontal frame member.
Figure 34:
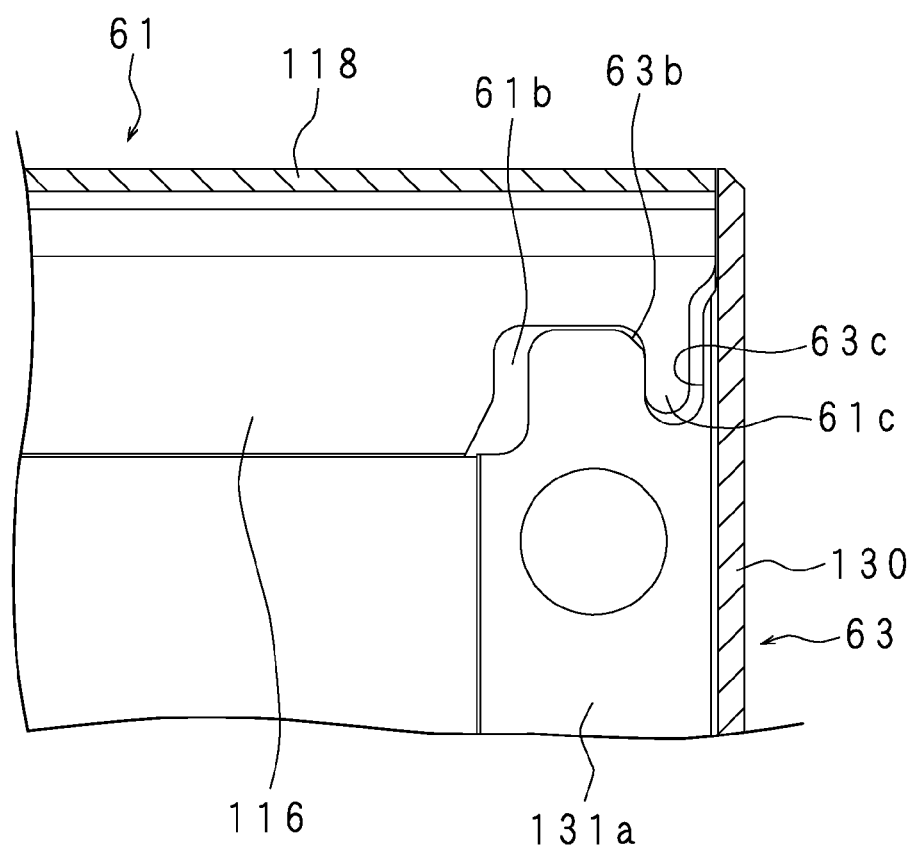
FIG. 34 is a partial cross-sectional view schematically illustrating a protrusion part and a notch.

Hereinafter, Embodiment 8 will be described in detail. FIG. 31 is a partial exploded perspective view schematically illustrating a connection portion of the upper frame member 61 and the horizontal frame member 63 as seen from the rear side, FIG. 32 is a partial perspective view schematically illustrating the connection portion of the upper frame member 61 and the horizontal frame member 63 as seen from the rear side, FIG. 33 is a partial rear view schematically illustrating the connection portion of the upper frame member 61 and the horizontal frame member 63, and FIG. 34 is a partial cross-sectional view schematically illustrating a protrusion part and a notch.

The upper frame member 61 has an elongated base plate 118 facing the peripheral surface of the display panel 56, and a plate-shaped front rib 116 and a rear rib 117 which protrude from both longitudinal edges of the base plate 118 at right angles. The front rib 116 and the rear rib 117 protrude to the horizontal frame member 63 side and extend along the base plate 118. The inner peripheral surface of the upper frame member 61 surrounded by the base plate 118, the front rib 116 and the rear rib 117 forms the insertion groove 61a.

The rear surface of the front rib 116 (in other words, the inner peripheral surface of the upper frame member 61 or the side of the insertion groove 61a) is provided with a shallow dish-shaped concave part 61b hollowed to the front side. When seen from the rear side, the shallow dish-shaped concave part 61b is formed in a rectangular shape including sides parallel to the upper frame member 61 and the horizontal frame member 63. A protrusion part 61c protrudes from an edge part of the base plate 118 side of the shallow dish-shaped concave part 61b to the horizontal frame member 63 side. That is, the protrusion part 61c protrudes in a direction orthogonal to the longitudinal direction of the upper frame member 61. The protrusion part 61c is located on the shallow dish-shaped concave part 61b, and the protruding end part of the protrusion part 61c is formed in a semi circular shape protruding to the tip side.

A rectangular notch 117a is provided in the end part of the rear rib 117 at a portion facing the shallow dish-shaped concave part 61b. An opening area of the rectangular notch 117a as seen from the rear side is larger than that of the shallow dish-shaped concave part 61b. A guide convex part 61d to be inserted into a guide concave part 63d which will be described below protrudes from an edge part of the rectangular notch 117a on the base plate 118 side to the horizontal frame member 63 side. The guide convex part 61d is formed in a rectangular shape in the rear view.

As described above, the horizontal frame member 63 has the elongated base plate 130 facing the peripheral surface of the display panel 56, and the plate-shaped ribs 131 and 131 protruding from both longitudinal edges of the base plate 130 at right angles. The both ribs 131 and 131 protrude to the upper frame member 61 side and extend along the base plate 130. The both ribs 131 and 131 are located on the front side and the rear side, respectively (hereinafter, the rib 131 of the front side is referred to as a front rib 131a, and the rib 131 of the rear side is referred to as a rear rib 131b). The inner peripheral surface of the horizontal frame member 63 surrounded by the base plate 130, the front rib 131a and the rear rib 131b forms an insertion groove 63a.

Notch (fitting concave part) 63c having a shape copying the protrusion part 61c is formed at a place corresponding to the protrusion part 61c in the end part of the front rib 131a. The notch 63c is formed in a U shape opened to the upper frame member 61 side, and hollowed in the direction orthogonal to the longitudinal direction of the upper frame member 61. An inclined face 63b is provided on the opening edge part of the side opposite to the base plate 130 in the notch 63c. The inclined face 63b is inclined down toward the bottom of the notch 63c formed in a U shape. The protrusion part 61c and the notch 63c are designed in substantially the same dimensions as each other, and the protrusion part 61c is fitted to the notch 63c without an allowance.

The shallow dish-shaped guide concave part 63d into which the guide convex part 61d is inserted is formed at the place corresponding to the guide convex part 61d in the end part of the rear rib 131b. The guide concave part 63d is formed in the rear surface of the rear rib 131b. The guide convex part 61d is inserted into the guide concave part 63d.

Figure 35:
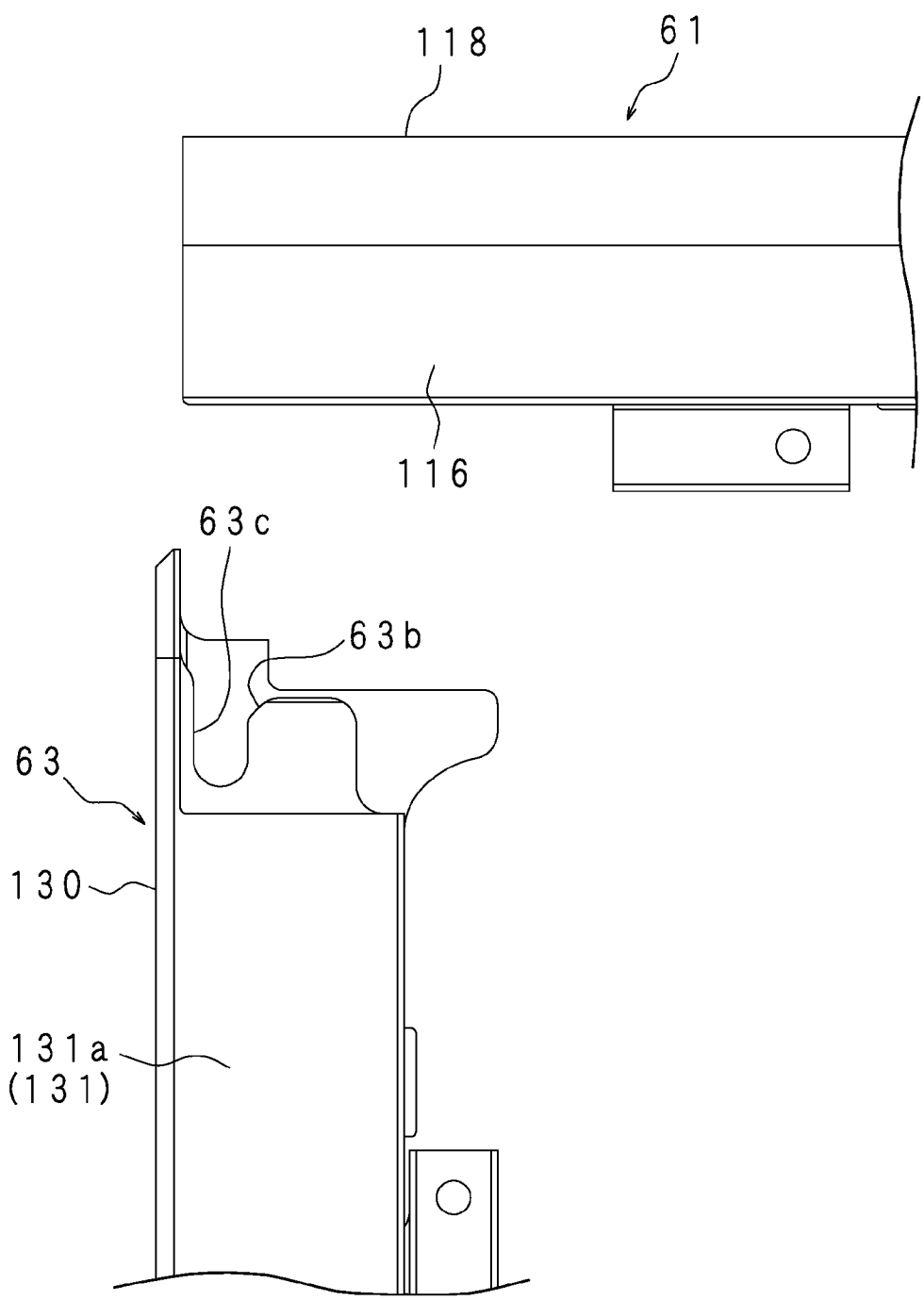
FIG. 35 is a partial exploded front view schematically illustrating the connection portion of the upper frame member and the horizontal frame member as seen from a front side.
Figure 36:
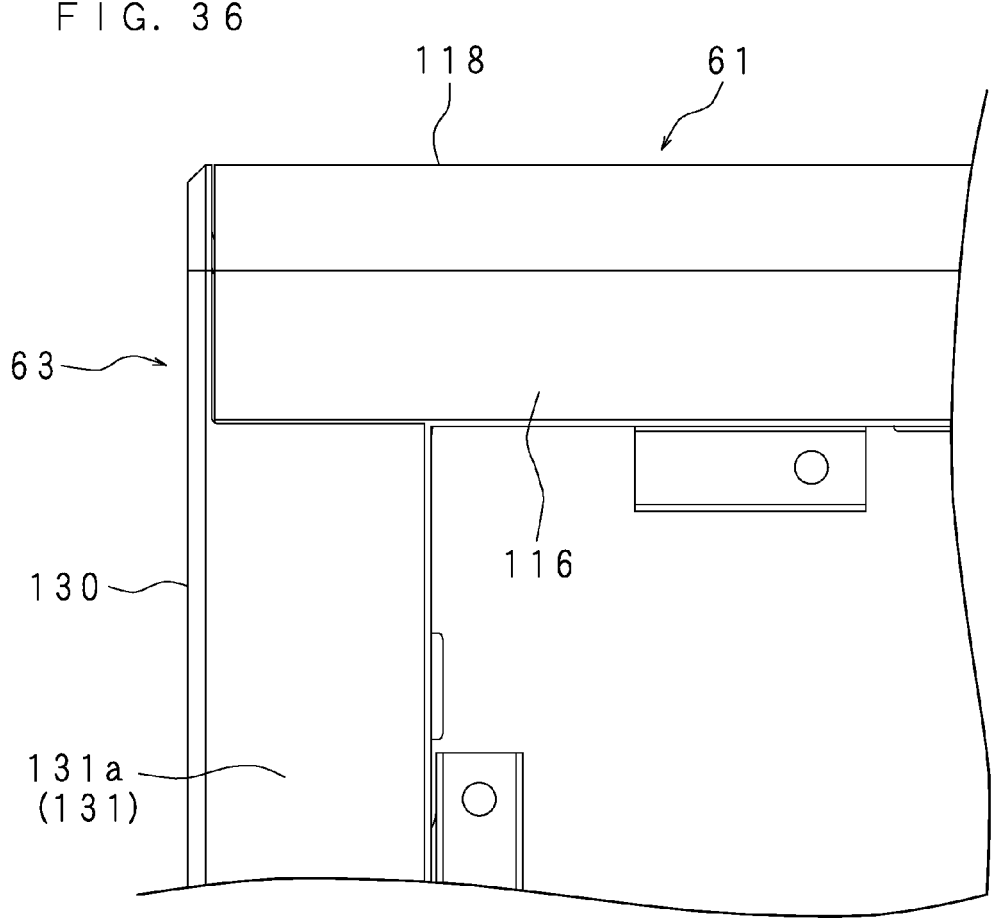
FIG. 36 is a partial front view schematically illustrating the connection portion of the upper frame member and the horizontal frame member as seen from a front side.

FIG. 35 is a partial exploded front view schematically illustrating the connection portion of the upper frame member 61 and the horizontal frame member 63 as seen from the front side, and FIG. 36 is a partial front view schematically illustrating the connection portion of the upper frame member 61 and the horizontal frame member 63 as seen from the front side. Since the protrusion part 61c is formed on the rear surface of the front rib 116, as illustrated in FIG. 35, it is not visually confirmed from the front side. Therefore, as illustrated in FIG. 36, when the upper frame member 61 and the horizontal frame member 63 are connected with each other by fitting the protrusion part 61c to the notch 63c, the protrusion part 61c and the notch 63c are not visually confirmed from the front, thereby improving appearance design properties.

The protrusion part 61c and the notch 63c are provided on the connection portion of the lower frame member 62 and the horizontal frame member 63, respectively, thus the lower frame member 62 and the horizontal frame member 63 are connected with each other similarly to the connection of the upper frame member 61 and the horizontal frame member 63.

A connection operation of the upper frame member 61 and the horizontal frame member 63 will be described. A worker places the end part of the front rib 131a of the horizontal frame member 63 on the shallow dish-shaped concave part 61b of the upper frame member 61, and then places the guide convex part 61d of the upper frame member 61 on the guide concave part 63d of the horizontal frame member 63. The worker fits the protrusion part 61c to the notch 63c by moving it along the inclined face 63b, while the guide convex part 61d is inserted into the guide concave part 63d.

In the television receiver according to Embodiment 8, since the protrusion part 61c and the notch 63c are laid along the direction orthogonal to the longitudinal direction (lateral direction) of the upper frame member 61 (in other words, the vertical direction orthogonal to the upper edge part of the display panel 56), when the upper frame member 61 and the horizontal frame member 63 are connected with each other, even if a gap is formed in the connection portion in the vertical direction, by fitting the protrusion part 61c to the notch 63c, it is possible to prevent the upper frame member 61 and the horizontal frame member 63 from being biased in the lateral direction.

Further, since the protrusion part 61c is fitted to the notch 63c inside of the insertion groove 61a, the protrusion part 61c and the notch 63c cannot be visually confirmed from an outside to improve appearance design properties. In addition, by inserting the guide convex part 61d into the guide concave part 63d, the upper frame member 61 and the horizontal frame member 63 can be smoothly connected with each other. Further, by providing the inclined face 63b on the opening edge portion of the guide concave part 63d, the protrusion part 61c can be guided to the notch 63c along the inclined face 63b.

Furthermore, the notch 63c is an example of the fitting concave part to which the protrusion part 61c is fitted, and instead of the notch 63c, a fitting concave part having another shape may be provided in the front rib 131a. For example, a shallow dish-shaped concave part corresponding to the protrusion part 61c may be formed in the front of the front rib 131a. In addition, the protrusion part may be provided on the horizontal frame member 63 and the fitting concave part may be formed in the upper frame member 61.

Embodiment 9

Figure 37:
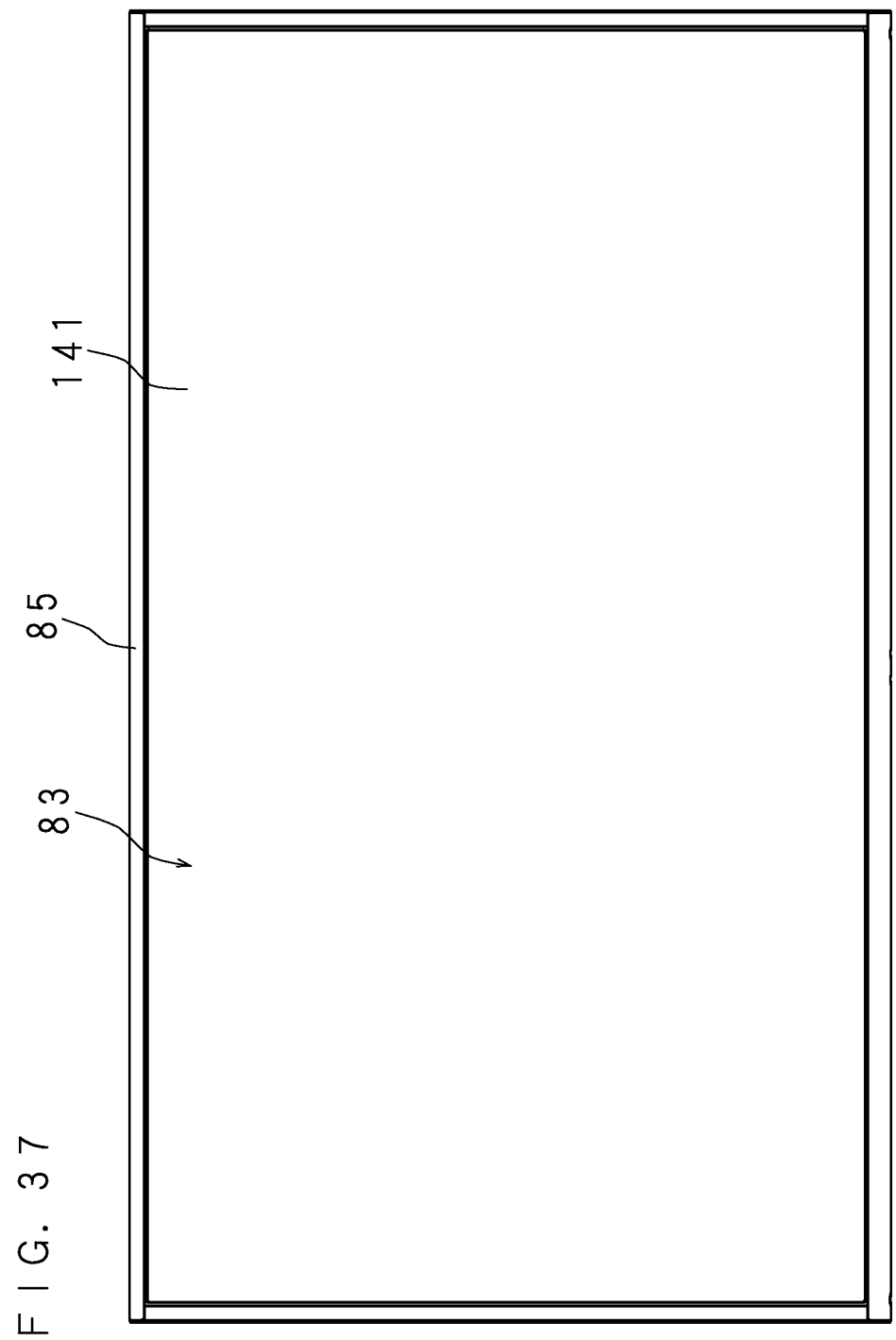
FIG. 37 is a front view illustrating one configuration example of a television receiver according to Embodiment 9.
Figure 38:
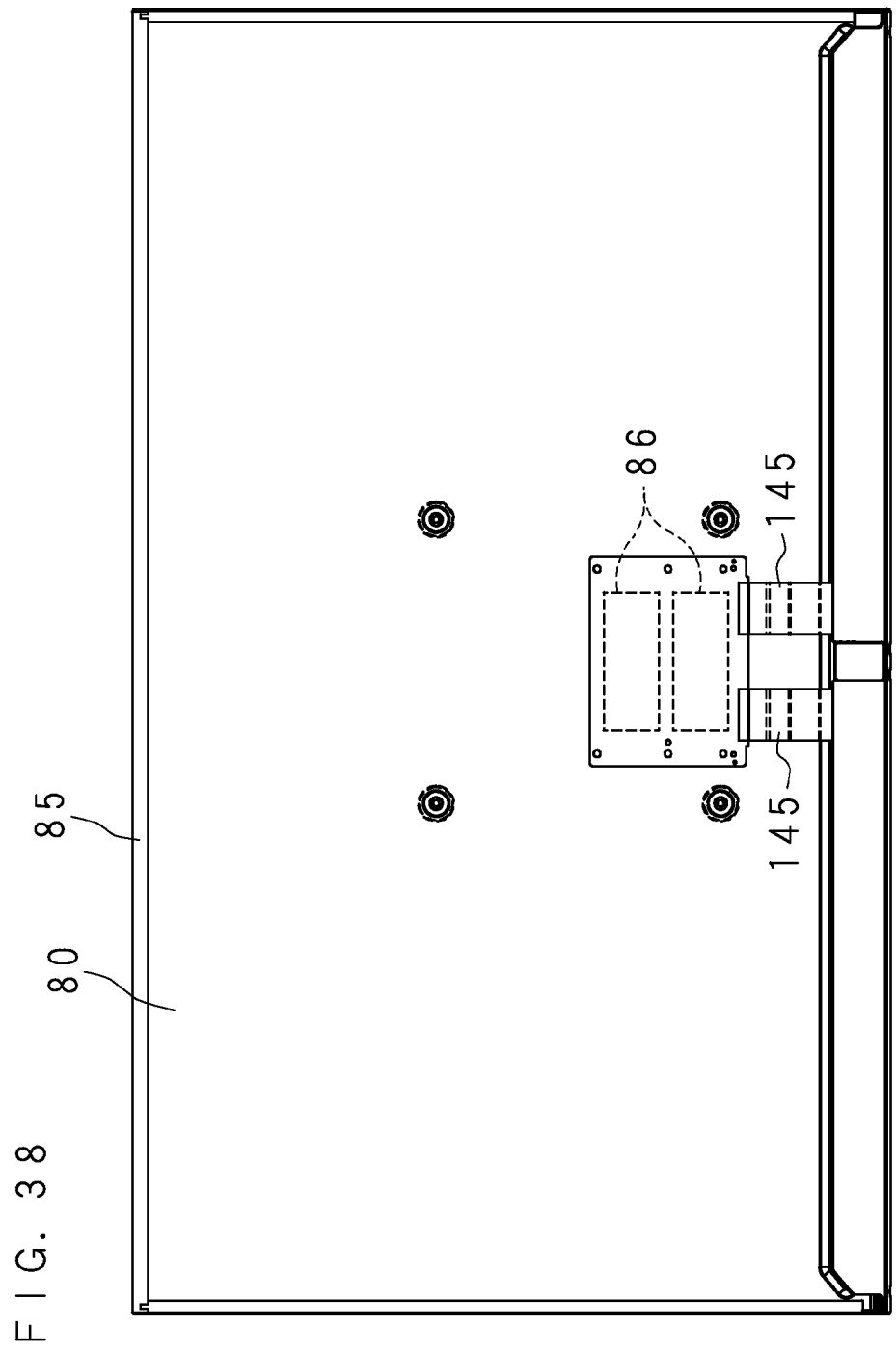
FIG. 38 is a rear view illustrating one configuration example of the television receiver according to Embodiment 9.
Figure 39:
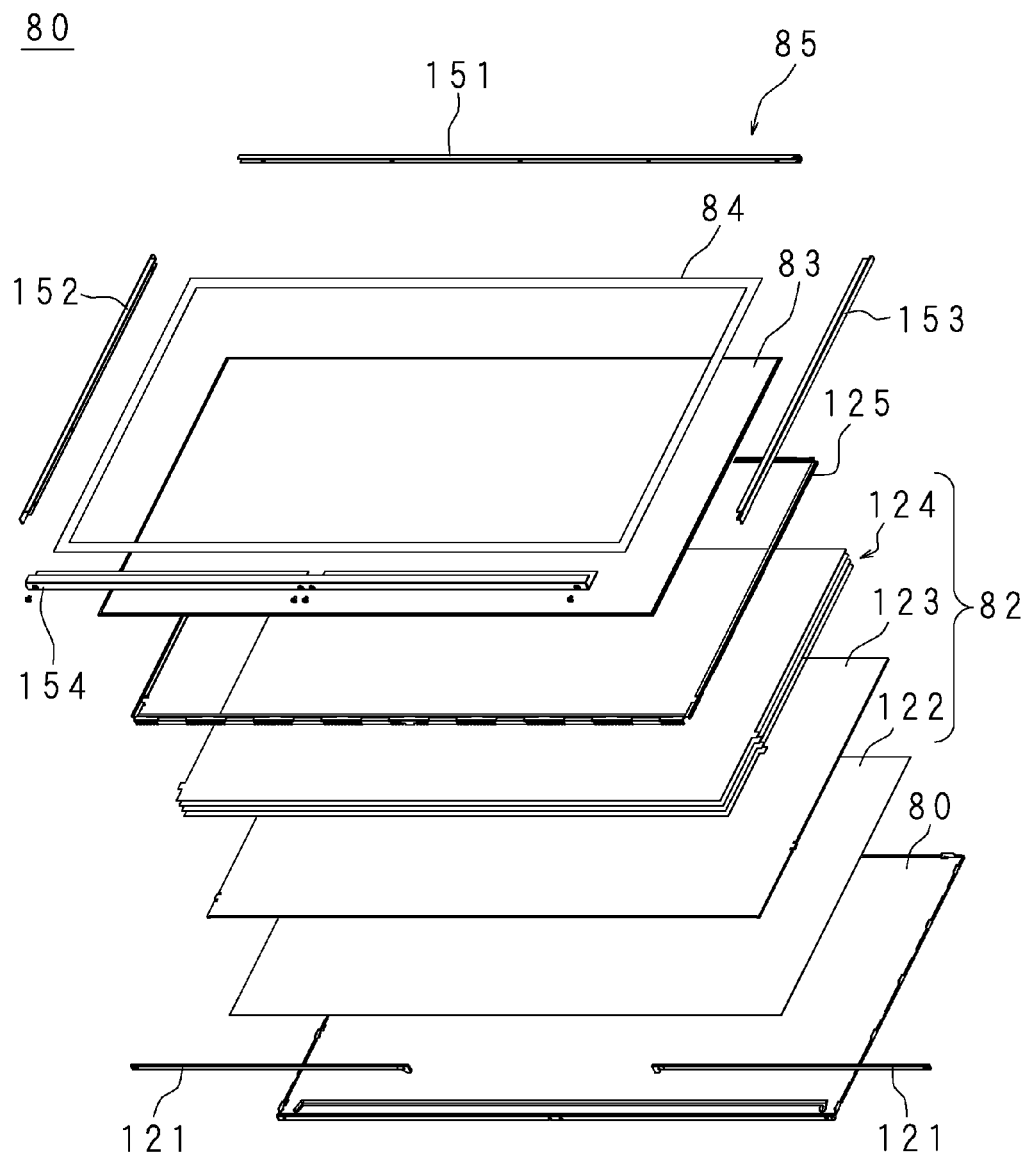
FIG. 39 is an exploded perspective view schematically illustrating one configuration example of the television receiver.
Figure 40:
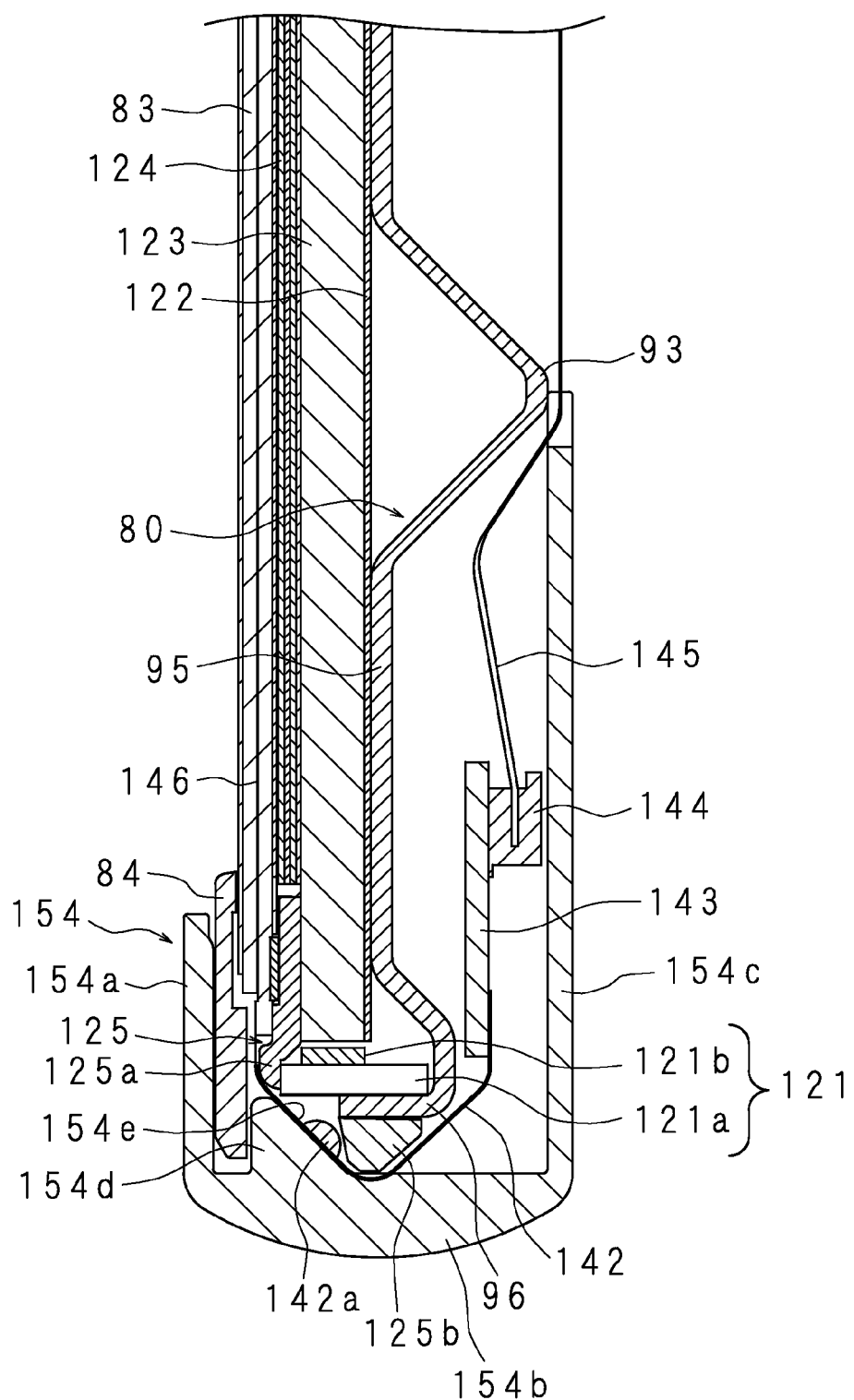
FIG. 40 is a partial enlarged side view illustrating main components of a lower portion of the television receiver.
Figure 41:
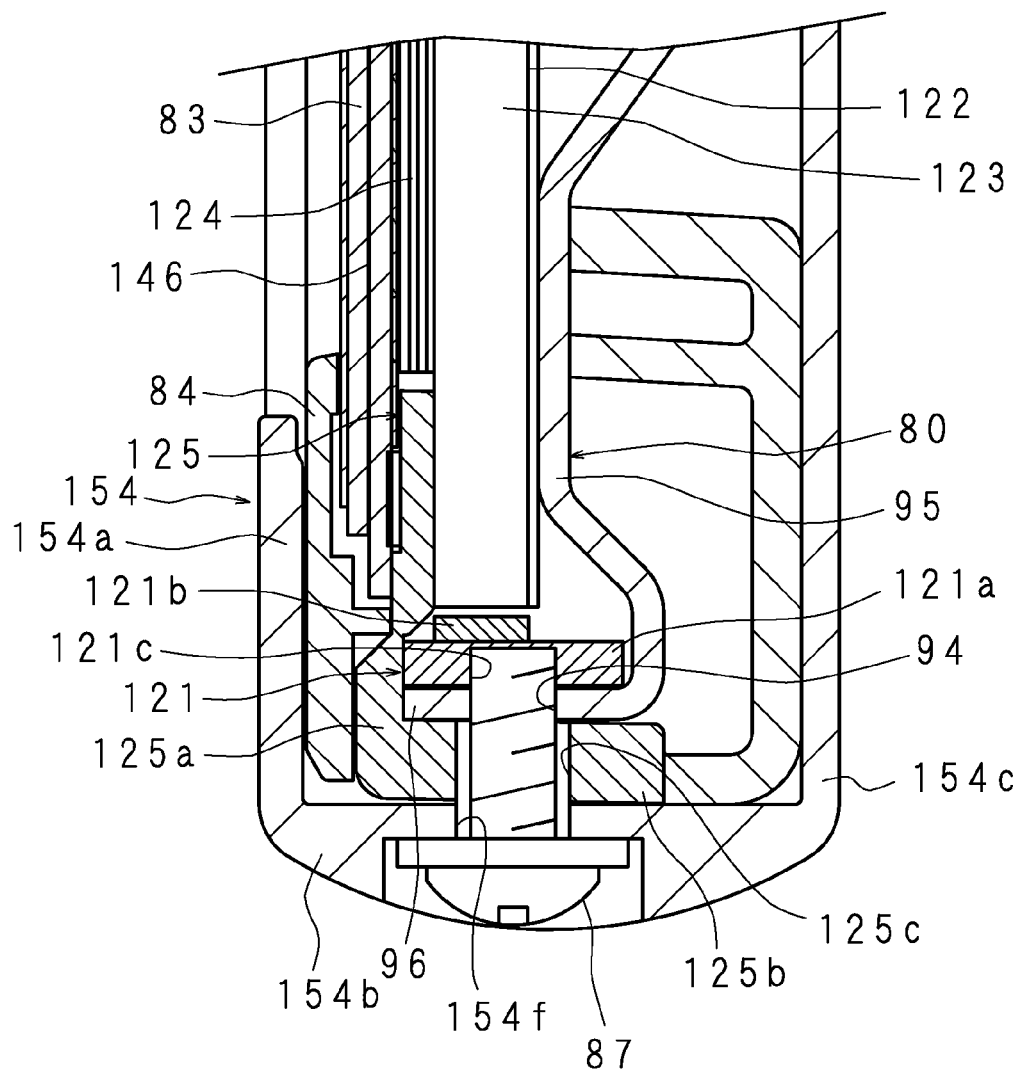
FIG. 41 is a partial enlarged side view illustrating the main components of the lower portion of the television receiver.

Hereinafter, Embodiment 9 will be described in detail. FIG. 37 is a front view illustrating one configuration example of the television receiver according to Embodiment 9, FIG. 38 is a rear view illustrating one configuration example of the television receiver according to Embodiment 9, FIG. 39 is an exploded perspective view schematically illustrating one configuration example of the television receiver, and FIG. 40 and FIG. 41 are partial enlarged side views illustrating the main components of the lower portion of the television receiver.

The television receiver according to the Embodiment 9 includes a housing body 80 in which a liquid crystal display panel 83, which has a display surface 141 on the front thereof and which is formed in a substantially rectangular shape in the front view, and an edge-light-type backlight apparatus 82 are laminated and housed. The housing body 80 is formed in a tray shape of a laterally long and substantially rectangular shape in the front view, and has a substantially rectangular rear plate part 95, and a side wall part 96 standing forwardly from the peripheral edge of the rear plate part 95.

In addition, the housing body 80 has a linear convex part 93 substantially parallel to the longitudinal direction of the liquid crystal display panel 83 at a rear surface thereof. The linear convex part 93 is formed by a press-bending process so as to protrude rearward from an upper position in an appropriate length from the bottom part of the housing body 80. Since the housing body 80 is provided with the linear convex part 93, the bending strength of the housing body 80 can be increased, and thereby preventing various electronic parts disposed in the lower part of the housing body 80 from being damaged by bending. The housing body 80 is made of metal such as iron or the like, and is formed by pressing.

The backlight apparatus 82 includes LED light sources 121, a reflection sheet 122, a light guide plate 123, and an optical sheet 124. The LED light source 121 includes a long LED substrate 121a which is fixed to an inner surface of the side wall part 96 on the lower side of the housing body 80. The LED substrate 121a has a plurality of light emitting diodes 121b disposed side by side along the longitudinal direction thereof, and is configured to emit light upward. The reflection sheet 122 is formed in a rectangular shape having substantially the same dimensions as the rear plate part 95 of the housing body 80, and is disposed on the front surface of the rear plate part 95.

The light guide plate 123 is formed in a rectangular shape substantially the same as the reflection sheet 122, and is disposed on the front side of the reflection sheet 122, so as to receive incident light of the LED light sources 121 from the lower surface of the light guide plate 123. The light guide plate 123 may be made of, for example, an acrylic resin, and guides the light of the LED light sources 121 incident on the lower surface to the front while providing light diffusion inward, and emits light toward the front. The peripheral edges of the reflection sheet 122 and the light guide plate 123 which are placed on the housing body 80 are covered with a light shielding frame body 125, and are held in the housing body 80 by the light shielding frame body 125.

The light shielding frame body 125 is a member for preventing the light emitted from the side of the light guide plate 123 from being leaked outside of the television receiver. In addition, the light shielding frame body 125 has a lower thermoelectric efficiency than the housing body 80 and a frame body 85 to be described below, and also functions to prevent heat of the LED light sources 121 from being diffused from the side of the television receiver. The light shielding frame body 125 includes an abutting frame 125a which abuts the peripheral edge portion of the front surface of the light guide plate 123 and is formed in a rectangular frame shape as seen from the front, and an encircling plate 125b which projects rearward from the peripheral edge of the abutting frame 125a and encircles the outside of the side wall part 96 of the housing body 80. In addition, the optical sheet 124 for uniformizing the light emitted from the light guide plate 123 is disposed on the front side of the light guide plate 123 so as to be housed inside of the light shielding frame body 125. The optical sheet 124 is a sheet in which, for example, a reflective deflection sheet, a diffusion sheet, a prism sheet and the like are laminated.

The liquid crystal display panel 83 is disposed on the front side of the backlight apparatus 82. The liquid crystal display panel 83 has a substantially rectangular display surface 141 with an aspect ratio of 16/9. The liquid crystal display panel 83 includes two substantially rectangular glass substrates which are disposed to face each other through a spacer, and liquid crystal sealed between the glass substrates. A plurality of RGB color filters forming pixels are arranged vertically and horizontally in the inner surface of the front side glass substrate. Scanning lines of a lateral direction and signal lines 146 of a longitudinal direction are disposed in a matrix on the inner surface of the rear side glass substrate, and an active element for applying a voltage to a liquid crystal portion corresponding to each pixel, for example, a thin film transistor (TFT), is provided in a portion in which the scanning lines and signal lines 146 intersect. A gate electrode of each TFT is connected to the scanning line, and a source electrode is connected to the signal line 146. Further, a polarizing film (not illustrated) is disposed on the outside of each glass substrate so as to transmit light of the backlight with the TFT being turned on, whereby the normally black liquid crystal display panel 83 is configured.

A band-shaped flexible board 142 which is connected to the scanning lines and signal lines 146 for driving the liquid crystal display panel 83 extends from the lower end face portion of the liquid crystal display panel 83. The flexible board 142 is a board on which a wiring pattern (not illustrated) is formed on a flexible film base material, and the wiring pattern has a liquid crystal drive circuit 142a mounted thereon by a chip on film (COF) method. The liquid crystal drive circuit 142a has an appearance of a bar shape, and is mounted on the flexible board 142 so as to be substantially parallel to the longitudinal direction with respect to the low end face of the liquid crystal display panel 83. The liquid crystal drive circuit 142a applies a scanning voltage to the scanning lines of the liquid crystal display panel 83 through the wiring pattern of the flexible board 142, and applies a voltage to the signal lines 146 based on an image signal. When the scanning voltage and the voltage based on the image are applied to the scanning lines and signal lines 146, an image is displayed on the display surface 141 of the liquid crystal display panel 83.

A tip part of the flexible board 142 is connected to a rigid substrate 143. The rigid substrate 143 has a connector 144 mounted thereon, and the connector 144 is connected to a flat cable 145. The flat cable 145 is connected to a liquid crystal timing control board 86 and an image processing board which are provided on the rear surface of the housing body 80. The image processing board has a receiving unit and a signal processing circuit mounted thereon. The receiving unit is, for example, a digital tuner, and is configured to perform a channel selection by receiving a television signal, convert the selected channel, that is, the broadcast signal of the specific frequency band to data such as a Moving Picture Experts Group (MPEG)-2 Transport Stream (TS), or the like, and provide the data to the signal processing circuit. The signal processing circuit is configured to execute decoding processing on the data, and other various processing, and control an operation of the liquid crystal drive circuit 142a based on the image signal, and display the image relating to the television signal.

In addition, the television receiver includes the frame body 85 in which a groove having a U-shaped cross section is formed in an inner periphery thereof to sandwich each of four sides of the peripheral edge part of the laminated liquid crystal display panel 83, the optical sheet 124, the light guide plate 123, the reflection sheet 122, and the housing body 80 in the front and back. A substantially rectangular frame-shaped panel cover 84 for protecting the front surface of the liquid crystal display panel 83 is mounted between the liquid crystal display panel 83 and the frame body 85. The frame body 85 holds the backlight apparatus 82 and the liquid crystal display panel 83 in the housing body 80, is an outermost frame of the television receiver, and plays a role of a frame which rims the display surface 141 of the liquid crystal display panel 83. The frame body 85 includes an upper frame body 151 which sandwiches the upper side portion of the liquid crystal display panel 83, lateral frame bodies 152 and 153 which sandwich the left and right portions of the liquid crystal display panel 83, and a lower frame body 154. The frame body 85 is made of, for example, metal such as aluminum, etc., a synthetic resin or the like. At least the lower frame body 154 is formed of a member having higher thermal conductivity than the housing body 80.

The configuration of the lower part of the television receiver will be described with reference to FIGS. 40 and 41. FIG. 40 and FIG. 41 are side views taken on different lateral positions. The lower frame body 154 includes a front plate part 154*a* pressing the front surface of the liquid crystal display panel 83 through the panel cover 84, a rear plate part 154*c* abutting the rear side of the housing body 80, and a bottom plate part 154*b* connecting the front plate part 154*a* and the rear plate part 154*c*. The flexible board 142 extending from the lower end face portion of the liquid crystal display panel 83 is laid on the rear side of the housing body 80 along the inner surface of the U groove-shaped lower frame body 154.

The bottom plate part 154*b* of the lower frame body 154 has an abutting part 154*d* abutting a place in which the liquid crystal drive circuit 142*a* of the flexible board 142 is disposed, that is, the rear surface of the flexible board 142 in which the liquid crystal drive circuit 142*a* is disposed. The abutting part 154*d* is a linear projection which has a triangular side cross section provided near the front of the bottom plate part 154*b* from the light shielding frame body 125, and is substantially parallel to the longitudinal direction of the lower end face of the liquid crystal display panel 83. The abutting part 154*d* has an inclined face 154*e* which is inclined downward to the rear side thereof. The liquid crystal drive circuit 142*a* is disposed between the abutting part 154*d* and the encircling plate 125*b* of the light shielding frame body 125, and the place in which the liquid crystal drive circuit 142*a* of the flexible board 142 is disposed, that is, the rear base material of the liquid crystal drive circuit 142*a* abuts the inclined face 154*e* of the abutting part 154*d*.

In the above-described configuration, the width of the rear plate part 154*c* in the vertical direction is larger than the width of the front plate part 154*a* in the vertical direction, and the surface area of the rear plate part 154*c* is larger than the surface area of the front plate part 154*a*. The upper end part of the rear plate part 154*c* abuts the linear convex part 93 of the housing body 80, and a void is formed between the rear plate of the housing body 80 and the rear plate part 154*c*. The rigid substrate 143 is disposed in the void.

In addition, as illustrated in FIG. 41, female threads 121*c* are formed on both end parts of the LED substrate 121*a*, and hole parts 94, 125*c* and 154*f* corresponding to the female threads 121*c* are formed in the bottoms of the housing body 80 and the light shielding frame body 125, and the bottom plate part 154*b* of the lower frame body 154. The lower frame body 154 is fixed to the housing body 80 by a fastening member 87 such as a screw, bolt, or the like inserted into the hole parts 94, 125*c* and 154*f*. The fastening member 87 is made of metal, for example, and also functions to conduct heat generated from the LED light sources 121 to the lower frame body 154 through the housing body 80.

According to the television receiver configured as described above, it is possible to thin the liquid crystal display apparatus by employing the configuration in which the light guide plate 123, the optical sheet 124, and the liquid crystal display panel 83 are laminated on the housing body 80, and peripheral edges thereof are sandwiched by the frame body 85 with the groove formed.

In addition, since the place in which the liquid crystal drive circuit 142*a* of the flexible board 142 is disposed abuts the abutting part 154*d* of the frame body 85, the heat generated from the liquid crystal drive circuit 142*a* can be conducted to the frame body 85, thereby effectively dissipating the heat.

Further, since the flexible board 142 is laid on the rear side of the housing body 80 along the inner surface of the U-shaped groove of the lower frame body 154, as compared to the case in which the flexible board 142 is laid along the L-shaped bezel, it is easy to abut the inner surface of the frame body 85, and thereby positioning of the liquid crystal drive circuit 142*a* is unnecessary, and assembling thereof can be easily performed.

Furthermore, in the above-described configuration, since the abutting part 154*d* has the inclined face 154*e*, and the place in which the liquid crystal drive circuit 142*a* of the flexible board 142 is disposed abuts the inclined face 154*e*, the flexible board 142 can be laid on the rear side of the housing body 80 through a shorter path. That is, the length of the flexible board 142 can be reduced.

Furthermore, since the liquid crystal drive circuit 142*a* is configured to be inserted between the inclined face 154*e* and the light shielding frame body 125, the place in which the liquid crystal drive circuit 142*a* of the flexible board 142 is disposed can more reliably abut the abutting part 154*d*.

Furthermore, since the frame body 85 has higher thermal conductivity than the housing body 80, and the surface area of the front plate part 154*a* is larger than the surface area of the rear plate part 154*c*, it is possible to effectively dissipate the heat of the liquid crystal drive circuit 142*a* from the rear portion of the frame body 85.

Furthermore, it is possible to mainly diffuse the heat of the edge-light-type LED light sources 121 from the lower side part, rather than the lower side part of the television receiver, and suppress temperature rise of the lower side part.

Furthermore, the heat generated from the LED light sources 121 can be conducted to the lower frame body 154 through the fastening member 87, thereby dissipating the heat from the rear side of the lower frame body 154.

Furthermore, since the light shielding frame body 125 is located between the side wall part 96 of the housing body 80 in which the LED light sources 121 are disposed and the lower frame body 154, and the light shielding frame body 125 has lower thermal conductivity than the chassis and the frame body 85, it is possible to suppress heat dissipation from the bottom part of the television receiver.

Furthermore, a part of the heat conducted to the rear plate part 154*c* of the lower frame body 154 can be conducted to the chassis through the linear convex part 93 of the chassis, thereby more effectively dissipating the heat.

Further, in Embodiment 9, an example of providing the LED light sources, the flexible board, the abutting part, and the like on the bottom of the television receiver, but the location for providing each component is not limited to the lower side, and the components may be provided on the upper side, or the lateral side.

In addition, a configuration in which the flexible board abuts the abutting part is provided as an example, but the liquid crystal drive circuit may directly abut the abutting part. Further, the shape of the abutting part is not particularly limited, so long as the heat of the liquid crystal drive circuit can be conducted to the frame body.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

In addition, technical characteristics (components) described in each embodiment may be combined with each other, and by combining these components new technical characteristics may be formed.

(Note)

Hereinafter, notes for the above-described embodiments will be additionally disclosed.

The liquid crystal display apparatus according to the present invention which includes a liquid crystal panel 2, an optical sheet 9, a backlight 7 and a backlight housing body 3, which are sequentially laminated from a front side to a rear side, may include: a rectangular frame body 4 which sandwiches the liquid crystal panel 2, the optical sheet 9, the backlight 7 and the backlight housing body 3, and the frame body 4 may have a U-shaped cross section opened inward.

In the liquid crystal display apparatus according to the present invention, the liquid crystal panel 2, the optical sheet 9, the backlight 7 and the backlight housing body 3 are sequentially laminated from the front side to the rear side. The liquid crystal display apparatus includes the rectangular frame body 4 which sandwiches the liquid crystal panel 2, the optical sheet 9, the backlight 7 and the backlight housing body 3, and the frame body 4 has a U-shaped cross section opened inward. Thereby, the liquid crystal display apparatus that removes a casing can achieve thinning, weight lightening and narrowing of the frame by as much as an amount corresponding to the weight and volume occupied by the casing.

In the liquid crystal display apparatus according to the present invention, the frame body 4 may be configured to be divided into four linear frame members 41, 42, 43 and 44, and the frame members 41, 42, 43 and 44 may be each an extrusion-molded product.

In the liquid crystal display apparatus according to the present invention, the frame body 4 can be divided into four linear frame members 41, 42, 43 and 44. Thereby, even when the size of the frame body 4 is large, the frame body 4 can be easily formed. In the liquid crystal display apparatus according to the present invention, the frame members 41, 42, 43 and 44 are formed by extrusion molding, respectively. Thereby, even when the cross-sectional shape of the frame members is complicated, the frame members can be easily formed.

In the liquid crystal display apparatus according to the present invention, the optical sheet 9 may be smaller than a front surface of the backlight 7, and the apparatus may include: a rectangular light shielding frame body 10 which is located between peripheral edge parts of the liquid crystal panel 2 and the backlight 7 in an outside of the optical sheet 9, and shields light of the backlight 7 to be leaked to an outside of the apparatus.

In the liquid crystal display apparatus according to the present invention, the optical sheet 9 is smaller than the front surface of the backlight 7. The liquid crystal display apparatus includes the rectangular light shielding frame body 10 which is located between the peripheral edge parts of liquid crystal panel 2 and backlight 7 in the outside of the optical sheet 9. The light shielding frame body 10 shields the light of the backlight 7 to be leaked from a front peripheral edge part to the outside. Thereby, the light shielding frame body 10 shields the light of the backlight 7 to be leaked from the front peripheral edge part to the outside, such that a viewer can enjoy an image displayed on the liquid crystal panel 2, without having to worry about the light leaking from around the liquid crystal panel 2.

The liquid crystal display apparatus according to the present invention may include a back cabinet 12 which covers the backlight housing body 3 from the rear side, and the frame body 4 may sandwich the liquid crystal panel 2, the optical sheet 9, the light shielding frame body 10, the backlight 7, the backlight housing body 3 and the back cabinet 12.

The liquid crystal display apparatus according to the present invention includes the back cabinet 12 which covers the backlight housing body 3 from the rear side. The frame body 4 sandwiches the liquid crystal panel 2, the optical sheet 9, the light shielding frame body 10, the backlight 7, the backlight housing body 3 and the back cabinet 12. Thereby, the backlight housing body 3 shields the light emitted rearward from the backlight 7, such that the light shielding effect in the liquid crystal display apparatus can be further increased. In addition, the back cabinet 12 can have improved appearance and strength of the liquid crystal display apparatus.

In the liquid crystal display apparatus according to the present invention, the backlight 7 may have a substrate 8 on which light sources 8a are mounted, and a light guide plate 7 which receives light of the light sources 8a on a side thereof, and emits the light to the optical sheet 9, the backlight housing body 3 may be formed in a box shape whose front surface is opened, the liquid crystal panel 2, the optical sheet 9, the light shielding frame body 10 and the light guide plate 7 may be laminated on the inner bottom of the backlight housing body 3, and the substrate 8 may be disposed on the inner surface of the backlight housing body 3 facing the side of the light guide plate 7.

In the liquid crystal display apparatus according to the present invention, the backlight 7 has the substrate 8 on which the light sources 8a are mounted, and the light guide plate 7. The light guide plate 7 receives light of the light sources 8a on the side thereof, reflects and diffuses the incident light, and emits the light to the optical sheet 9. The liquid crystal panel 2, the optical sheet 9, the light shielding frame body 10 and the light guide plate 7 are laminated on the inner bottom of the backlight housing body 3 whose front surface is opened. The substrate 8 is disposed on the inner surface of the backlight housing body 3 facing the side of the light guide plate 7. Therefore, the liquid crystal display apparatus employs the edge-light method, whereby the thickness of the backlight 7 can be reduced to the thickness of the light guide plate 7, and thus thinning thereof can be achieved. In addition, since the liquid crystal panel 2, the optical sheet 9, the light shielding frame body 10 and the light guide plate 7 are housed in the backlight housing body 3, the liquid crystal display apparatus can secure the adequate strength even when the back cabinet 12 is removed.

In the liquid crystal display apparatus according to the present invention, the frame body 4 may be made of aluminum.

In the liquid crystal display apparatus according to the present invention, the frame body 4 is made of aluminum. Thereby, the frame body 4 can achieve high performance in terms of thermal conductivity, workability, light weight and recyclability as possessed by aluminum.

The liquid crystal display apparatus according to the present invention may include a rectangular cover frame body 11 which covers the front peripheral edge part of the liquid crystal panel 2, and the frame body 4 may abut the front surface of the cover frame body 11 and the rear peripheral edge part of the backlight housing body 3 and sandwich the cover frame body 11, the liquid crystal panel 2, the optical sheet 9, the backlight 7 and the backlight housing body 3.

The liquid crystal display apparatus according to the present invention includes the rectangular cover frame body 11 which covers the front peripheral edge part of the liquid crystal panel 2. The frame body 4 abuts the front surface of the cover frame body 11 and the rear peripheral edge part of the backlight housing body 3 and sandwiches the cover frame body 11, the liquid crystal panel 2, the optical sheet 9, the backlight 7 and the backlight housing body 3. Thereby, the cover frame body 11 can be mounted between the frame body 4 and the liquid crystal panel 2 to protect the liquid crystal panel 2.

The liquid crystal display apparatus according to the present invention which includes a liquid crystal panel 2, an optical sheet 9, a backlight 7 and a backlight housing body 3, which are sequentially laminated from a front side to a rear side, may include a frame body 4 which is configured to abut a front peripheral edge part of the liquid crystal panel 2 and a rear peripheral edge part of the backlight housing body 3 and sandwich the liquid crystal panel 2, the optical sheet 9, the backlight 7 and the backlight housing body 3, and has a rectangular shape in a front view and a U-shaped cross section opened inward, the frame body 4 is configured to be divided into four linear frame members 41, 42, 43 and 44, and the frame members 41, 42, 43 and 44 are joined with each other by a tenon assembly structure provided at a location to be butted with each other.

The liquid crystal display apparatus according to the present invention includes the frame body 4 which abuts the front peripheral edge part of the liquid crystal panel 2 and the rear peripheral edge part of the backlight housing body 3 and sandwiches the same, in the liquid crystal panel 2, the optical sheet 9, the backlight 7 and the backlight housing body 3, which are sequentially laminated from the front side to the rear side. The frame body 4 has a rectangular shape in a front view and a U-shaped cross section opened inward. The frame body 4 can be divided into four linear frame members 41, 42, 43 and 44. The frame members 41, 42, 43 and 44 are joined with each other by the tenon assembly structure provided at a location to be butted with each other. Thereby, the component members of the liquid crystal display apparatus are protected by the frame body 4, while removing the casing. Therefore, the liquid crystal display apparatus that removes the casing can achieve thinning, weight lightening and narrowing of the frame by as much as an amount corresponding to the weight and volume occupied by the casing. In addition, the frame body 4 can be divided into four members to flexibly cope with future increases in size. Further, the frame body 4 can secure the adequate strength by the tenon assembly structure, and a connecting member is unnecessary.

In the liquid crystal display apparatus according to the present invention, the tenon assembly structure is formed on a rear portion of the frame body 4 abutting the rear peripheral edge part of the backlight housing body 3.

In the liquid crystal display apparatus according to the present invention, the tenon assembly structure which joints the four divided frame members 41, 42, 43 and 44 is formed on the rear portion of the frame body 4 abutting the rear peripheral edge part of the backlight housing body 3. Thereby, a joint of the frame members 41, 42, 43 and 44 is not visible to a viewer who locates a front side of the liquid crystal display apparatus to view an image displayed on a screen of the liquid crystal panel 2. Therefore, the tenon assembly structure does not deteriorate the aesthetic appearance.

In the liquid crystal display apparatus according to the present invention, the mortises 416 facing the other frame members 42 and 43 to be joined may be provided in both end parts of the rear portion in one frame member 41, and tenons 426 and 436 which are respectively fitted to the mortises 416 may be provided on the rear portion of the other frame members 42 and 43 at locations to be butted with the one frame member 41.

In the liquid crystal display apparatus according to the present invention, the mortises 416 facing the other frame members 42 and 43 to be joined are provided in both end parts of the rear portion in the one frame member 41 of the frame members 41, 42, 43 and 44. The tenons 426 and 436 which are respectively fitted to the mortises 416 in the one frame member 41 are provided on the rear portion of the other frame members 42 and 43 at locations to be butted with the one frame member 41. Thereby, at least three frame members 41, 42 and 43 of the frame members 41, 42, 43 and 44 can be joined by the tenon assembly structure. As long as the tenon assembly structure is not released, each component member of the liquid crystal display apparatus is fixed longitudinally, horizontally and vertically.

In the liquid crystal display apparatus according to the present invention, the backlight housing body 3 may be formed in a box shape whose front surface is opened, the liquid crystal panel 2, the optical sheet 9 and the backlight 7 may be laminated on an inner bottom of the backlight housing body 3, the front surface of the rear portion in the frame body 4 may be provided with protrusion parts 417 and 437, and the rear peripheral edge part of the backlight housing body 3 facing the protrusion parts 417 and 437 may be provided with a slit 37 to which the protrusion part 417 is fitted substantially parallel to the peripheral edge of the backlight housing body 3.

In the liquid crystal display apparatus according to the present invention, the liquid crystal panel 2, the optical sheet 9 and the backlight 7 are laminated on the inner bottom of the backlight housing body 3 which is formed in a box shape whose front surface is opened. The front surface of the rear portion 412 and 432 in the frame body 4 is provided with the protrusion parts 417 and 437. Meanwhile, the rear peripheral edge part of the backlight housing body 3 facing the protrusion parts 417 and 437 is provided with the slits 37 to which the protrusion parts 417 and 437 are fitted. The longitudinal direction of the slit 37 is substantially parallel to the peripheral edge of the backlight housing body 3. Thereby, a conventional back cabinet is removed from the liquid crystal display apparatus, and the bottom of the backlight housing body 3 is exposed. By fitting the protrusion parts 417 and 437 of the frame body 4 to the slits 37 of the backlight housing body 3, the frame body 4 is fixed to the backlight housing body 3. Further, since the frame members 41, 42 and 43 can be slid in the longitudinal direction of the slit 37, the tenon 426 of the frame member 42 can be fitted to the mortis 416 of the frame member 41 by the sliding.

In the liquid crystal display apparatus according to the present invention, the backlight housing body 3 may be provided with a rectangular opening 34 which reaches from a ridge part including the bottom 32 and the side wall 33 of the backlight housing body 3 to one end portion of the slit 37, and the dimensions of the opening 34 may be larger than the dimensions of the protrusion part 417.

In the liquid crystal display apparatus according to the present invention, the backlight housing body 3 is provided with the rectangular opening 34 which reaches from the ridge part including the bottom 32 and the side wall 33 of the backlight housing body 3 to one end portion of the slit 37. The dimensions of the opening 34 are larger than the dimensions of the protrusion part 417. Thereby, the L-shaped opening 37 is formed in the bottom 32 of the backlight housing body 3. Since the dimensions of the fitting protrusion part 417 are smaller than those of the rectangular opening 34, the protrusion part 417 can be easily loosely fitted to the rectangular opening 34. By sliding the frame member, the fitting protrusion part 417 loosely fitted to the rectangular opening 34 is fitted to the slit 37, and the frame member is fixed to the backlight housing body 3.

In the liquid crystal display apparatus according to the present invention, the frame members 41, 42, 43 and 44 may have front portions 411, 421, 431, 441 abutting the front peripheral edge part of the liquid crystal panel 2, and side walls 413, 423, 433, 443 which connect the front portions with rear portions 412, 422, 432, 442, and any one side wall of the frame members 41, 42, 43 and 44 and the side wall 33 of the backlight housing body 3 facing the one side wall may be provided with a screw hole 331.

In the liquid crystal display apparatus according to the present invention, the frame members 41, 42, 43 and 44 have the front portions 411, 421, 431, 441 abutting the front peripheral edge part of the liquid crystal panel 2, and the side walls 413, 423, 433, 443 which connect the front portions with the rear portions 412, 422, 432, 442. Any one side wall of the frame members 41, 42, 43 and 44 and the side wall 33 of the backlight housing body 3 facing the one side wall is provided with the screw hole 331. Thereby, when the three frame members 41, 42 and 43 of the four frame members 41, 42, 43 and 44 are joined by the tenon assembly structure, the remaining one frame member 44 is fixed to the backlight housing body 3 by screws N. When the one frame member 44 and the backlight housing body 3 are fixed by the screws N, the tenon assembly structure is not released, and the component members of the liquid crystal display apparatus are fixed in each direction of longitudinal, lateral and vertical directions. In the liquid crystal display apparatus, the screws N used for fixing the frame body 4 can be decreased to the number of screws used for fixing the one frame member 44. The tenon assembly structure in the frame body 4 facilitates the reduction of the screws for fixing the component members. The reduction of the screws contributes to improve the efficiency of assembly and productivity of the liquid crystal display apparatus.

In the liquid crystal display apparatus according to the present invention, the frame members 41, 42, 43 and 44 may be each an extrusion-molded product.

In the liquid crystal display apparatus according to the present invention, the frame members 41, 42, 43 and 44 are each an extrusion-molded product. Thereby, even when the cross-sectional shape of the frame members 41, 42, 43 and 44 is complicated, the frame members 41, 42, 43 and 44 can be easily formed.

The liquid crystal display apparatus according to the present invention may include a rectangular cover frame body 11 which covers the front peripheral edge part of the liquid crystal panel 2, and the frame body 4 may abut the front surface of the cover frame body 11 and the rear peripheral edge part of the backlight housing body 3 and sandwich the cover frame body 11, the liquid crystal panel 2, the optical sheet 9, the backlight 7 and the backlight housing body 3.

The liquid crystal display apparatus according to the present invention includes the rectangular cover frame body 11 which covers the front peripheral edge part of the liquid crystal panel 2. The frame body 4 abuts the front surface of the cover frame body 11 and the rear peripheral edge part of the backlight housing body 3 and sandwiches the cover frame body 11, the liquid crystal panel 2, the optical sheet 9, the backlight 7 and the backlight housing body 3. Thereby, the cover frame body 11 can be mounted between the frame body 4 and the liquid crystal panel 2 to protect the liquid crystal panel 2.

The liquid crystal display apparatus according to the present invention includes a liquid crystal panel 2, an optical sheet 9, a backlight 7 and a backlight housing body 3, which are sequentially laminated from a front side to a rear side, the backlight housing body 3 may be formed in a box shape whose front surface is opened, the liquid crystal panel 2, the optical sheet 9 and the backlight 7 may be laminated on an inner bottom of the backlight housing body 3, and the apparatus may include a frame body 4 which is configured to abut the liquid crystal panel 2 and the backlight housing body 3 and sandwich the liquid crystal panel 2, the optical sheet 9, the backlight 7 and the backlight housing body 3, and has a rectangular shape in a front view and a U-shaped cross section opened inward, one surface of an inner surface of the frame body 4 and an outer surface of the backlight housing body 3 facing the inner surface may be provided with a protrusion part 35, and the other surface may be provided with groove parts 415, 425 and 435 or an opening to which the protrusion part 35 is fitted.

In the liquid crystal display apparatus according to the present invention, the liquid crystal panel 2, the optical sheet 9, the backlight 7 and the backlight housing body 3 are sequentially laminated on the inner surface of the backlight housing body 3 which is formed in a box shape whose front surface is opened from the front side to the rear side. The liquid crystal display apparatus includes the frame body 4 which abuts the liquid crystal panel 2 and the backlight housing body 3, and sandwiches the liquid crystal panel 2, the optical sheet 9, the backlight 7 and the backlight housing body 3. The frame body 4 has a rectangular shape in a front view and a U-shaped cross section opened inward. One surface of the inner surface of the frame body 4 and the outer surface of the backlight housing body 3 facing the inner surface is provided with the protrusion part 35, and the other surface is provided with groove parts 415, 425 and 435 or the opening to be fitted to the protrusion part 35. Therefore, the frame body 4 is fixed to the backlight housing body 3, and the liquid crystal panel 2, the optical sheet 9, the backlight 7 and the backlight housing body 3 are sandwiched by the fixed frame body 4, thereby protecting each component member of the liquid crystal display apparatus.

In the liquid crystal display apparatus according to the present invention, the opening 37 may be a slit, the groove part 415 may have first and second groove parts 4151 and 4152 which are disposed in a series shape and have depths different from each other, and an inclined part 4153 which connects respective bottoms of the first and second groove parts 4151 and 4152, and the protrusion part 35 may have a height which is an intermediate length of a distance between the inner surface of the frame body 4 or the outer surface of the backlight housing body 3 and the respective bottoms of the first and second groove parts 4151 and 4152.

In the liquid crystal display apparatus according to the present invention, the opening 37 is a slit, and the groove or the slit is provided substantially parallel to an extending direction of the frame body 4. Thereby, with the protrusion part 35 being fitted to the groove or the slit, and the liquid crystal panel 2, the optical sheet 9, the backlight 7 and the backlight housing body 3 being sandwiched by the frame body 4, a part of the frame body 4 can be slid in the extending direction of the frame body. Further, in the liquid crystal display apparatus according to the present invention, the groove part 415 has the first groove part 4151 and the second groove part 4152. The first groove part 4151 and second groove part 4152 are disposed in a series shape and have bottoms with depths different from each other. In addition, the groove part 415 is provided with the inclined part 4153 which connects respective bottoms of the first groove part 4151 and the second groove part 4152. The protrusion part 35 has a height which is an intermediate length of the distance between the inner surface of the frame body 4 or the outer surface of the backlight housing body 3 and the respective bottoms of the first groove part 4151 and the second groove part 4152. Thereby, when a part of the frame body 4 is slid in the extending direction of the frame body 4, the protrusion part 35 can be slid between the first groove part 4151 and the second groove part 4152. In addition, the width of the frame body 4 which sandwiches the liquid crystal panel 2, the optical sheet 9, the backlight 7 and the backlight housing body 3 may be changed. Accordingly, by sliding a part of the frame body 4 in a direction in which the width of the frame body 4 is decreased with respect to the liquid crystal panel 2, the optical sheet 9, the backlight 7 and the backlight housing body 3, it is possible to increase a force of sandwiching the liquid crystal panel 2, the optical sheet 9, the backlight 7 and the backlight housing body 3 by the frame body 4.

In the liquid crystal display apparatus according to the present invention, the frame body 4 may be configured to be divided into four linear frame members 41, 42, 43 and 44, and the frame members 41, 42, 43 and 44 may be each an extrusion-molded product.

In the liquid crystal display apparatus according to the present invention, the frame body 4 can be divided into four linear frame members 41, 42, 43 and 44. The frame members 41, 42, 43 and 44 are each an extrusion-molded product. Thereby, even when the cross-sectional shape of the frame members 41, 42, 43 and 44 is complicated, the frame members 41, 42, 43 and 44 can be easily formed.

In the liquid crystal display apparatus according to the present invention, the outer surface of the backlight housing body 3 may be provided with the protrusion part 35, the inner surface of the frame body 4 may be provided with the groove parts 415, 425 and 435, the frame body 4 may have flat parts 4223 and 4323 which are cut more deeply than the groove parts 415, 425 and 435 in one end direction of the groove parts 415, 425 and 435, and inclined parts 4224 and 4324 which connect the flat parts 4223 and 4323 and the bottoms of the groove parts 415, 425 and 435, and the protrusion part 35 may have a height which is an intermediate length of a distance between the outer surface of the backlight housing body 3 and the bottoms of the groove parts 415, 425 and 435 and the flat parts 4223 and 4323.

In the liquid crystal display apparatus according to the present invention, the outer surface of the backlight housing body 3 is provided with the protrusion part 35, and the inner surface of the frame body 4 is provided with the groove parts 415, 425 and 435. The frame body 4 has the groove parts 415, 425 and 435 and the flat parts 4223 and 4323, and the inclined parts 4224 and 4324. The flat parts 4223 and 4323 are cut more deeply than the groove parts 415, 425 and 435 in one end direction of the groove parts 415, 425 and 435. The inclined parts 4224 and 4324 connect the groove parts 415, 425 and 435 with the flat parts 4223 and 4323. The protrusion part 35 has a height which is an intermediate length of a distance between the outer surface of the backlight housing body 3 and the bottoms of the groove parts 415, 425 and 435 and the distance between the outer surface of the backlight housing body 3 and the flat parts 4223 and 432. Thereby, in order to face the protrusion part 35 with the flat parts 4223 and 4323, when the liquid crystal panel 2, the optical sheet 9, the backlight 7 and the backlight housing body 3 are sandwiched by the frame members, the liquid crystal panel 2, the optical sheet 9, the backlight 7 and the backlight housing body 3 are easily inserted into the U-shaped open portion of the frame members. In addition, by sliding a part of the frame body 4 in the direction in which the width of the frame body 4 is decreased with respect to the liquid crystal panel 2, the optical sheet 9, the backlight 7 and the backlight housing body 3, the protrusion part 35 can be fitted to the groove parts 415, 425 and 435, and thereby the frame member can be fixed to the backlight housing body 3. Further, it is possible to increase the force of sandwiching the liquid crystal panel 2, the optical sheet 9, the backlight 7 and the backlight housing body 3 by the frame body 4.

In the liquid crystal display apparatus according to the present invention, the backlight 7 may have a substrate 8 on which light sources 8a are mounted, and a light guide plate 7 which receives light of the light sources 8a on a side thereof, and emits the light to the optical sheet 9, and the substrate 8 may be disposed on the inner surface of the backlight housing body 3 facing the side of the light guide plate 7.

In the liquid crystal display apparatus according to the present invention, the backlight 7 has the substrate 8 on which the light source 8a are mounted, and the light guide plate 7. That is, the liquid crystal display apparatus employs the edge-light method. The light guide plate 7 receives light of the light sources 8a on the side thereof, and emits the light to the optical sheet 9. The substrate 8 is disposed on the inner surface of the backlight housing body 3 facing the side of the light guide plate 7. Thereby, in the liquid crystal display apparatus, the thickness of the backlight 7 can be reduced to the thickness of the light guide plate 7

The liquid crystal display apparatus according to the present invention may include a rectangular cover frame body 11 which covers the front peripheral edge part of the liquid crystal panel 2, and the frame body 4 may abut the cover frame body 11 and the backlight housing body 3 and sandwich the cover frame body 11, the liquid crystal panel 2, the optical sheet 9, the backlight 7 and the backlight housing body 3.

The liquid crystal display apparatus according to the present invention includes the rectangular cover frame body 11 which covers the front peripheral edge part of the liquid crystal panel 2. The frame body 4 abuts the cover frame body 11 and the backlight housing body 3 and sandwiches the cover frame body 11, the liquid crystal panel 2, the optical sheet 9, the backlight 7 and the backlight housing body 3. Thereby, the frame body 4 and the liquid crystal panel 2 are directly connected with each other, such that an occurrence of damage to the liquid crystal panel 2 is prevented by the cover frame body 11. Therefore, the cover frame body 11 can protect the liquid crystal panel 2.

A display apparatus 50 according to the present invention which includes a display panel 56 displaying an image, and a frame body 60 covering periphery of the display panel 56, and the frame body 60 includes frame members 61 to 63 extending along edge of the display panel 56, one frame member 61 or 63 may include panel insertion groove 61a or 63a extending in a longitudinal direction in which the edge portion of the display panel 56 is inserted, and fitting concave part 70, 115 or 63c which is formed in the end part of the panel insertion groove 61a or 63a, and is fitted to the other frame member 61 or 63, and an end of the other frame member 61 or 63 may be provided with protrusion part 132, 135 or 61c which is fitted to the fitting concave part 70, 115 or 63c.

In the display apparatus 50 according to the present invention, the fitting concave part 70, 115 or 63c is formed in the panel insertion groove 61a of the one frame member 61, and the protrusion part 132, 135 or 61c provided on the end part of the other frame member 63 can be fitted to the fitting concave part 70, 115 or 63c to prevent an occurrence of the gap.

In the display apparatus 50 according to the present invention, the protrusion parts 132 and 135 may have a sharp end portion, and the fitting concave part 70 and 115 may be formed in the inner surface of the panel insertion grooves 61a to 63a, and formed in a V shape corresponding to the sharp end portion.

In the display apparatus 50 according to the present invention, the sharp end portion of the other frame member 63 can be fitted to the V-shaped fitting concave part 70 and 115 to prevent an occurrence of the gap.

In the display apparatus 50 according to the present invention, the sharp end portion may be an arc-shaped sharp end protrusion 132 which protrudes from an outer peripheral surface of the end part of the other frame member 63, and the fitting concave part 70 may be formed in a groove shape having a V-shaped cross section extending in a U shape over the bottom and both sides of the panel insertion groove 61a.

In the display apparatus 50 according to the present invention, the sharp end protrusion 132 formed on the end part of the other frame member 63 can be fitted to the fitting concave part 70 having a V-shaped cross section to prevent an occurrence of the gap.

In the display apparatus 50 according to the present invention, the fitting concave part 115 may be formed on the side of the panel insertion groove 61a, and an opposing distance between both opposite sides of the fitting concave part 115 may become shorter toward the bottom side of the panel insertion groove 61a.

In the display apparatus 50 according to the present invention, the distance between the opposite sides of the fitting concave part 115 can be short to prevent an occurrence of the gap.

In the display apparatus 50 according to the present invention, the display panel 56 may be formed in a rectangular shape, and the fitting concave part 115 may have an inclined face 115a which is inclined in a direction intersecting two peripheral surfaces of the display panel 56 orthogonal to each other.

In the display apparatus 50 according to the present invention, the inclined face 115a which is inclined in the direction intersecting two peripheral surfaces of the display panel 56 orthogonal to each other is formed on the fitting concave part 115. When the protrusion part 135 of the horizontal frame member 63 is fitted to the fitting concave part 70 of the one frame member 61, the one frame member 61 comes into close proximity to the other frame member 63 by the force applied from the other frame member 63.

In the display apparatus 50 according to the present invention, the fitting concave part 63c and the protrusion part 61c may be provided in the direction orthogonal to the longitudinal direction of the other frame member 61, the protrusion part 61c may be provided on the inner surface of the panel insertion groove 61a in the other frame member 61, and the protrusion part 61c may be fitted to the fitting concave part 63c on the inside of the panel insertion groove 61a in the other frame member 61.

In the display apparatus 50 according to the present invention, the fitting concave part 63c and the protrusion part 61c are laid along a vertical direction orthogonal to the longitudinal direction of the other frame member 61, for example, the lateral direction thereof, and when two frame members 61 and 63 are connected with each other in the lateral direction and the vertical direction, even when a gap is formed in the connection portion in the vertical direction, by fitting the protrusion part 61c to the fitting concave part 63c, it is possible to prevent the frame members 61 and 63 from being biased in the lateral direction. Further, since the protrusion part 61c is fitted to the fitting concave part 63c inside of the panel insertion groove 61a in the other frame member 61, the protrusion part 61c and the fitting concave part 63c cannot be visually confirmed from an outside to improve appearance design properties.

In the display apparatus 50 according to the present invention, one side of the panel insertion groove 61a or 63a in the respective one and the other frame members 61 and 63 may be provided with the fitting concave part 63c and the protrusion part 61c, and the other side of the panel insertion groove 61a or 63a facing the one side in the respective one and the other frame members 61 and 63 may be provided with a guide concave part 63d and a guide convex part 61d which guide the fitting by the fitting concave part 63c and the protrusion part 61c.

In the display apparatus 50 according to the present invention, by inserting the guide convex part 61d into the guide concave part 63d, the frame members can be smoothly connected with each other.

In the display apparatus 50 according to the present invention, an opening edge portion of the fitting concave part 63c may be provided with the inclined face 63b in the direction orthogonal to the longitudinal direction of the one frame member.

In the display apparatus 50 according to the present invention, by providing the inclined face 63b on the opening edge portion of the fitting concave part 63c, the protrusion part 61c can be guided to the fitting concave part 63c along the inclined face 63b.

In the display apparatus 50 according to the present invention, as described above, the fitting concave part 70, 115 or 63c is formed in the panel insertion groove 61a or 63a of the one frame member 61 or 63, and the protrusion part 132, 135 or 61c of the other frame member 61 or 63 can be fitted to the fitting concave part 70, 115 or 63c to prevent an occurrence of the gap.

The liquid crystal display apparatus according to the present invention includes a substantially rectangular liquid crystal display panel 83, light sources 121 which are disposed on a rear of the liquid crystal display panel 83, a light guide plate 123 which is disposed on a rear side of the liquid crystal display panel 83, and emits light incident on an end face which faces the light sources 121 to a rear surface of the liquid crystal display panel 83, a housing body 80 which is disposed on the rear side of the light guide plate 123, and houses the light guide plate 123 and the light sources 121, and a frame body 85 having a groove which sandwiches peripheral edges of the liquid crystal display panel 83, the light guide plate 123 and the housing body 80 which are laminated in the front-back direction at the front and back, the liquid crystal display panel 83 may include a flexible board 142 which is formed in a band shape, one end thereof is connected to one end face side of the liquid crystal display panel 83 and the other end thereof is located on the rear side of the housing body 80, and has a liquid crystal drive circuit 142a, and the frame body 85 may include an abutting part 154d which abuts a place in which the liquid crystal drive circuit 142a of the flexible board 142 is disposed, or the liquid crystal drive circuit 142a.

In the liquid crystal display apparatus according to the present invention, the light guide plate 123, the optical sheet 124 and the liquid crystal display panel 83 are laminated on the housing body 80, and the peripheral edges thereof are sandwiched by the frame body 85 having the groove formed in the inner periphery, thereby it is possible to achieve the thinning of the liquid crystal display apparatus. In addition, since the liquid crystal drive circuit 142a disposed on the flexible board 142, or the place in which the liquid crystal drive circuit 142a of the flexible board 142 is disposed abuts the frame body 85, heat generated from the liquid crystal drive circuit 142a can be conducted to the frame body 85 to dissipate the heat. Further, since the flexible board 142 which is connected to the one end face side of the liquid crystal display panel 83 is laid on the rear side of the housing body 80 along the inner surface of the groove-shaped frame body, as compared to the case in which the flexible board 142 is laid along the L-shaped bezel, it is easy to abut the inner surface of the frame body 85.

In the liquid crystal display apparatus according to the present invention, the abutting part 154d may be a linear projection substantially parallel to the longitudinal direction of the one end face of the liquid crystal display panel, and may have an inclined face 154e in which a distance with the end face of the light guide plate 123 on the rear side is larger than the front side.

In the liquid crystal display apparatus according to the present invention, since the abutting part 154d abutting the liquid crystal drive circuit 142a is the linear projection, and has the inclined face 154e in which the distance with the end face of the light guide plate 123 on the rear side is larger than the front side, the flexible board 142 is laid along the inclined face 154e of the linear projection, and the liquid crystal drive circuit 142a abuts the inclined face 154e. Accordingly, the liquid crystal drive circuit 142a can easily abut the abutting part 154d. In addition, the flexible board 142 is laid on the rear side of the housing body 80 through a shorter path. Therefore, the length of the flexible board 142 can be reduced.

The liquid crystal display apparatus according to the present invention may include a light shielding frame body 125 which covers the peripheral edges of the housing body 80 and the light guide plate 123, and the liquid crystal drive circuit 142a may be disposed between the inclined face 154e of the abutting part 154d and the light shielding frame body 125.

In the liquid crystal display apparatus according to the present invention, since the liquid crystal drive circuit 142a is located so as to be sandwiched between the inclined face 154e and the light shielding frame body 125, the liquid crystal drive circuit 142a, or the place in which the liquid crystal drive circuit 142a of the flexible board 142 is disposed can more reliably abut the abutting part 154d.

In the liquid crystal display apparatus according to the present invention, the frame body 85 may have higher thermal conductivity than the housing body 80, and the rear surface area of the portion in which the flexible board 142 is laid may be larger than the front surface area of the portion.

In the liquid crystal display apparatus according to the present invention, since the frame body 85 of the liquid crystal display panel 83 has the higher thermal conductivity than the housing body 80, and the rear surface area is larger than the front surface area thereof, heat of the liquid crystal drive circuit 142a can be effectively dissipated from the rear portion of the frame body 85.

The liquid crystal display apparatus according to the present invention includes a substantially rectangular liquid crystal display panel 83, light sources 121 which are disposed on a rear of the liquid crystal display panel 83, a light guide plate 123 which is disposed on a rear side of the liquid crystal display panel 83, and emits light incident on an end face which faces the light sources 121 to a rear surface of the liquid crystal display panel 83, a housing body 80 which is disposed on the rear side of the light guide plate 123, and houses the light guide plate 123 and the light sources 121, and a frame body 85 having a groove which sandwiches peripheral edges of the light guide plate 123 and the housing body 80 at the front and back, and the frame body 85 may have a portion which sandwiches the light sources 121 side of the liquid crystal display panel 83a and has a larger rear surface area than the front surface thereof.

In the liquid crystal display apparatus according to the present invention, the frame body 85 has the larger rear surface area than the front surface area, heat of the light source is mainly diffused from the rear portion of the frame body 85.

The liquid crystal display apparatus according to the present invention may include a fastening member 87 configured to fasten a portion which sandwiches the light sources 121 side of the liquid crystal display panel 83 to the housing body 80, and conduct the heat generated from the light sources 121 to the frame body 85 through the housing body 80.

In the liquid crystal display apparatus according to the present invention, the heat generated from the light sources 121 is conducted to the frame body 85 through the fastening member 87.

The liquid crystal display apparatus according to the present invention may include a light shielding frame body 125 which covers the peripheral edges of the housing body 80 and the light guide plate 123, and the light shielding frame body 125 may have lower thermal conductivity than the housing body 80 and the frame body 85.

In the liquid crystal display apparatus according to the present invention, since the light shielding frame body 125 is located between the peripheral edge of the housing body 80 in which the light sources 121 are housed and the frame body 85, and the light shielding frame body 125 has lower thermal conductivity than the chassis and the frame body 85, it is possible to suppress heat dissipation from the bottom of the liquid crystal display panel 83.

In the liquid crystal display apparatus according to the present invention, the housing body 80 may have a linear convex part 93 substantially parallel to the side of the light sources 121 side of the liquid crystal display panel 83, and the frame body 85 may include front plate part 154a which has higher thermal conductivity than the housing body 80 and sandwiches the liquid crystal display panel 83, the light guide plate 123 and the housing body 80, and a rear plate part 154c, and bottom plate part 154b connecting the front plate part 154a and the rear plate part 154c, and the rear plate part 154c may abut the linear convex part 93.

In the liquid crystal display apparatus according to the present invention, a part of the heat conducted to the rear plate part 154c of the frame body 85 can be dissipated to the chassis through the linear convex part 93 of the chassis. The portion provided with the linear convex part 93 is separated from the light sources 121, and the housing body 80 has lower thermal conductivity than the frame body 85, temperature of the portion is lower than the rear plate part 154c of the frame body 85. Therefore, heat of the rear plate part 154c of the frame body 85 can be conducted to the chassis, and the heat can be dissipated to the rear side more effectively.

A television receiver according to the present invention may include the liquid crystal display apparatus or the display apparatus according to any one of the above, and a receiving unit which receives television broadcasts, and the liquid crystal display apparatus or the display apparatus is configured to display an image of the television broadcasts received by the receiving unit.

According to the present invention, it is possible to display an image of the television broadcasts.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal display apparatus, comprising:
a liquid crystal panel, an optical sheet, a backlight and a backlight housing body, which are sequentially laminated from a front side to a rear side; and
a frame body which is configured to abut a front peripheral edge part of the liquid crystal panel and a rear peripheral edge part of the backlight housing body and sandwich the liquid crystal panel, the optical sheet, the backlight and the backlight housing body, and has a rectangular shape in a front view and a U-shaped cross section opened inward,
wherein the frame body is configured to be divided into four linear frame members, and
the frame members are joined with each other by a tenon assembly structure provided at a location to be butted with each other,
wherein the tenon assembly structure is formed on a rear portion of the frame body abutting the rear peripheral edge part of the backlight housing body.

2. The liquid crystal display apparatus according to claim 1,
wherein a mortise facing the other frame member to be jointed is provided in both end parts of the rear portion in one frame member, and
a tenon which is fitted to the mortise is provided on the rear portion of the other frame member at a location to be butted with the one frame member.

3. The liquid crystal display apparatus according to claim 1,
wherein the backlight housing body is formed in a box shape whose front surface is opened,
the liquid crystal panel, the optical sheet and the backlight are laminated on an inner bottom of the backlight housing body,
the front surface of the rear portion in the frame body is provided with a protrusion part, and
the rear peripheral edge part of the backlight housing body facing the protrusion part is provided with a slit to which the protrusion part is fitted substantially parallel to the peripheral edge of the backlight housing body.

4. A liquid crystal display apparatus, comprising:
a liquid crystal panel, an optical sheet, a backlight and a backlight housing body, which are sequentially laminated from a front side to a rear side,
wherein the backlight housing body is formed in a box shape whose front surface is opened, and
the liquid crystal panel, the optical sheet and the backlight are laminated on an inner bottom of the backlight housing body,
further comprising a frame body which is configured to abut the liquid crystal panel and the backlight housing body and sandwich the liquid crystal panel, the optical sheet, the backlight and the backlight housing body, and has a rectangular shape in a front view and a U-shaped cross section opened inward,
wherein any one of an inner surface of the frame body and an outer surface of the backlight housing body facing the inner surface is provided with a protrusion part, and the other thereof is provided with a groove part or an opening to which the protrusion part is fitted,
wherein the opening is a slit,
the groove part has first and second groove parts which are disposed in a series shape and have depths different from each other, and an inclined part which connects respective bottoms of the first and second groove parts, and
the protrusion part has a height which is an intermediate length of a distance between the inner surface of the frame body or the outer surface of the backlight housing body and the respective bottoms of the first and second groove parts.

5. The liquid crystal display apparatus according to claim 4,
wherein the frame body is configured to be divided into four linear frame members, and
the frame members are each an extrusion-molded product.

6. A liquid crystal display apparatus, comprising:
a liquid crystal panel, an optical sheet, a backlight and a backlight housing body, which are sequentially laminated from a front side to a rear side,
wherein the backlight housing body is formed in a box shape whose front surface is opened, and
the liquid crystal panel, the optical sheet and the backlight are laminated on an inner bottom of the backlight housing body,
further comprising a frame body which is configured to abut the liquid crystal panel and the backlight housing body and sandwich the liquid crystal panel, the optical sheet, the backlight and the backlight housing body, and has a rectangular shape in a front view and a U-shaped cross section opened inward,
wherein any one of an inner surface of the frame body and an outer surface of the backlight housing body facing the inner surface is provided with a protrusion part, and the other thereof is provided with a groove part or an opening to which the protrusion part is fitted,
wherein the outer surface of the backlight housing body is provided with the protrusion part,
the inner surface of the frame body is provided with the groove part,
the frame body has a flat part which is cut more deeply than the groove part in one end direction of the groove part, and an inclined part which connects the flat part and the bottom of the groove part, and the protrusion part has a height which is an intermediate length of a distance between the outer surface of the backlight housing body and the bottom of the groove part and the flat part.

7. The liquid crystal display apparatus according to claim 6,
wherein the frame body is configured to be divided into four linear frame members, and
the frame members are each an extrusion-molded product.

8. A display apparatus, comprising:
a display panel which displays an image; and
a frame body which covers a periphery of the display panel, and includes a plurality of frame members extending along an edge of the display panel,
wherein one frame member includes a panel insertion groove extending in a longitudinal direction in which an edge portion of the display panel is inserted, and a fitting concave part which is formed in an end part of the panel insertion groove and is fitted to the other frame member, and
the other frame member is provided with a protrusion part which is fitted to the fitting concave part on an end part thereof,
wherein the protrusion part has a sharp end portion, and
the fitting concave part is formed in the inner surface of the panel insertion groove, and is formed in a V shape corresponding to the sharp end portion.

9. The display apparatus according to claim 8,
wherein the sharp end portion is an arc-shaped sharp end protrusion which protrudes from an outer peripheral surface of an end part of the other frame member, and
the fitting concave part is formed in a groove shape having a V-shaped cross section, which extends in a U shape over the bottom and both sides of the panel insertion groove.

10. The display apparatus according to claim 8,
wherein the fitting concave part and the protrusion part are provided in a direction orthogonal to the longitudinal direction of the other frame member,
the protrusion part is provided on the inner surface of the panel insertion groove in the other frame member, and
the protrusion part is fitted to the fitting concave part on the inside of the panel insertion groove in the other frame member.

11. A display apparatus, comprising:
a display panel which displays an image; and
a frame body which covers a periphery of the display panel, and includes a plurality of frame members extending along an edge of the display panel,
wherein one frame member includes a panel insertion groove extending in a longitudinal direction in which an edge portion of the display panel is inserted, and a fitting concave part which is formed in an end part of the panel insertion groove and is fitted to the other frame member, and
the other frame member is provided with a protrusion part which is fitted to the fitting concave part on an end part thereof,
wherein the fitting concave part is formed on the side of the panel insertion groove, and
an opposing distance between the both sides of the fitting concave part becomes shorter toward a bottom side of the panel insertion groove.

12. The display apparatus according to claim 11,
wherein the fitting concave part and the protrusion part are provided in a direction orthogonal to the longitudinal direction of the other frame member,
the protrusion part is provided on the inner surface of the panel insertion groove in the other frame member, and
the protrusion part is fitted to the fitting concave part on the inside of the panel insertion groove in the other frame member.

13. A display apparatus, comprising:
a display panel which displays an image; and
a frame body which covers a periphery of the display panel, and includes a plurality of frame members extending along an edge of the display panel,
wherein one frame member includes a panel insertion groove extending in a longitudinal direction in which an edge portion of the display panel is inserted, and a fitting concave part which is formed in an end part of the panel insertion groove and is fitted to the other frame member, and
the other frame member is provided with a protrusion part which is fitted to the fitting concave part on an end part thereof,
wherein the display panel is formed in a rectangular shape, and
the fitting concave part has an inclined face which is inclined in a direction intersecting two peripheral surfaces of the display panel orthogonal to each other.

14. The display apparatus according to claim 13,
wherein the fitting concave part and the protrusion part are provided in a direction orthogonal to the longitudinal direction of the other frame member,
the protrusion part is provided on the inner surface of the panel insertion groove in the other frame member, and
the protrusion part is fitted to the fitting concave part on the inside of the panel insertion groove in the other frame member.

15. A display apparatus, comprising:
a display panel which displays an image; and
a frame body which covers a periphery of the display panel, and includes a plurality of frame members extending along an edge of the display panel,
wherein one frame member includes a panel insertion groove extending in a longitudinal direction in which an edge portion of the display panel is inserted, and a fitting concave part which is formed in an end part of the panel insertion groove and is fitted to the other frame member, and
the other frame member is provided with a protrusion part which is fitted to the fitting concave part on an end part thereof,
wherein one side of the panel insertion groove in the respective one and the other frame members is provided with the fitting concave part and the protrusion part, and
the other side of the panel insertion groove facing the one side in the respective one and the other frame members is provided with a guide concave part and a guide convex part which guide the fitting by the fitting concave part and the protrusion part.

* * * * *